(12) United States Patent
Nagasaka et al.

(10) Patent No.: US 8,416,338 B2
(45) Date of Patent: Apr. 9, 2013

(54) IMAGING DEVICE AND IMAGING METHOD

(75) Inventors: Hideo Nagasaka, Kanagawa (JP);
Sunao Aoki, Kanagawa (JP); Masahiro Yamada, Kanagawa (JP)

(73) Assignee: Sony Corporation (JP)

(*) Notice: Subject to any disclaimer, the term of this patent is extended or adjusted under 35 U.S.C. 154(b) by 602 days.

(21) Appl. No.: 12/589,686

(22) Filed: Oct. 27, 2009

(65) Prior Publication Data

US 2010/0128163 A1    May 27, 2010

(30) Foreign Application Priority Data

Nov. 25, 2008 (JP) ................. P2008-300177

(51) Int. Cl.
 *G03B 13/00* (2006.01)
(52) U.S. Cl. ..................... 348/348; 348/345
(58) Field of Classification Search ............. None
See application file for complete search history.

(56) References Cited

U.S. PATENT DOCUMENTS 7,229,178 B1 * 6/2007 Headley et al. ............... 359/847

FOREIGN PATENT DOCUMENTS

| JP | 07131698 A | 5/1995 |
|---|---|---|
| JP | 10-290389 A | 10/1998 |
| JP | 11177873 A * | 7/1999 |
| JP | 2001-333324 A | 11/2001 |
| JP | 2003-114378 A | 4/2003 |
| JP | 2003-143461 A | 5/2003 |
| JP | 2004-135029 A | 4/2004 |
| JP | 2004-333924 A | 11/2004 |
| JP | 2006-121303 A | 5/2006 |
| JP | 2007-213083 A | 8/2007 |
| JP | 2007-328360 A | 12/2007 |

OTHER PUBLICATIONS

Office Action from Japanese Application No. 2008-300177, dated Jul. 3, 2012.

* cited by examiner

*Primary Examiner* — Chieh M Fan
*Assistant Examiner* — Angel L Garces-Rivera
(74) *Attorney, Agent, or Firm* — Lerner, David, Littenberg, Krumholz & Mentlik, LLP

(57) ABSTRACT

There is provided an imaging device which detects a focused position focused on a desired subject in an imaging range in response to a detection instruction, acquires the image data obtained by imaging the subject image at the focused position as saving image data in response to a release instruction, and sequentially changing a focal position with the focused position as a reference and acquiring the image data obtained by imaging the subject image at a plurality of changed different focal positions as saving image data.

5 Claims, 24 Drawing Sheets

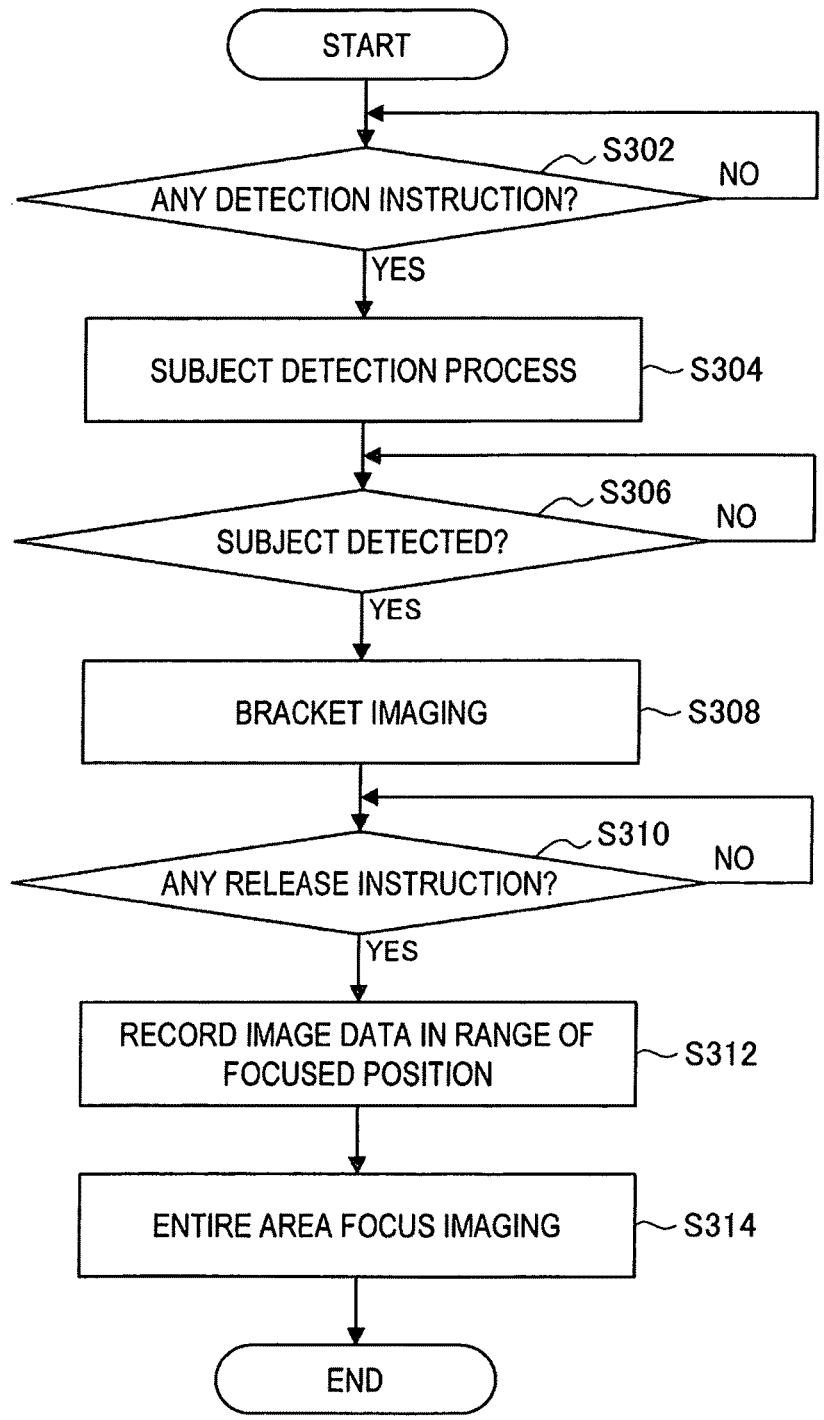

IMAGING DEVICE AND IMAGING METHOD

CROSS-REFERENCE TO RELATED APPLICATION

The present application claims priority from Japanese Patent Application JP 2008-300177 filed in the Japanese Patent Office on Nov. 25, 2008, the entire content of which is hereby incorporated by reference.

BACKGROUND OF THE INVENTION

1. Field of the Invention

The present invention relates to an imaging device, and an imaging method.

2. Description of the Related Art

Digital still cameras generate digital image data by converting a subject image (optical image) entered to an image sensor to an electrical signal, and record the digital image data on a recording medium such as a memory card according to a release operation of the imager. The digital still camera is generally mounted with an auto focus (automatic focus) mechanism and adopts an optical system having a large F value and a deep depth of field to facilitate the focusing. The imager thus can image the subject image focused on a subject by the auto focus mechanism and record the digital image data of the subject image by simply operating the release button with the digital still camera directed towards the subject.

Japanese Patent Application Laid-Open No. 2003-143461 discloses a digital still camera that performs multifocus imaging according to one release operation to provide a digital still camera capable of generating digital image data in which a focused range (focused point) can be arbitrarily changed after imaging. In the multifocus imaging of Japanese Patent Application Laid-Open No. 2003-143461, a plurality of image data in which the focused positions differ from each other is obtained by imaging in a stepwise manner while automatically changing the focal position from the focal position on the shortest distance side to the focal position on the infinity side according to one release operation.

SUMMARY OF THE INVENTION

However, in the camera mounted with the auto focus mechanism of the related art, the multifocus image is not recorded in time of imaging even if the user desires an image re-focused on a different subject (focal position) after imaging, and thus the desired image is not provided. A method of generating a re-focused image by synthesizing a plurality of images has been proposed, but a reasonable image is very difficult to obtain with the image generated through the synthesis process.

Such issue can be resolved with the camera described in Japanese Patent Application Laid-Open No. 2003-143461 since a plurality of image data with different focused positions can be obtained for one subject image by the multifocus imaging.

However, the multifocus imaging is realistically difficult to perform instantaneously since a plurality of images is imaged and recorded while changing the focal position. For instance, in view of the time for driving the imaging optical system to change the focal position, the time for reading out image signals in the image sensor, and the like, great amount of time is required (e.g., about a few seconds) in the multifocus imaging compared to the normal imaging. Therefore, the image obtained in the last half of the multifocus imaging is imaged after a predetermined time has elapsed from the release operation, and thus the subject may move during the time and a photo opportunity may be missed.

That is, in the multifocus imaging described in Japanese Patent Application Laid-Open No. 2003-143461, a plurality of images is imaged by simply changing the focal position from the shortest distance side to the infinity side according to the release operation irrespective of the focal position of the subject focused by the auto focus mechanism before the release operation. Thus, the image focused on the shortest distance side is obtained immediately after the release operation, and the image focused on the infinity side is obtained after about a predetermined time (a few seconds) has elapsed from the release operation. Thus, even if the subject desired by the imager exists on the infinity side and the release operation is performed with the focus focused on the relevant subject, the image focused on the infinity side may become the image imaged at a timing delayed for a predetermined time from the release operation and in which the photo opportunity is missed.

In light of the foregoing, it is desirable to provide a novel and improved imaging device and an imaging method capable of performing multifocus imaging without missing the photo opportunity.

According to an embodiment of the present invention, there is provided an imaging device, including an imaging unit including an image sensor for imaging a light-received subject image and outputting image signals, and an imaging optical system for forming the subject image onto the image sensor, a drive unit for driving at least one of the imaging optical system or the image sensor to change a focal position, an image data generating unit for generating image data from the image signals output from the image sensor, and a control unit for controlling the imaging unit, the drive unit, and the image data generating unit, wherein the control unit detects a focused position focused on a desired subject in an imaging range in response to a detection instruction, and acquires the image data obtained by imaging the subject image at the focused position as saving image data in response to a release instruction, and sequentially changes the focal position with the focused position as a reference and acquires the image data obtained by imaging the subject image at a plurality of changed different focal positions as the saving image data.

The control unit may detect the focused position by performing an auto focus processing for focusing on the desired subject in the imaging range.

The control unit may perform a bracket imaging process for sequentially changing the focal position within a predetermined range having the focused position detected by the auto focus processing as a center, and acquiring the image data obtained by imaging the subject image at a plurality of changed focal positions as the saving image data during a period from the detection instruction to the release instruction.

The control unit may save the saving image data worth at least one period of immediately before the release instruction among the saving image data acquired by the bracket imaging process in a storage unit.

The control unit may perform an entire area focus imaging process for, in response to the release instruction, sequentially changing the focal position with the focused position as a reference within a focusable range from a focal position on a shortest distance side to a focal position on an infinity side in the imaging optical system, and acquiring the image data obtained by imaging the subject image at a plurality of changed different focal positions as the saving image data.

In the entire area focus imaging process, the control unit may change the focal position so that the focal position gradually separates to a near side or a far side from the focused position in the focusable range.

The control unit may set a plurality of changing positions of the focal position in a stepwise manner in the focusable range according to a depth of field of the imaging optical system, and in the entire area focus imaging process, the control unit may change the focal position in a stepwise manner in order from a changing position close to the focused position among the plurality of changing positions.

The control unit may set the plurality of changing positions with the focused position as a base point and changes the focal position in a stepwise manner to the set plurality of changing positions.

The control unit may perform a subject detection process of detecting one or more subjects existing in the imaging range and a range of the focused position focused on the subjects by changing the focal position and analyzing the image data obtained by imaging the subject image at a plurality of changed different focal positions in response to the detection instruction.

The control unit may perform a bracket imaging process for sequentially changing the focal position within the range of the focused position detected by the subject detection process, and acquiring the image data obtained by imaging the subject image at a plurality of changed focal positions as the saving image data during a period from when the subject detection process is executed in response to the detection instruction until the release instruction.

The control unit may save the saving image data worth at least one period of immediately before the release instruction among the saving image data acquired by the bracket imaging process in a storage unit.

In the bracket imaging process, the control unit may change the focal position within a range of the focused position focused on one subject selected from a plurality of subjects detected by the subject detection process.

The control unit may perform a subject imaging process for, in response to the release instruction, sequentially changing the focal position within the range of the focused position detected by the subject detection process in a focusable range from a focal position on a shortest distance side to a focal position on an infinity side in the imaging optical system, and acquiring the image data obtained by imaging the subject image at a plurality of changed different focal positions as the saving image data.

The control unit may perform an entire area focus imaging process for sequentially changing the focal position within the focusable range, and acquiring the image data obtained by imaging the subject image at a plurality of changed different focal positions as the saving image data, after performing the subject imaging process in response to the release instruction.

The control unit may change the focal position within the range of the focused position focused on one or more subjects selected from the subjects detected by the subject detection process in the subject imaging process.

The control unit may control an aperture of the imaging optical system according to the range of the focused position detected by the subject detection process in the subject imaging process.

The control unit may control the aperture of the imaging optical system so that a depth of field at the focal position corresponding to the subject detected by the subject detection process becomes greater than or equal to the range of the focused position focused on the subject.

The imaging optical system may include a deforming mirror configured so that a cross-sectional shape is deformable to a convex shape or a concave shape, and the drive unit may change the focal position by deforming and driving the deforming mirror based on an instruction of the control unit.

According to another embodiment of the present invention, there is provided an imaging method, including the steps of detecting a focused position focused on a desired subject in an imaging range in response to a detection instruction, and acquiring the image data obtained by imaging at the focused position as saving image data in response to a release instruction, and in the acquiring step, sequentially changing the focal position with the focused position as a reference and acquiring the image data obtained by imaging the subject image at a plurality of changed different focal positions as the saving image data.

According to the configuration described above, a focused position focused on a desired subject in an imaging range is detected in response to the detection instruction, the image data obtained by imaging the subject image at the focused position is acquired as saving image data in response to a release instruction, and the focal position is changed with the focused position as a reference and the image data obtained by imaging the subject image at a plurality of changed different focal positions is acquired as the saving image data while performing the change. Thus, the focused position detected in response to the detection instruction is detected before the release instruction, the focal position is changed with the focused position as a reference after the release instruction and the image data is sequentially obtained by imaging the subject image at the changed focal position while performing such change. Therefore, when close to the photo opportunity represented by the release instruction, the image data focused on the focused position detected in advance and the vicinity thereof are obtained.

According to the embodiments of the present invention described above, the multifocus imaging can be performed without missing the photo opportunity.

BRIEF DESCRIPTION OF THE DRAWINGS

FIG. 19 is a flowchart showing the imaging operation by the imaging device according to the embodiment;

DETAILED DESCRIPTION OF EMBODIMENT

Figure 1:
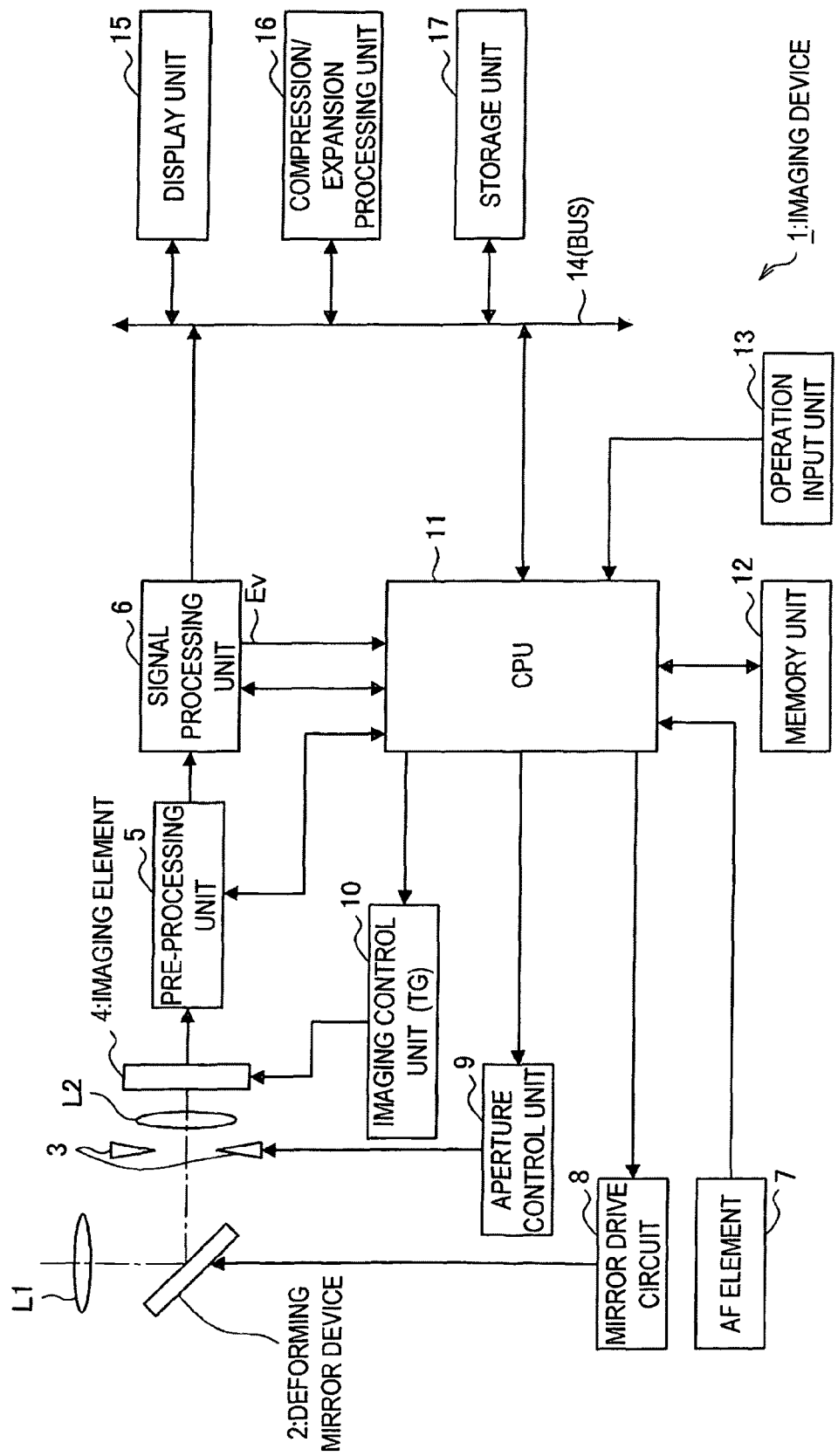
FIG. 1 is a block diagram showing a configuration of an imaging device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. First embodiment (entire area focus imaging after release)

2. Second embodiment (combination of bracket imaging before release and entire area focus imaging after release)

3. Third embodiment (combination of subject detection before release and entire area focus imaging after release)

4. Fourth embodiment (combination of subject detection before release and subject imaging after release)

5. Fifth embodiment (combination of subject detection before release and subject imaging after release and entire area focus imaging)

6. Sixth embodiment (control of aperture in subject imaging after release)

DEFINITION OF TERMS

First, various terms used in the present specification will be defined prior to describing each embodiment of the present invention.

"Imaging device" refers to a device for imaging a subject image and acquiring image data. The imaging device includes a digital still camera for mainly acquiring still images (photos) data, and a digital video camera for mainly acquiring moving image data. The digital still camera may also have a function of acquiring moving image data, or a digital video camera having a function of acquiring still image data. An example of the digital still camera will be mainly described for the example of the imaging device of the embodiment of the present invention in the following embodiment, but the imaging device of the embodiment of the present invention may be an arbitrary camera such as a digital video camera.

The "imaging" refers to converting a subject image light-received by the image sensor to image signals.

The "imaging range" is a range of an imaging space that can be imaged by the imaging device, and corresponds to a field angle.

The "subject image" is an optical image entered to the image sensor through the imaging optical system of the imaging device, and is an optical image representing a subject that exists in the imaging range of the imaging device.

The "image data" is digital data obtained by signal processing the image signals obtained by imaging the subject image with the image sensor.

The "focal position" is a position of a focus (focus point) of the imaging optical system of the imaging device. Specifically, the "focal position" is a position on the optical axis of the imaging optical system where the focus of the imaging optical system exists in the imaging space. The focal position can be changed by driving the imaging optical system or the imaging device of the imaging device. The distance from the center of lens to the focal position of the imaging optical system of the imaging device is referred to as a "focal length".

"Focusing" refers to focusing a focus of the imaging optical system of the imaging device on a desired subject in the imaging range.

The "focused position" is a focal position of when the focus of the imaging optical system of the imaging device is focused on a desired subject in the imaging range.

The "focused range" is a range of the focal position around the focused position where the focus is focused by the depth of field of the imaging optical system when the focal position is at a certain focused position. Here, "around the focused position" are the close-distance side (near side) and the long-distance side (far side) of the focused position on the optical axis (Z-axis) of the imaging optical system. As apparent from the description of the focused range, the focal position of when focusing on a certain subject has a width. Thus, "detection of the focused position focused on a desired subject" in the present invention refers to detecting an arbitrary focal position in the focused image focusing on the subject.

The "focusable range" is a range of the focal position where the imaging optical system of the imaging device can be physically focused from the focal position (macro) on the shortest distance side to the focal position on the infinity side.

The "X-axis direction" is a horizontal direction of the imaging space, the "Y-axis direction" is the vertical direction of the imaging space, and the "Z-axis direction" is a depth direction of the imaging space (optical axis direction of the imaging optical system). The X-axis direction and the Y-axis direction define an imaging plane of the image obtained by the imaging device, and the Z-axis direction becomes the direction of changing the focus of the imaging optical system.

The "detection instruction" is an instruction that becomes a trigger for detecting the focused position. The detection instruction is represented by a half-press operation of a release button (shutter button) by the user. However, the detection instruction may have the operation of turning ON the power of the imaging device, the operation of switching the operation mode of the imaging device to the imaging mode, other user operations, the face detection by a face detection process on the image data obtained by imaging etc. as a trigger.

The "release instruction" is an instruction that becomes a trigger for acquiring the image data obtained by imaging the subject image as saving image data. In a general digital still camera, "release" means recording the image data obtained by imaging the subject image on a recording medium, and is represented by a full-press operation of the release button. The "release instruction" in the present specification is not limited to the full-press operation of the release button, and may be a release instruction having other user operations on the imaging device, detection of a smile of a subject human by a smile detection process on the image data obtained by imaging, etc. as a trigger.

The "saving image data" is image data saved in the recording medium at the imaging device or an external device of the image data obtained by signal processing the image signals of the subject image imaged by the image sensor. In the digital still camera, the subject image is constantly imaged by the imaging element to generate image data, and the image data is displayed on a monitor of the imaging device as a live view image during the imaging mode. Not all image data obtained over time are saved in the recording medium, and the image data at the timing the release instruction etc. is made is saved in the recording medium. In the digital video camera, all the image data obtained over time in a period the recording instruction is made are saved in the recording medium as saving image data.

The "auto focus process" is a process of automatically detecting the focal position where the imaging device focuses on an arbitrary subject in the imaging range. The auto focus (hereinafter referred to as "AF") process may include a detection process of detecting the focal position of focusing on a desired subject, and a following process of changing the focal position to follow the focus to the subject. The subject of the AF target may be a subject existing in a predetermined AF region (e.g., central area of image) provided in the imaging range or a reference point, or the subject of AF target may be freely selected in the imaging range using an AF position specifying means such as a touch panel by the user.

The "subject detection process" is a process of detecting one or more subjects existing in the imaging range by changing the focal position and analyzing image data obtained by imaging the subject image at a plurality of changed different focal positions while performing such change. The subject that exists in the imaging range and the range of the focused position focused on the subject can be detected by the subject detection process.

The "bracket imaging process" is a process of periodically changing the focal position within a predetermined range including the detected focused position, and acquiring the image data obtained by imaging the subject image at a plurality of changed focal positions as saving image data while performing such change. The bracket imaging is also referred to as a focus bracket imaging. In such bracket imaging process, the focal position may be changed within a predetermined range having the focused position detected in the AF process as a center, or the focal position may be changed within a range of the focused position focused on the subject detected in the subject detection process. The positional shift of the focused position can be compensated since imaging can be carried out with the focal position changed to the vicinity of the focused position by the bracket process.

The "multifocus imaging process" is a process of changing the focal position in a stepwise manner or continuously within a predetermined range, and acquiring the image data obtained by imaging the subject image at a plurality of changed different focal positions as saving image data. Examples of the multifocus process include "entire area focus imaging process" of having the entire area of the focusable range as the changing range of the focal position, and "subject imaging process" of having the range of the focused position focused on the subject detected by the subject detection process as the changing range of the focal position.

The "entire area focus imaging process" is a process of changing the focal position in a stepwise manner or continuously in the focusable range, and acquiring the image data obtained by imaging the subject image at a plurality of changed different focal positions as saving image data. The entire area focus imaging process is an example of a multifocus process.

The "subject imaging process" is a process of changing the focal position in a stepwise manner or continuously in the range of the focused position focused on at least one subject of one or more subjects detected in the subject detection process, and acquiring the image data obtained by imaging the subject image at a plurality of changed different focal positions as the saving image data. The subject imaging process is an example of a multifocus process.

First Embodiment

An imaging device and an imaging method according to a first embodiment of the present invention will be described below. The imaging device according to the first embodiment has a characteristic in performing the AF process to detect a focused position to a desired subject, and performing the entire area focus imaging while changing the focal position with the detected focused position as a reference in response to the subsequent release instruction.

In other words, the imaging device according to the present embodiment detects the focused position focused on a desired subject by performing the AF process for focusing on the desired subject in the imaging range in response to the detection instruction. Thereafter, the imaging device records the image data obtained by imaging the subject image at the detected focused position in the recording medium as the saving image data in response to the release instruction. The imaging device also performs the entire area focus imaging of changing the focal position in the focusable range with the detected focused position as a reference, and recording the image data obtained by imaging the subject image at a plurality of changed and different focal positions as the saving image data while performing such change.

A plurality of saving image data focused at different positions in the focusable range can be obtained by the entire area focus imaging. Since the digital image data in which the focused position can be arbitrarily changed can be obtained after the imaging, the user can easily acquire the image refocused on a different subject (focal position) after the imaging. The imaging device according to the present embodiment will be specifically described below.

[Configuration of Imaging Device]

First, the configuration of the imaging device 1 according to the present embodiment will be described with reference to FIG. 1. FIG. 1 is a block diagram showing the configuration of the imaging device 1 according to the present embodiment.

As shown in FIG. 1, the imaging device 1 is configured as a digital still camera capable of imaging and recording still images and moving images. The imaging device 1 includes an imaging optical system (L1, L2, 2, 3), an image sensor 4, a pre-processing unit 5, a signal processing unit 6, an AF element 7, a mirror drive circuit 8, an aperture control unit 9, an imaging control unit 10, a CPU (Central Processing Unit) 11, a memory unit 12, an operation input unit 13, a bus 14, a display unit 15, a compression/expansion processing unit 16, and a storage unit 17.

The imaging optical system and the image sensor 4 are embodied examples of an imaging unit of the embodiment of the present invention, where the subject image is imaged on the image sensor 4 by the imaging optical system, and the light received subject image is imaged and the image signals are output by the image sensor 4. The pre-processing unit 5 and the signal processing unit 6 are embodied examples of an image data generating unit of the embodiment of the present invention that generates image data of the subject image by processing the image signals output from the image sensor 4. The mirror drive circuit 8 is an embodied example of a drive unit of the embodiment of the present invention that drives a deforming mirror device 2 to change the focal position. The CPU 11 and the memory unit 12 are embodied examples of the control unit of the embodiment of the present invention that control each unit of the imaging device 1. Each unit of the imaging device 1 will be described below.

The imaging optical system includes a lens L1, a deforming mirror device 2, a lens L2, and an aperture 3. The lens L1 and the lens L2 schematically show a lens group in the imaging optical system for causing the image sensor 4 to image the subject image (optical image). The lens L1 schematically shows a lens group for guiding the subject image to the deforming mirror device 2, and the lens L2 schematically shows a lens group for guiding the subject reflected by the mirror surface of the deforming mirror device 2 through the lens L1 to the image sensor 4. The actual imaging optical system merely is to be able to cause the image sensor 4 to image the subject image, and may include greater number of lenses, an optical filter for removing unnecessary wavelength, and other optical elements.

The deforming mirror device 2 is a device including a deforming mirror which cross-sectional view is deformable to a convex shape or a concave shape. The deforming mirror device 2 is formed with a member having flexibility (hereinafter referred to as flexible member) on the surface side, where a metal film such as aluminum is film-formed on the flexible member to form a mirror surface. The shape of the flexible member is deformed in response to the drive signal from the mirror drive circuit 8 in the figure, so that the shape of the mirror surface deforms to a convex shape or a concave shape thereby changing the focal position. The configuration and the operation of the deforming mirror device 2 will be hereinafter described.

The aperture 3 is inserted between the deforming mirror device 2 and the lens L2, and adjusts the exposure amount of the subject image imaged by the image sensor 4 by changing the passing range of the incident light based on the control of the aperture control unit 9 to be hereinafter described.

The image sensor 4 is configured by a solid image sensor such as CCD (Charge Coupled Device) and CMOS (Complementary Metal Oxide Semiconductor). The image sensor 4 images the incident subject image, and generates imaged image signals. That is, the image sensor 4 photoelectric converts the light (subject image) guided through the imaging optical system, and outputs an electric signal serving as image signals by R (red), G (green), and B (blue). The readout control of the image signals of the image sensor 4 is performed by the imaging control unit 10 based on the instruction of the CPU 11 to be hereinafter described.

The pre-processing unit 5 is a so-called analog front end for pre-processing exposure image signals, and includes a sample hold/AGC (Automatic Gain Control) circuit and a video A/D converter. For instance, the pre-processing unit 5 performs a CDS (Correlated Double Sampling) process, a gain process by a programmable gain amplifier (PGA), A/D conversion process, and the like on the analog electric signal serving as image signals output from the image sensor 4. The pre-processing unit 5 performs sensitivity variation correction process, white balance process, and the like on the imaged image data obtained by performing various types of processes on the image signals.

The signal processing unit 6 performs various types of image signals processing on the imaged image data (R, G, B) obtained through the pre-processing unit 5 to obtain final image data.

Figure 2:
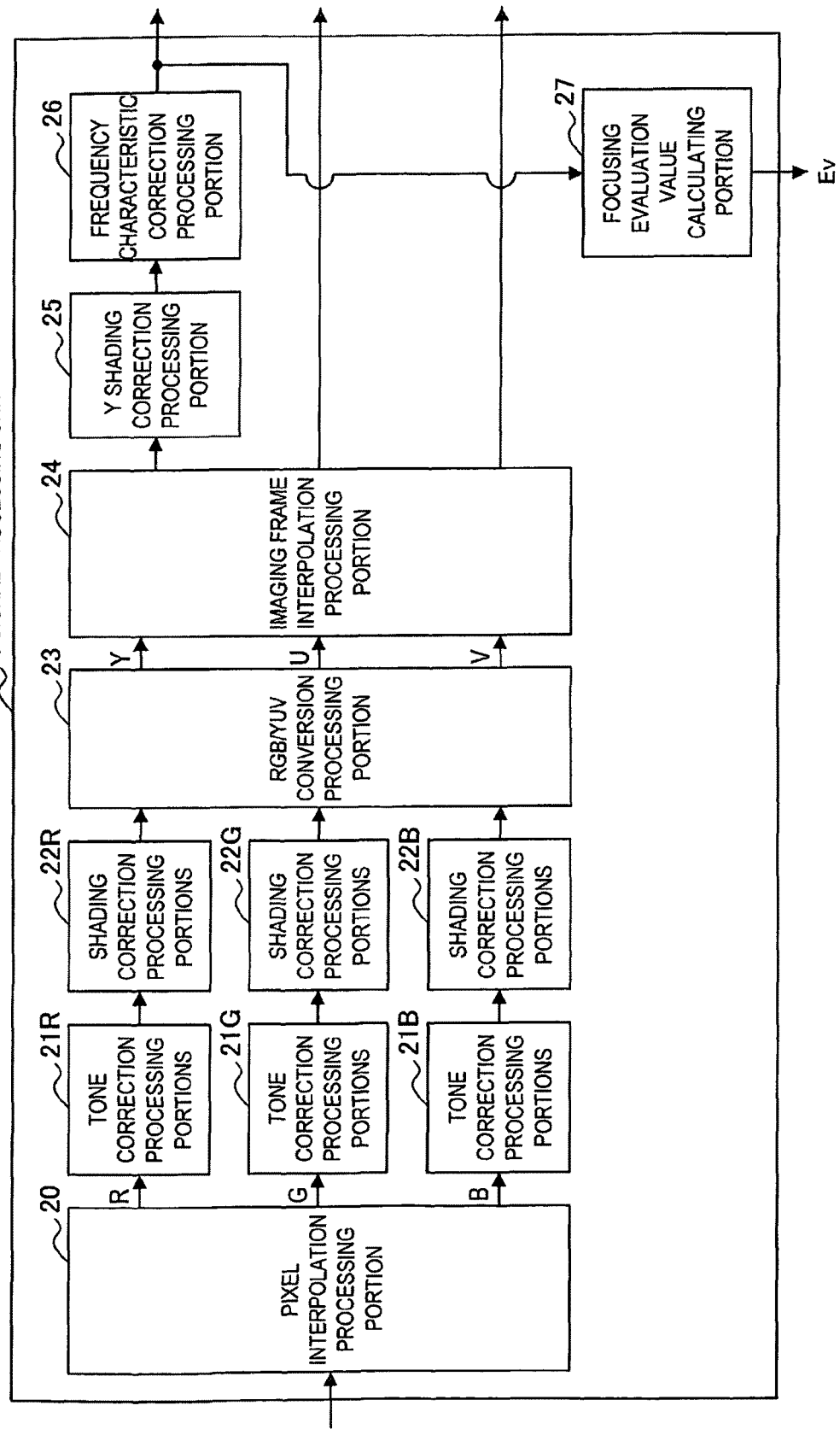
FIG. 2 is a block diagram showing a configuration example of the interior of a signal processing unit according to the embodiment.

A configuration example of the interior of the signal processing unit 6 will now be described with reference to FIG. 2. As shown in FIG. 2, the signal processing unit 6 includes a pixel interpolation processing portion 20, tone correction processing portions 21R, 21G, 21B, shading correction processing portions 22R, 22G, 22B, a RGB/YUV conversion processing portion 23, an imaging frame interpolation processing portion 24, a Y shading correction processing portion 25, a frequency characteristic correction processing portion 26, and a focusing evaluation value calculating portion 27.

The pixel interpolation processing portion 20 of FIG. 2 performs the pixel interpolation process on each imaged image data (R image data, G image data, B image data) by R, G, B obtained through the pre-processing unit 5. The R image data performed with the pixel interpolation process by the pixel interpolation processing portion 20 is provided to the tone correction processing portion 21R, the G image data is provided to the tone correction processing portion 21G, and the B image data is provided to the tone correction processing portion 21B.

The tone correction processing portions 21R, 21G, 21B perform the tone correction process (e.g., compression from 12 bits to 8 bits) on the provided image data. The R image data processed by the tone correction processing portion 21R is provided to the shading correction processing portion 22R, the G image data is provided to the shading correction processing portion 22G, and the B image data is provided to the shading correction processing portion 22B.

The shading correction processing portions 22R, 22G, 22B perform the process of correcting luminance variation (shading) caused by the characteristics of the imaging optical system and the image sensor 4 that appear as lowering of light quantity at the periphery of the image with respect to the provided image data.

The RGB/YUV conversion processing portion 23 generates image data (Y image data) serving as a Y signal (luminance signal), image data (U image data) serving as a U signal (B-Y), and image data (V image data) serving as a V signal (R-Y) based on the R image data, the G image data, and the B image data respectively processed by the shading correction processing portion 22R, 22G, 22B. In this case, the sampling ratio of Y, U, V is set such that U and V are smaller than Y such as Y:U:V=4:2:2.

The imaging frame interpolation processing portion performs the frame interpolation process on the Y image data, the U image data, and the V image data obtained by the RGB/YUV conversion processing portion 23. The U image data, the V image data processed by the imaging frame interpolation processing portion 24 are output to the bus 14 shown in FIG. 1. The Y image data processed by the imaging frame interpolation processing portion 24 is provided to the Y shading correction processing portion 25.

The Y shading correction processing portion 25 performs the shading correction process on the Y image data processed by the imaging frame interpolation processing portion 24. The frequency characteristic correction processing portion 26 performs the frequency characteristic correction process serving as a high pass correction (contour correction) process on the Y image data processed by the Y shading correction processing portion 25. The Y image data processed by the frequency characteristic correction processing portion 26 is provided to the focusing evaluation value calculating portion 27.

The focusing evaluation value calculating portion 27 calculates a focusing evaluation value Ev that becomes an evaluation index in searching the focused position from the Y image data processed by the frequency characteristic correction processing portion 26. Specifically, the focusing evaluation value calculating portion 27 calculates the magnitude of the high frequency component of the Y image data as the focusing evaluation value Ev. The focusing evaluation value Ev calculated by the focusing evaluation value calculating portion 27 is provided to the CPU 11 as shown in FIG. 1.

Returning to FIG. 1, the description will be continued. The AF element 7 is configured by a line sensor and the like, and is used to detect whether the subject is focused. The detection signal of the AF element 7 is input to the CPU 11, which CPU 11 controls the AF process based on the detection signal, and instructs the mirror drive circuit 8 to control the deformed state of the deforming mirror so that the desired subject is focused. The AF element 7 is generally arranged in a high performance camera such as a single lens reflex camera, but the AF element 7 may be omitted in the digital still camera. In this case, the CPU 11 may control the AF process based on the focusing evaluation value Ev obtained by processing the imaged image signals by the signal processing unit 6.

The mirror drive circuit 8 adjusts the focal position by driving the deforming mirror device 2 and changing the deformed state of the deforming mirror device 2 based on the instruction from the CPU 11. The details on the drive of the deforming mirror device 2 will be hereinafter described.

The aperture control unit 9 controls the opening of the aperture 3 based on the instruction from the CPU 11 to adjust the exposure amount of the subject image to an appropriate value.

The imaging control unit 10 is configured by a timing generator (TG), and controls an electronic shutter speed of the image sensor 4 based on the instruction from the CPU 11. The imaging control unit 10 generates an operation pulse for the image sensor 4. For instance, the imaging control unit 10 generates various types of pulses such as 4-phase pulse for vertical transfer, field shift pulse, 2-phase pulse for horizontal transfer, and shutter pulse, and provides the same to the image sensor 4. The image sensor 4 is driven (electronic shutter function) by the imaging control unit 10.

The CPU 11 functions as a control unit for controlling each unit of the imaging device 1. A memory unit 12 is arranged with respect to the CPU 11, which memory unit includes ROM (Read Only Memory), RAM (Random Access Memory), flash memory, and the like.

The CPU 11 performs various calculation processes according to the program stored in the memory unit 12, and exchanges control signals and the like with each unit through the aperture control unit 9, the imaging control unit 10, the mirror drive circuit 8, and the bus 14 to cause each unit to execute the desired operation.

For instance, control is made such that an appropriate aperture value is obtained by instructing the aperture control unit 9 to drive the aperture 3 based on the information of the light quantity of the imaged signal detected by the pre-processing unit 5. The mirror drive circuit 8 may be instructed based on the focusing evaluation value Ev acquired from the focusing evaluation value calculating portion 27 of the signal processing unit 6, described above to control the deformed state of the deforming mirror device 2. The focal position of the imaging optical system thus can be changed, and the imaging processes such as the AF process, the subject detection process, the multifocus imaging process, the entire area focus imaging process, the subject imaging process, and the bracket image process can be controlled, which will be hereinafter described.

The memory unit 12 (e.g., ROM) arranged in association with the CPU 11 stores the program for causing the CPU 11 to execute various types of control processes, where the CPU 11 executes the desirable calculation/control process for each control based on such program.

The program according to the present embodiment is a program for causing the CPU 11 to execute various types of controls of the CPU 11. The program may be stored in advance in the storage device (HDD, ROM, flash memory etc.) built in the imaging device 1. The program may be stored in a removable recording medium including an optical disc such as CD, DVD, and blu-ray disc, or a memory card and provided to the imaging device 1, or may be downloaded to the imaging device 1 through a network such as LAN and Internet.

The operation input unit 13 includes an operator such as a key, a button, a dial, and a touch panel. For instance, the operation input unit 13 includes operators for performing various operation instructions and information input such as an operator for instructing power ON/OFF, a release operator (release button) for instructing the start of recordation of the imaged image, a zoom adjustment operator, and a touch panel used as an image position specifying means such as selection of the subject to be focused. The release button functions to enable the user to input the detection instruction for AF or subject detection and the release instruction. For instance, the detection instruction is input by pressing the shutter button to the middle (half-press), and the release instruction is input by pressing the shutter button to the end (full-press). The operation input unit 13 provides the information obtained from such operator to the CPU 11, and the CPU 11 performs the desirable calculation process and control corresponding to such information.

The compression/expansion processing unit 16 performs a compression/expansion process on the image data input through the bus 14 such as the image compression/expansion process complying with the MPEG (Moving Picture Experts Group) method. When recording the image data obtained by imaging in the storage unit 17, the compression/expansion processing unit 16 compresses the image data to reduce the amount of data. When reproducing the image data recorded in the storage unit 17, the compress/expansion processing unit 16 expands the image data and transmits the same to the display unit 15, etc.

The storage unit 17 is used to save the image data and other various types of data. The storage unit 17 may be configured by a semiconductor memory such as a flash memory, or may be configured by a HDD (Hard Disc Drive). The storage unit 17 may not be configured by a recording medium built in the imaging device 1, but by a recording/reproducing drive corresponding to a removable recording medium removable with respect to the imaging device 1, for instance, a recording medium such as memory card with built in semiconductor memory, an optical disc, a magnetic optical disc, and a hologram memory. Both the built-in type memory and the recording/reproducing drive with respect to the removable recording medium may be mounted. The storage unit 17 records/reproduces the image data and other various types of data input through the bus 14 based on the control of the CPU 11.

The display unit 15 includes a display panel portion such as a liquid crystal display and a display drive portion for displaying and driving the display panel portion. The display drive portion is configured by a pixel drive circuit for displaying various types of display data input through the bus 14 on the display panel portion. The pixel drive circuit applies a drive signal based on the image signals for each pixel arranged in a matrix form in the display panel portion at predetermined horizontal/vertical drive timing to execute the display. An image position specifying means such as a touch panel may be juxtaposed to the display panel of the display unit 15.

In time of imaging, the image data output from the signal processing unit 6 is provided to the compression/expansion processing unit 16 and the compression processed image data is generated in the compression/expansion processing unit 16 based on the control of the CPU 11 in response to the release instruction. The storage unit 17 then records the compression processed compressed image data in the recording medium based on the control of the CPU 11. In time of imaging, the CPU 11 performs a control such that the image data output from the signal processing unit 6 is provided to the display unit 15, so that the imaged image data obtained from the image signals imaged by the image sensor 4 is displayed (live view image) in real time on the display unit 15. The user can check the imaging range (field angle), the pattern of the subject, etc. and decide on an appropriate photo opportunity by looking at the live view image.

When a reproducing instruction of the compressed image data recorded in the storage unit 17 is made, the CPU 11 controls the storage unit 17 and reproduces the specified compressed image data, and then expands the reproduced compressed image data in the compression/expansion processing unit 16. The CPU 11 performs a control such that the expanded image data is displayed on the display unit 15.

[Configuration of Deforming Mirror]

Figure 3:
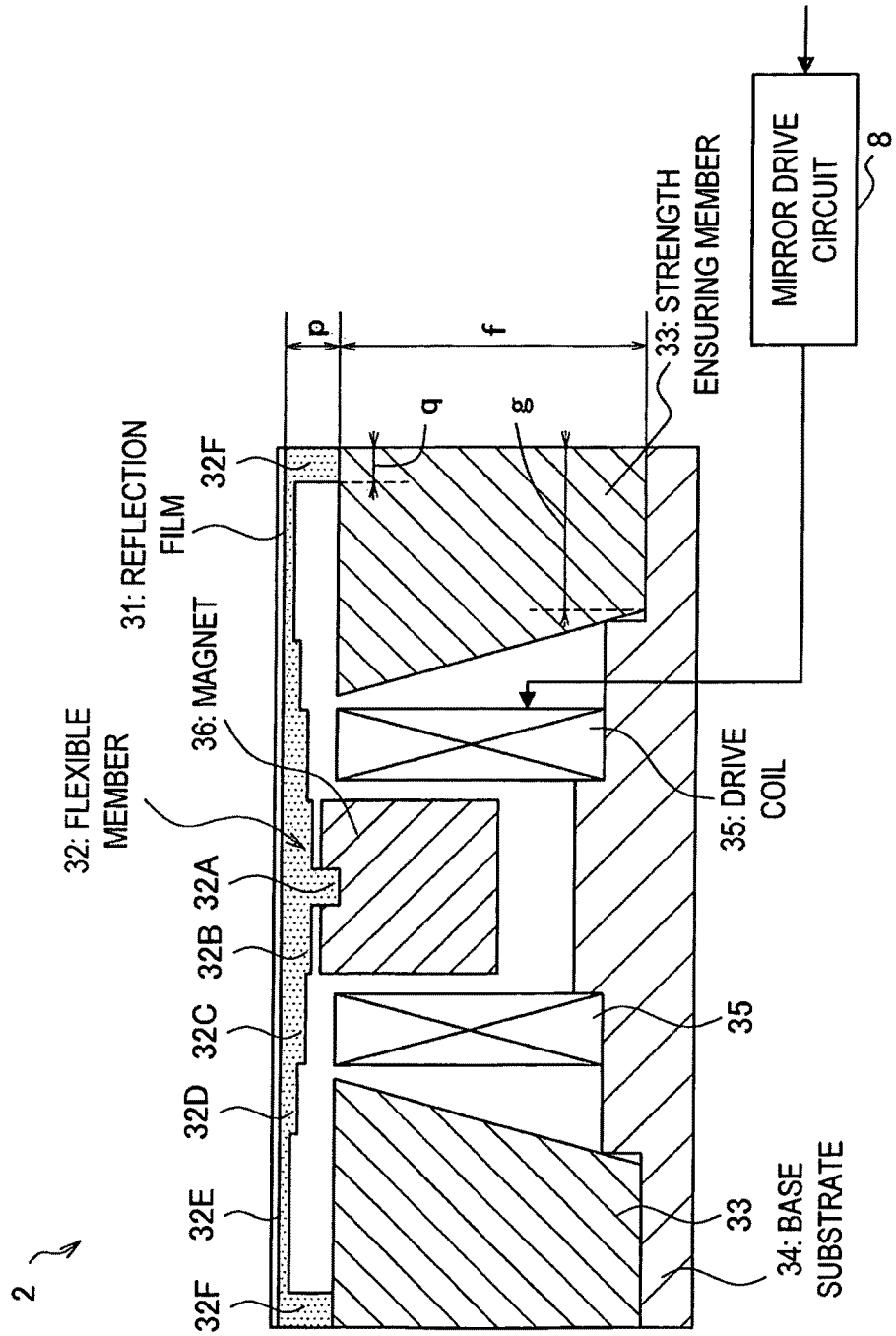
FIG. 3 is a cross-sectional view showing a configuration of a deforming mirror device according to the embodiment.

The configuration and the operation of the deforming mirror device 2 shown in FIG. 1 will now be described with reference to FIG. 3. FIG. 3 is a cross-sectional view showing the configuration of the deforming mirror device 2 according to the present embodiment. The mirror drive circuit 8 shown in FIG. 1 is also shown in FIG. 3 along with the deforming mirror device 2.

As shown in FIG. 3, the deforming mirror device 2 includes a flexible member 32, a reflection film 31 formed on the surface, a magnet 36 having the flexible member 32 fixed on a surface on the opposite side of the mirror surface formed with the reflection film 31, a base substrate 34, a drive coil fixed on the base substrate 34 side, and a strength ensuring member 33 arranged to be inserted between the flexible member 32 and the base substrate 34.

The flexible member 32 is a member having flexibility, and silicon etc. can be used for the material. The flexible member 32 has a plane shape of a substantially elliptical shape. The reflection film 31 is film attached to the surface to become the mirror surface of the flexible member 32. Although not shown, the flexible member 32 is formed with a plurality of elliptical portions 32A, 32B, 32C, 32D, and 32E having the same center at the surface to become the back side of the mirror surface. Regarding the plurality of elliptical portions 32A to 32E, the elliptical portion 32A at the center part is the thickest, and then the thickness becomes thinner in the order of the elliptical portion 32B formed on the outer peripheral side thereof, the elliptical portion 32C formed further on the outer peripheral side, the elliptical portion 32D formed more further on the outer peripheral side, and the elliptical portion 32E formed further on the outer peripheral side. That is, the cross-sectional shape of the flexible member 32 is a shape in which the thickness becomes thinner in a stepwise manner from the center in the outer peripheral direction.

A rib-shaped frame 32F is formed to an annular shape at the outer periphery of the elliptical portion 32E, so that sufficient strength can be ensured such that the frame 32F does not deform even if the driving force in the vertical direction (up and down direction of FIG. 3) is applied to the flexible member 32.

The flexible member 32 is a portion (variable portion) where the elliptical portion 32A to the elliptical portion 32E deform as the deforming mirror. That is, the flexible member 32 has a predetermined shape such that the shape of the mirror surface changes according to the driving force in the vertical direction uniformly applied to the elliptical portion 32A at the center in accordance with the formation pattern of the elliptical portion 32A to the elliptical portion 32E of different thickness. The desired strength distribution can be provided to the flexible member by forming the pattern of different cross-sectional thickness. In this regards, the pattern formed by differing the cross-sectional thickness is called the strength distribution pattern. In this case, the pattern by the elliptical portions 32A to 32E is called the strength distribution pattern.

The frame 32F is formed on the outer peripheral part of the elliptical portion 32A to the elliptical portion 32E serving as the variable portion, which frame 32F has a sufficient strength that does not deform even with respect to the application of the driving force. Thus, the outermost peripheral portion of the flexible member 32 is maintained to a strength that does not deform even with respect to the application of the driving force by the frame 32F. Thus, the shape change mode corresponding to the driving force of the variable portion including the elliptical portion 32A to the elliptical portion 32E can be more easily adapted to the ideal shape change mode. That is, compared to when the outermost peripheral portion of the flexible member 32 deforms, the flexible member 32 including the frame 32F can bring the shape change mode with respect to the driving force closer to an ideal mode at higher accuracy.

In this case, the reason the strength distribution pattern is formed by an elliptical shape is because the deforming mirror device 2 is used with the mirror surface inclined 45 degrees, as shown in FIG. 1. In this case, the spot of the incident light at the mirror surface has an elliptical shape. Specifically, an elliptical shape in which the ratio of the diameter in the longitudinal direction of the spot and the diameter in the direction orthogonal to the longitudinal direction is approximately $1:\sqrt{2}$ is obtained. Therefore, since the spot shape of the incident light on the mirror surface has an elliptical shape, the strength distribution pattern has an elliptical shape to perform satisfactory focus control.

According to the previous description, each elliptical portion 32A to 32E is arranged to have the same center for the strength distribution pattern. Thus, when the driving force is applied to the flexible member 32, the stress can be prevented from being concentrated at one part, and cracks and fatigue breakage of the flexible member 32 can be effectively prevented.

If a predetermined driving force is applied to the flexible member 32 to deform the mirror surface, an internal stress generates in the flexible member 32. In this case, if a portion where the stress concentrates at one point exists in the flexible member 32, such portion becomes the portion where the dimension rapidly changes if the flexible member 32 is made of material having homogeneity and isotropy. For instance, in the pattern in which each elliptical portion does not have the same center, the interval in the specific direction narrows or widens. The portion where the interval narrowed becomes the portion where the stress is likely to concentrate compared to other portions, and the portion where the dimension rapidly changes with respect to the application of a uniform driving force.

If the portion where the stress concentrates exists, the possibility of exceeding the tolerable stress of the flexible member 32 increases at the relevant portion and the possibility of causing cracks increases therewith. The fatigue breakage at the relevant portion may occur if the deformation of the flexible member 32 is repeatedly performed.

Through patterning so chat each elliptical portion 32A to 32E has the came center as in the present example, the interval of the pattern becomes even so that the portion where the stress concentrates at one part does not exist. The cracks and fatigue breakage are thereby prevented.

The description will now return to FIG. 3. In FIG. 3, the flexible member 32 is fixed with a circular columnar magnet 36 with respect to the elliptical portion 32A formed at the central part. A recess for fitting and positioning the elliptical portion 32A is formed at the central part of the magnet 36, so as to be strongly fixed by adhesive and the like with the recess fitted to the elliptical portion 32A.

The flexible member 32 has the frame 32F formed on the outermost peripheral part, as shown in the figure, fixed with respect to the strength ensuring member 33. Pyrex glass (Pyrex: registered trademark) etc. is chosen for the material of the strength ensuring member 33. In other words, the material having higher rigidity than the flexible member 32 is chosen. The strength ensuring member 33 has an outer shape of a quadratic prism shape having a tapered hole passed through the central part. The strength ensuring member 33 has the dimension of the outer diameter of the two upper and lower surfaces including a portion bored by the tapered hole match the outer peripheral dimension of the surface formed with the mirror surface of the flexible member 32. The frame 32F of the flexible member 32 is fixed to one of the two surfaces. In this case, the flexible member 32 and the strength ensuring member 33 are fixed such that the respective center axis are coaxially arranged. The frame 32F is thus fixed with respect to the portion at the periphery of the hole in the strength ensuring member 33.

The base substrate 34 includes a surface which dimension of the outer shape is the same dimension as the surface formed with the mirror surface of the flexible member 32. A groove for positioning and fixing the surface on the opposite side of the surface fixed with the flexible member 32 of the strength ensuring member 33 is formed at the outermost peripheral part in the surface having the same dimension. Specifically, a circular projection having a diameter substantially equal to the inner diameter of the tapered hole at the surface on the opposite side of the flexible member 32 of the strength ensuring member 33 is formed on the base substrate 34. The center of the base substrate 34 and the center of the strength ensuring member 33 are coaxially arranged by positioning and fixing the strength ensuring member 33 at the groove involved in the formation of the projection.

Furthermore, a circular positioning projection for fitting the inner wall of the drive coil 35 is formed at a center part in the base substrate 34. Specifically, the projection is formed such that the center thereof is coaxial with the center of the base substrate 34, and the outer diameter is set to a size capable of fitting the inner wall of the drive coil 35. The drive coil 35 is fitted to and fixed to the base substrate side 34 by the projection. The outer surface of the magnet 36 and the inner surface of the drive coil 35 are spaced apart at equal distance over the entire periphery, and the center of the magnet 36 and the center of the drive coil 35 are coaxially arranged. Furthermore, the supply line of the drive signal from the mirror drive circuit 8 is connected to the drive coil 35, as shown in the figure.

In the present embodiment, the thickness (height) p in the lengthwise direction of the frame 32F of the flexible member 32 shown in FIG. 3 and the height (thickness) in the lengthwise direction of the elliptical portion 32A formed at the center part of the flexible member 32 are set to the same value. For the thickness (height) in the same lengthwise direction, the height f of the strength ensuring member 33 is set to be longer than the height p of the frame 32F of the flexible member 32.

With respect to the thickness (width) in the crosswise direction, at least q<g is set where q is the width of the frame 32F and g is the width of the strength ensuring member 33 (hole of the strength ensuring member 33 in this case has a tapered shape, and thus is a value of the narrower width). The lengthwise direction is the direction orthogonal to the mirror surface. The crosswise direction is the direction orthogonal to the lengthwise direction and parallel to the mirror surface.

Needless to say, the dimension of the tapered hole formed in the strength ensuring member 33 is to be set to ensure a space where the drive coil 35 can be inserted in advance. In deformation of the flexible member 32, a predetermined shape change of the mirror surface may not be achieved if the flexible member 32 and the drive coil 35 interfere. Thus, the thickness f in the lengthwise direction of the strength ensuring member 33 is set such that a sufficient clearance is ensured between the drive coil 35 and the flexible member 32.

The operation of the deforming mirror device 2 configured as above will be described below. In the deforming mirror device 2, the drive signal from the mirror drive circuit 8 is provided to the drive coil 35. When the drive signal is provided and current is carried to the drive coil 35, a magnetic field corresponding to the current-carrying level generates, and the magnet 36 arranged on the inner side of the drive coil 35 receives a repulsive force according to the generated magnetic field. In this case, the repulsive force generates in the vertical direction since the magnet 36 is polarized in the axial direction of the circular column. A uniform driving force in the vertical direction corresponding to the level of the drive signal is thus applied to the center part of the flexible member 32 fixed with the magnet 36.

Thus, the driving force is applied to the center part of the flexible member 32 by providing the drive signal from the mirror drive circuit 8 to the drive coil 35, and moving the magnet 36 in the vertical direction with respect to the mirror surface of the flexible member 32 by the drive coil 35. The mirror surface of the deforming mirror (i.e., portion of elliptical portion 32A to 32E) of the deforming mirror device 2 thus can be deformed to a convex shape or a concave shape according to the size and the direction of the driving force. The change to convex shape or the concave shape is obtained by changing the polarity of the drive signal provided to the drive coil 35.

When performing the focus control using the deforming mirror device 2, adjustment is to be made on the target focus in the respective driving state when the driving force to be applied on the flexible member (i.e., level of the drive signal provided to the drive coil 35: drive signal value) is changed.

That is, the target deformed shape of the deforming mirror is to be obtained in the respective driving state.

In the deforming mirror device 2 of the above-described configuration, the setting on how the mirror surface changes in each driving state (i.e., according to the amount of deformation in the vertical direction of the elliptical portion 32A at the center of the flexible member 32) is carried out by the setting of the formation pattern of the strength distribution pattern. The determination of the strength distribution pattern for adjusting to the target focus at the respective driving state is performed using a FEM (Finite Element Method) simulation tool and the like.

The configuration and the operation of the deforming mirror device 2 according to the present embodiment have been described above. The focal position can be accurately adjusted at high speed compared to a focus control mechanism of approaching/separating the normal focus lens to the imaging lens by performing the focus control (change of focal position) using the deforming mirror device 2.

As described above, the focal position is desirably changed at high speed to perform the multifocus imaging process in the present embodiment. In this case, it is difficult to instantaneously change the focal position when motor driving the focus lens and adjusting the focal position as in the focus mechanism of the related art.

The deforming mirror device 2 according to the present embodiment, on the other hand, can operate at high speed as it is small, compared to the mechanical focus mechanism of the related art. Thus, the focal position can be adjusted by microscopically changing the cross-sectional shape of the mirror surface (flexible member 32) by using the deforming mirror device 2 as the focus mechanism, and thus the focal position can be changed at very high speed. Therefore, in the multifocus imaging process, the focal position can be changed at high speed in the focusable range when being changed in a stepwise manner to a great number of changing positions in response to the release instruction. The user can thus acquire the image data of a great number of different focal positions at high speed at the timing of making one release instruction in consideration of the photo opportunity, and thus will not miss the photo opportunity in the multifocus imaging process.

[Method of Changing Focal Position]

The method of changing the focal position in the imaging device 1 according to the present embodiment will now be described in detail.

Figure 4:
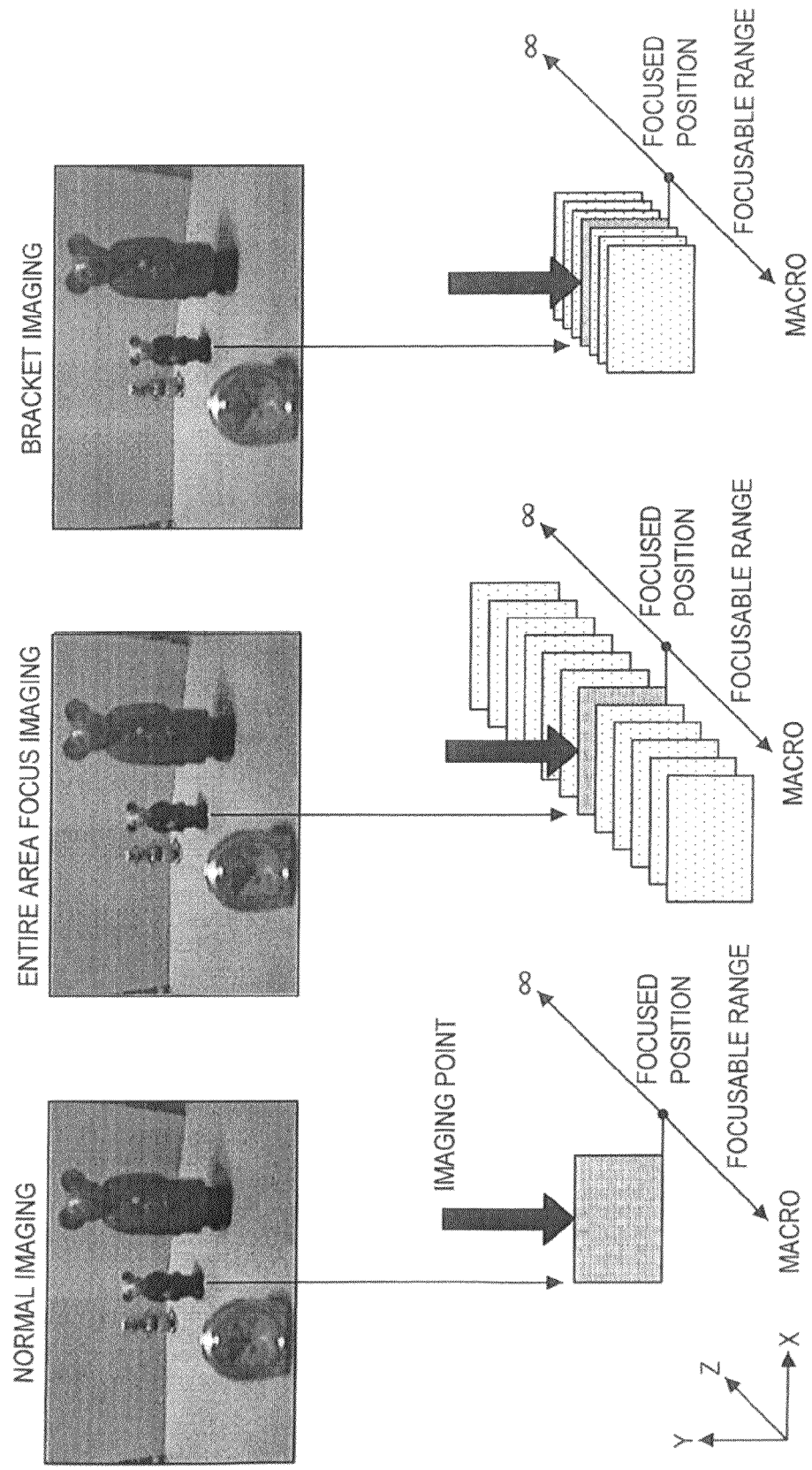
FIG. 4 is a schematic view schematically showing an imaging process by the imaging device according to the embodiment.

First, the outline of the imaging process using the imaging device 1 according to the present embodiment will be described with reference to FIG. 4. FIG. 4 is a schematic view schematically showing an imaging process by the imaging device 1 according to the present embodiment.

As shown in FIG. 4, the imaging device 1 according to the present embodiment can execute a normal imaging process, an entire area focus imaging process, and a bracket imaging process. The user can setting change the imaging process performed by the imaging device 1 by switching the imaging mode of the imaging device 1 between the normal imaging mode and the multifocus imaging mode (more specifically, entire area focus imaging mode, bracket imaging mode).

In the normal imaging process, the imaging device 1 performs the AF process of focusing on the subject (imaging point) desired by the user in response to the detection instruction (e.g., half-press of release button). Thereafter, the imaging device 1 images the subject image in which the subject is focused, and records only one image data in response to the release instruction (e.g., full-press of release button). In this case, the focal position corresponding to the focused subject becomes the focused position. The focused position can be set to an arbitrary position in the focusable range from the shortest distance side (macro) to the infinity side ($\infty$).

In the entire area focus imaging process, the imaging device 1 sequentially images the subject image while automatically changing the focal position in a stepwise manner (step-form) over the entire area of the focusable range and records a plurality of image data in response to one release instruction. The multifocus imaging process may be performed without focusing on any subject, but may be performed with the focused position on a desired subject detected in the AF process etc. in advance. The plurality of image data focused on all subjects from the macro side to the infinity side in the imaging range can be obtained by such multifocus imaging process.

In the bracket imaging process, the imaging device 1 performs the AF process of focusing on the subject desired by the user and detects the focused position in response to the detection instruction (e.g., half-press of release button). The imaging device 1 periodically images the subject image while automatically shifting the focal position in fine steps at the vicinity of the focused position, and records a plurality of image data. Thereafter, the imaging device 1 images at the focused position and records the image data for one image in response to the release instruction. According to such bracket imaging process, the image data imaged at the focal position near the focused position can be obtained from when the AF process is performed until the release. Therefore, the image data accurately focused on the desired subject can be acquired without mistake even if the focused position detected in the AF process is shifted.

Therefore, in the entire area focus imaging process and the bracket imaging process, and furthermore, in the subject imaging process (not shown), imaging is performed while changing the focal position in multistage. Thus, the focal position is desirably accurately changed at high speed.

Figure 5:
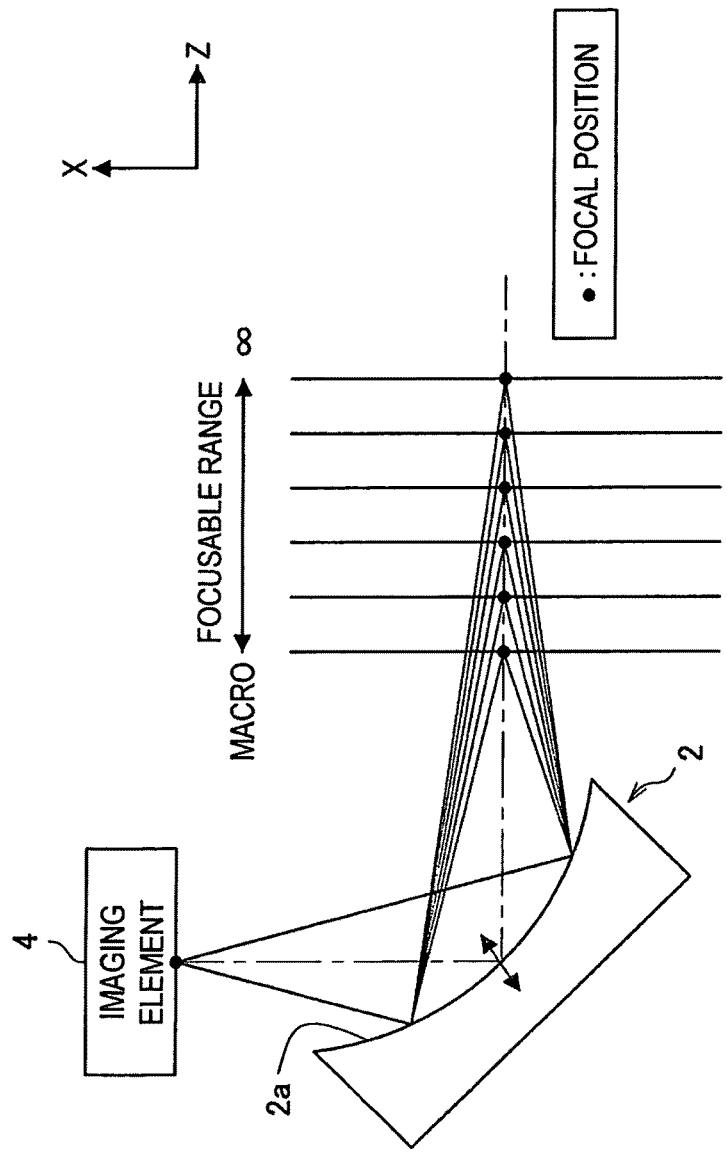
FIG. 5 is a schematic view showing the change of the focal position using the deforming mirror device according to the embodiment.

The changing of the focal position using the deforming mirror device 2 described in FIG. 3 will be described with reference to FIG. 5. FIG. 5 is a schematic view showing the change of the focal position using the deforming mirror device 2 according to the present embodiment.

As shown in FIG. 5, the focal position can be changed by changing the shape of the mirror surface (reflection surface) 2a of the deforming mirror device 2. For instance, the focal position can be changed to the close-distance side (macro side) by having the concave shape of the mirror surface 2a deep, and the focal position can be changed to the long-distance side (infinity side) by having the concave shape of the mirror surface 2a shallow. The subject far from the imaging device 1 can be focused by changing the focal position to the long-distance side, and the subject close to the imaging device 1 can be focused by changing the focal position to the close-distance side. In this case, restriction is imposed on the shape of the mirror surface 2a that can be physically changed by the deforming mirror device 2, whereby the range the focal position can be changed, that is, the focusable range is defined by such restriction.

As described above, the focal position can be changed by approaching/separating the motor driven focus lens with respect to the image sensor using the focus mechanism of the related art. However, a long time of a about a few seconds is required to move the focal position from the shortest distance side to the infinity side in the focus mechanism of the related art. In the present embodiment, on the other hand, the focal position can be changed at significantly high speed by using the deforming mirror device 2 as the focus mechanism compared to the focus mechanism of the related art. For instance, a short time of less than one second is required to move the focal position from the shortest distance side to the infinity side, and a few dozen (e.g., 30) multifocus images can be acquired in such short time.

Figure 6:
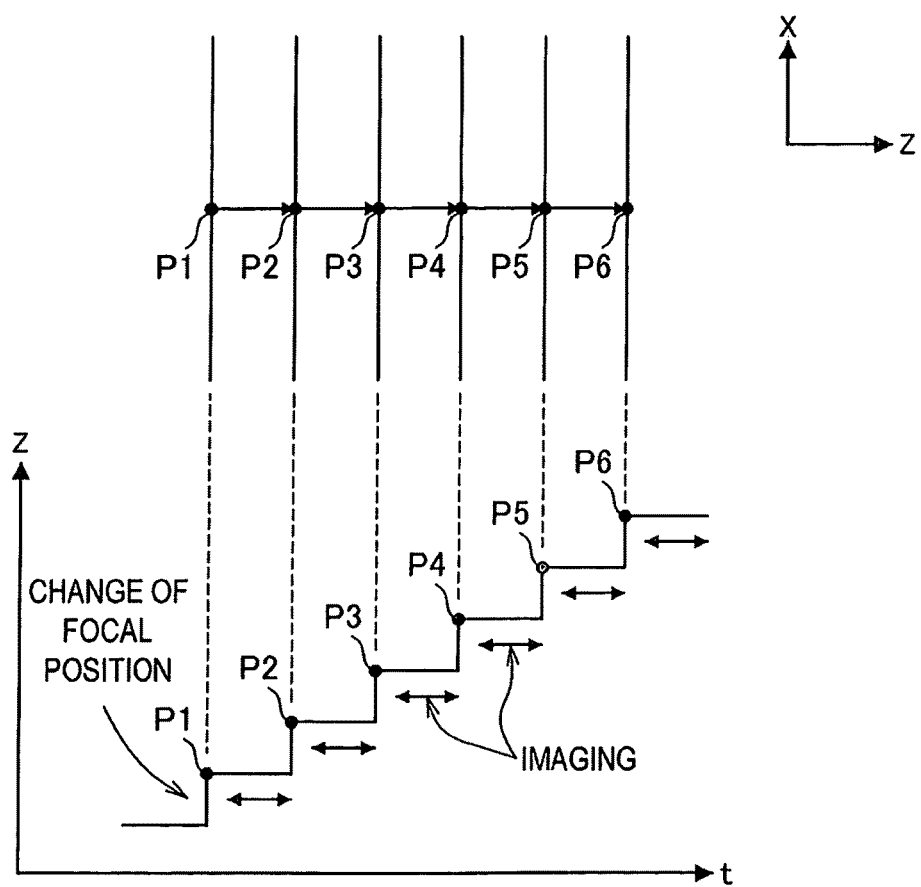
FIG. 6 is an explanatory view showing the change of the focal position according to the embodiment.
Figure 7:
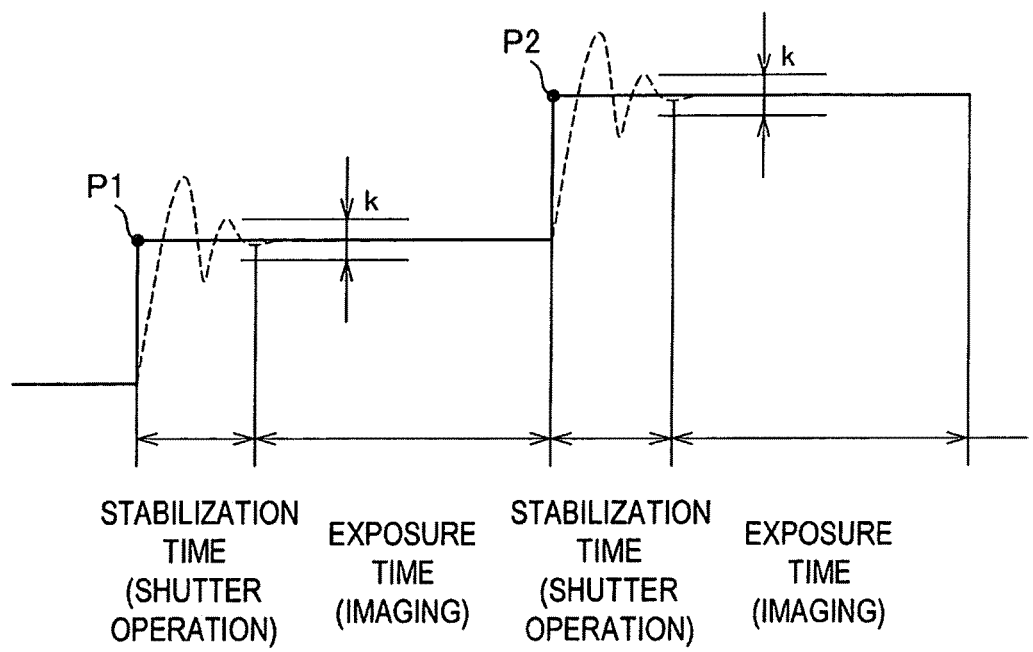
FIG. 7 is a partially enlarged view of the lower diagram of FIG. 6.

The details of the focus control for changing the focal position in a stepwise manner according to the present embodiment will be described with reference to FIG. 6 and FIG. 7. FIG. 6 is an explanatory view showing the change of the focal position according to the present embodiment. FIG. 7 is a partially enlarged view of the lower diagram of FIG. 6.

As shown in FIG. 6, the focal position is changed in a stepwise manner (step-form) using the deforming mirror device 2 in the imaging device 1 according to the present embodiment. In the example of FIG. 6, the focal position is changed in six steps in the order of positions P1, P2, P3, P4, P5, P6 towards the infinity side in the depth direction (Z-axis direction) of the imaging space. The imaging device 1 images the subject image with the image sensor 4 with the focal position fixed every time the focal position is changed by one step, and records the image data focused on the focal position.

Specifically, as shown in FIG. 7, the shutter operation of the image sensor 4 is performed to image the subject image at a predetermined exposure time for every step of changing the focal position in a stepwise manner. In this case, the time of one step of changing the focal position corresponds to the sum of the electronic shutter speed of the image sensor 4, the stabilization time, and the exposure time. The stabilization time is the time until stabilizing to a new focal position after the start of movement of the focal position (shown with a dotted line in FIG. 7), specifically the time until stabilizing to smaller than or equal to a predetermined shift tolerable range k. The exposure time is the time for the exposure of imaging by the imaging device 1.

The method of changing the focal position in a stepwise manner in the focus control according to the present embodiment has been described in detail above. The present invention is not limited to an example of changing the focal position in a stepwise manner as in the present embodiment. For instance, the subject image may be imaged over plural times by the image sensor 4 at a predetermined timing in the middle of changing while continuously (stepless manner) changing the focal position. Thus, the multifocus imaging may be performed to obtain the plurality of image data imaged at different focal positions while continuously changing the focal position.

Figure 8:
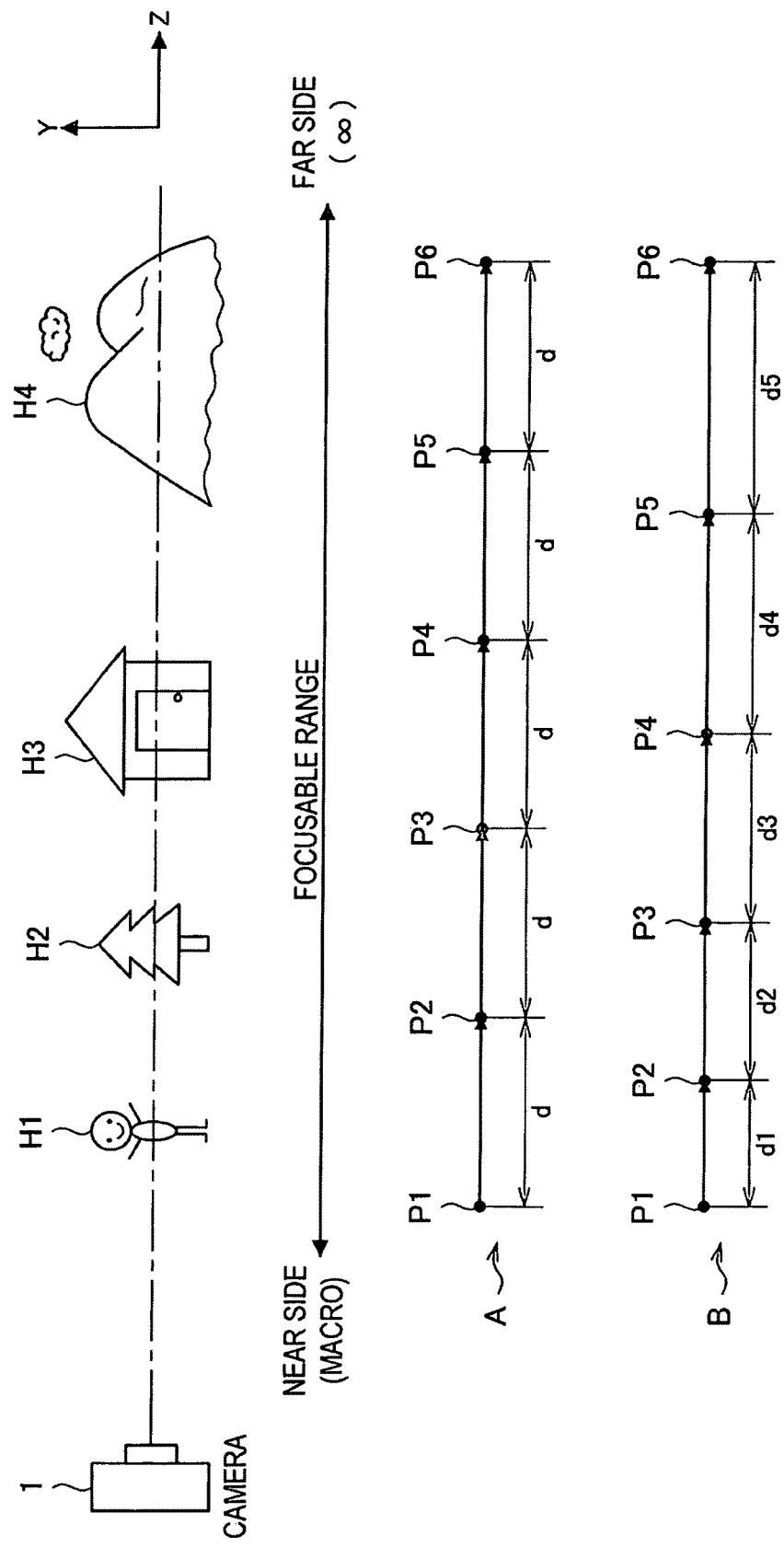
FIG. 8 is a schematic view for describing the setting of the changing position of the focal position in the imaging device according to the embodiment.

The setting of the changing position of the focal position of when changing the focal position in a stepwise manner in the imaging device 1 according to the present embodiment will be described with reference to FIG. 8. FIG. 8 is a schematic view for describing the setting of the changing position of the focal position in the imaging device 1 according to the present embodiment.

As shown in FIG. 8, a case where a plurality of subjects H1 to H4 in the focusable range from the macro to the infinity will be considered. In this case, focus is to be made in the image data of at least one image with respect to each subject H1 to H4 when acquiring a plurality of image data with different focal positions through the multifocus imaging.

When changing the focal position in a stepwise manner in the focusable range, the focal position may be linearly changed at equal interval as shown in A of FIG. 8, or the focal position may be changed with the changing amount of the focal position varied as shown in B of FIG. 8.

In the example of A of FIG. 8, the focal position is changed in a stepwise manner to the changing positions P1, P2, P3, P4, P5, P6, and the changing amount of the focal position (i.e., distance between adjacent focal positions) is a constant value d. Thus, the position control of the focal position becomes easy by changing the focal position at equal interval in the Z-axis direction, but the number of times to change the focal position increases to focus on all the subjects H1 to H4 in the focusable range, as hereinafter described.

In the example of B of FIG. 8, on the other hand, the focal position is changed in a stepwise manner to the changing positions P1, P2, P3, P4, P5, P6, and the changing amount of the focal position (i.e., distance between the adjacent focal positions) is variable values d1 to d5. In this case, the changing amount of the focal position becomes greater (d1<d2<d3<d4<d5) towards the long-distance side. This is because the depth of field of the imaging optical system is shallow on the close-distance side and deep on the long-distance side, and thus the image focused on the subject at an arbitrary position can be obtained even if the changing amount of the focal position is increased on the long-distance side. The setting of the focal position according to the depth of field will be specifically described below.

Figure 9:
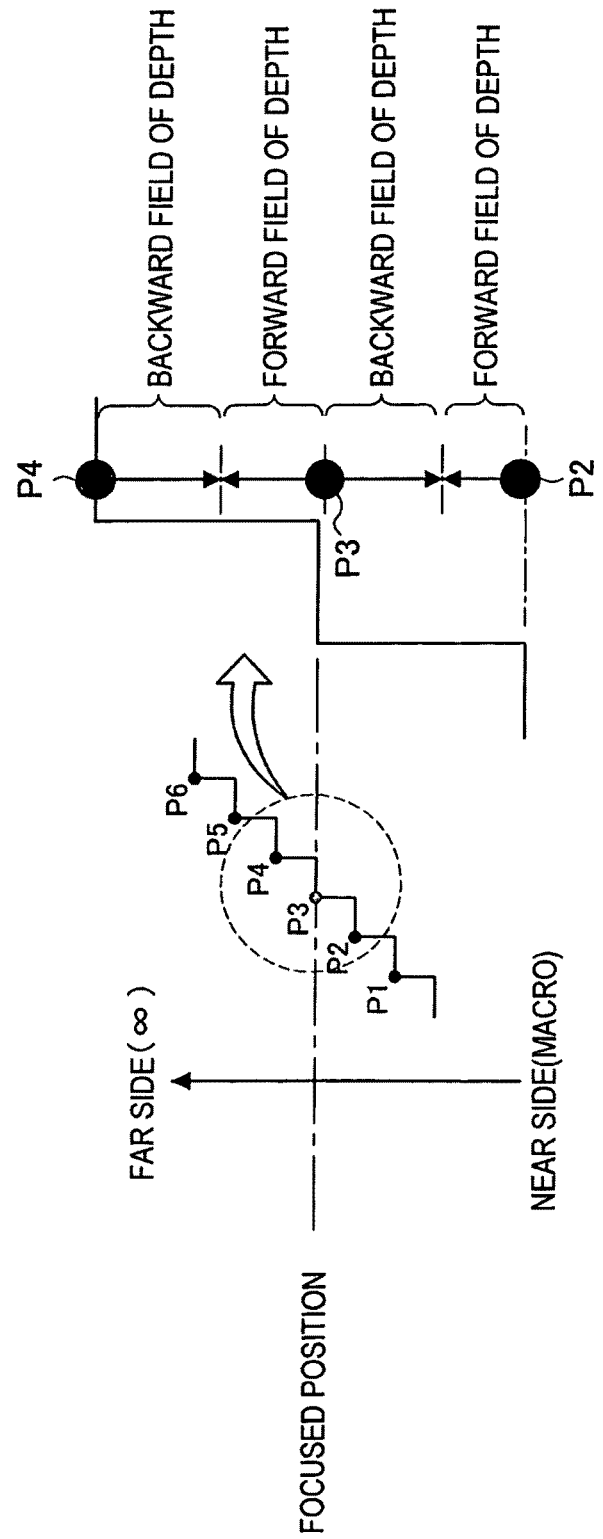
FIG. 9 is a schematic view for describing the depth of field for every focal position according to the embodiment.

The depth of field will be specifically described with reference to FIG. 9. FIG. 9 is a schematic view for describing the depth of field for every focal position according to the present embodiment.

As shown in FIG. 9, assume the position P3 is the focused position, for example, when changing the focal position in a stepwise manner from position P1 to position P6. In this case, the range focused on the close-distance side (macro) of the position P3 is referred to as a rear depth of field, and the range focused on the long-distance side (infinity side) of the position P3 is referred to as a front depth of field. The range combining the front depth of field and the rear depth of field is the depth of field. When the focused position is at the position P3, the range focused by the depth of field is the focused range at the focused position P3. That is, when focused at the position P3, an image focused not only on the subject at the position P3 but also on the subject in the focused range at the front and the back of the position P3 (subject in the rear depth of field on the close-distance side and the front depth of field on the long-distance side) is obtained. Obviously, when the position P3 is the focused position, focus is accurately made only at the position P3, but focus appears to be made even with respect to the subject in the focused range at the front and the back (close-distance side and long-distance side) of the relevant position P3 in the actual image. Out-of-focus becomes greater the farther away from the position P3 or the focused position, but the out-of-focus is assumed to be within the tolerable range if in the focused range defined according to the depth of field.

An optical device such as an imaging optical system of the imaging device 1 described above has a characteristic in that the depth of field is shallow if the focal position is on the close-distance side and the depth of field is deep if the focal position is on the long-distance side. Thus, when the focal position is changed in a stepwise manner, the focused range becomes narrower the more the focal position is on the close-distance side, and the focused range becomes wider the more the focal position is on the long-distance side. Therefore, in order to focus on the entire area in the focusable range, the focal position is densely changed at fine changing amount on the close-distance side in which the depth of field is shallow, and the focal position is roughly changed at large changing amount on the long-distance side in which the depth of field is deep, as shown in B of FIG. 8. That is, the changing position of when changing the focal position in a stepwise manner is preferably set according to the depth of field that fluctuates by the distance from the imaging device 1.

Figure 10:
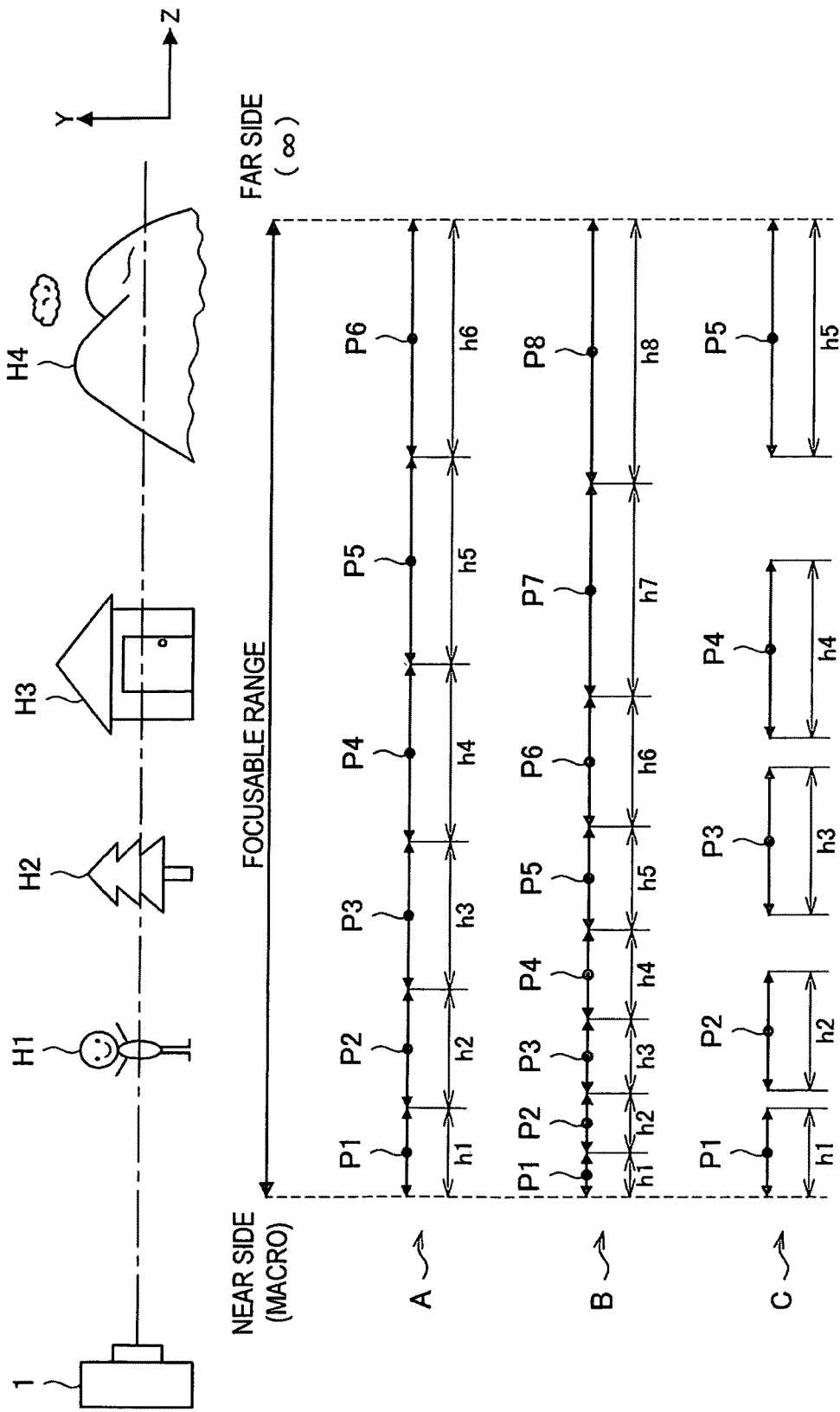
FIG. 10 is a schematic view describing the changing position of the focal position according to the depth of field according to the embodiment.

The method of setting the changing position of the focal position according to the depth of field will be described in further detail with reference to FIG. 10. FIG. 10 is a schematic view describing the changing position of the focal position according to the depth of field according to the present embodiment. A of FIG. 10 and B of FIG. 10 are examples in which the changing position of the focal position is set such that the entire area of the focusable range is focused, and C of FIG. 10 is an example in which the changing position of the focal position is set such that a non-focused range forms in the focusable range.

In the example of A of FIG. 10, the changing position of the focal position is set in a stepwise manner to the positions P1, P2, P3, P4, P5, P6, similar to the example in A of FIG. 8, and the interval of the changing positions P1 to P6 is made wider towards the long-distance side. The depth of field at the respective changing position P1 to P6 becomes deeper the farther the distance is from the imaging device 1 to the respective changing positions P1 to P6. Thus, the focused range h1 to h6 of when the respective changing position P1 to P6 is the focused position becomes wider towards the long-distance side (h1<h2<h3<h4<h5<h6).

In the example in A of FIG. 10, the changing positions P1 to P6 are set such that the difference between the adjacent changing positions P1 to P6 is within the depth of field. That is, the changing positions P1 to P6 are set such that both ends of the focused range h1 to h6 at the respective changing positions P1 to P6 overlap each other or at least contact each other. The sum of the focused ranges h1 to h6 at all the changing positions P1 to P6 thus covers the entire area of the focusable range. Therefore, the entire area of the focusable range can be focused by changing the focal position in a stepwise manner to the changing positions P1 to P6. The image data focused on an arbitrary subject in the entire area of the focusable range is thereby obtained by appropriately setting the changing positions P1 to P6 of the focal position.

The example in B of FIG. 10 is an example of changing the focal position in a stepwise manner at a finer changing amount when considering the focused range h (i.e., range tolerating out-of-focus by depth of field) in a narrower range. In the example of B of FIG. 10, the changing position of the focal position is set in a stepwise manner to the positions P1, P2, P3, P4, P5, P6, P7, P8, the number of changing positions P of the focal position is greater, and the mutual interval of the changing positions P1 to P8 is narrower than in the example of A of FIG. 10. Thus, the example in B of FIG. 10 has an advantage that image data of higher focusing accuracy can be obtained over the entire area of the focusable range although the changing time of the focal position increases compared to the example in A of FIG. 10.

In the example of C of FIG. 10, the changing positions P1, P2, P3, P4, P5 of the focal position are set to position separated from each other than in the example of A of FIG. 10. Thus, the focused ranges h1 to h5 at the respective changing positions P1 to P5 do not overlap each other, and a range not included in any of the focused ranges h1 to h5 forms in the focusable range. Therefore, in the example of C of FIG. 10, the entire area of the focusable range is not focused, and thus a non-focused subject may exist in any of the plurality of image data obtained by the multifocus imaging. A case of setting the changing positions P1, P2, P3, P4, P5 of the focal position in a separated manner as in the example of C of FIG. 10 is encompassed in the present invention, but A of FIG. 10 and B of FIG. 10 are preferable from the standpoint of obtaining the image data in which the entire area of the focusable range is focused. The example of C of FIG. 10, however, has an advantage that the focal position can be changed at a higher speed since the number of changing positions P1 to P5 of the focal position (i.e., number of times to change focal position) is less than in the examples of A of FIG. 10 and B of FIG. 10.

The example of setting the changing position P of the focal position according to the depth of field has been described above with reference to FIG. 10.

The changing position P of the focal position may be set according to the opening (e.g., F value) of the aperture 3 since the depth of field changes by the opening of the aperture 3 of the imaging optical system. The changing position P of the focal position may be set according to the type of lens mounted on the imaging device 1 since the depth of field also changes by the focal length of the lens of the imaging optical system. Furthermore, the changing position P of the focal position may be set according to the distance (depend on characteristic of zoom lens) since the depth of field changes by the distance from the imaging device 1 to the focal position. Thus, in the imaging device 1 according to the present embodiment, the changing position P of the focal position can be set according to the opening of the aperture 3, the type of lens, and the distance from the focal position to the imaging device 1. Thus, the focal position can be efficiently and appropriately changed, and all subjects existing at arbitrary positions in the focusable range can be focused.

The timing of setting the changing position P of the focal position will be described below. The imaging device 1 may set the changing position P of the focal position in advance before performing the multifocus imaging process. In this case, the CPU 11 of the imaging device 1 holds the data of the changing position P of the focal position set in advance, and controls the deforming mirror device 2 to change the focal position in a stepwise manner using the relevant data in time of the multifocus imaging.

Alternatively, the CPU 11 of the imaging device 1 may calculate in real time the changing position P of the focal position to dynamically set the changing position P when performing the multifocus imaging process, and control the deforming mirror device 2 to change the focal position to the set changing position P in a stepwise manner. In this case, the CPU 11 can dynamically set the changing position P of the focal position at an appropriate position corresponding to the imaging state using data representing the correlation of the depth of field and the focal position, and parameters such as the opening of the aperture 3, the type of lens, and the distance from the focal position to the imaging device 1.

Figure 11:
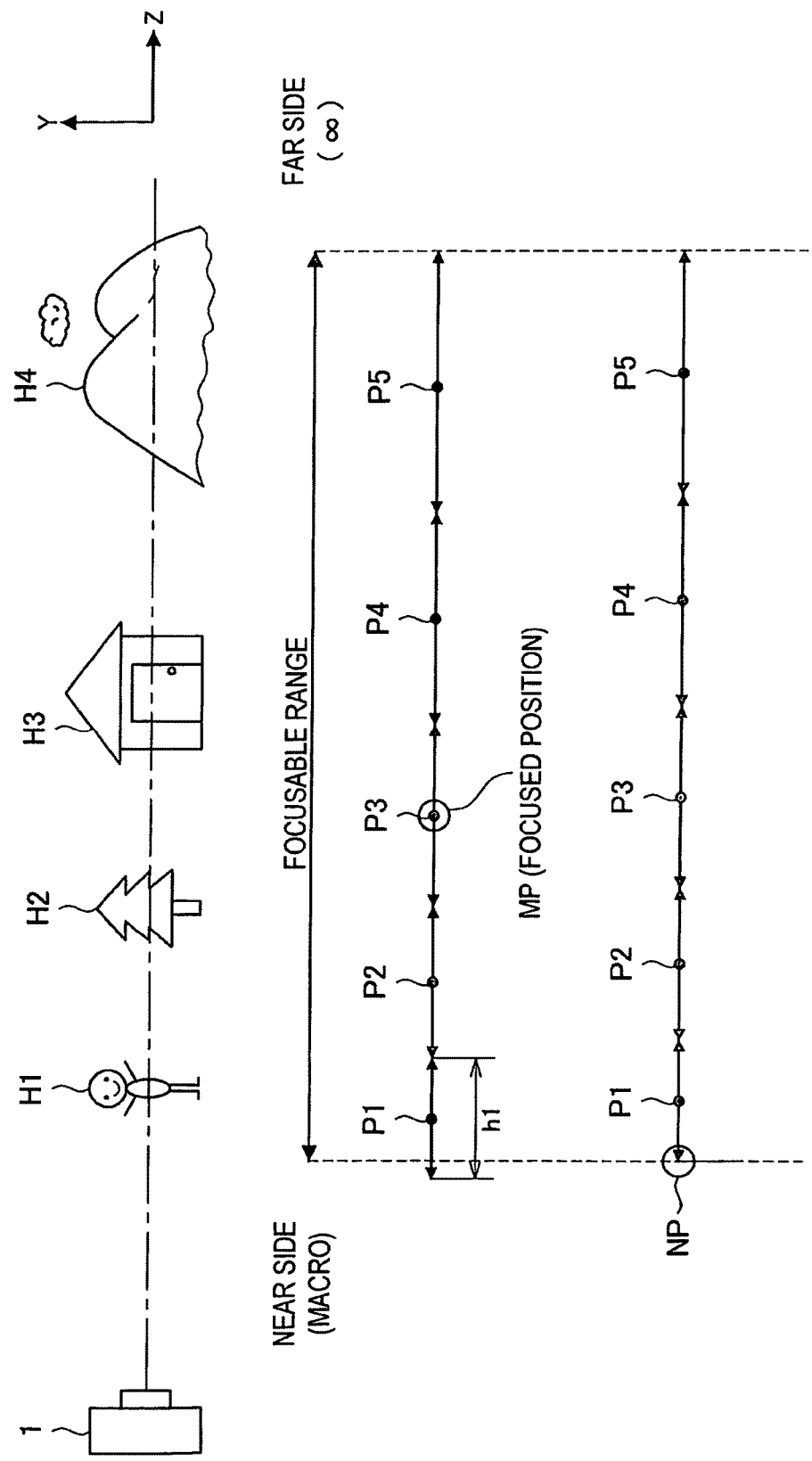
FIG. 11 is a schematic view describing the base point for setting the changing position P of the focal position according to the embodiment.

The base point for setting the changing position P of the focal position according to the present embodiment will be described with reference to FIG. 11. FIG. 11 is a schematic view describing the base point for setting the changing position P of the focal position according to the present embodiment.

A of FIG. 11 is an example of setting the changing positions P1 to P5 of the focal position with the focused position MP detected in the AF process as the base point. As hereinafter described, the imaging device 1 according to the present embodiment detects the focused position MP through the AF process in response to the detection instruction, and thereafter, changes the focal position in a stepwise manner with the detected focused position MP as a reference and performs the multifocus imaging process in response to the release instruction. After the release instruction, the CPU 11 can dynamically set the changing positions P1 to P5 of the focal position in real time with the focused position MP detected before the release instruction as the base point.

In the example of A of FIG. 11, the details of the process of setting the changing positions P1 to P5 with the focused position MP as the base point will be described. First, the CPU 11 sets the changing positions P2, P4 based on the depth of field at the focused position MP (=changing position P3) that becomes the base point, and the depth of field at the changing positions P2, P4 adjacent thereto. The CPU 11 then sets the changing positions P1, P5 based on the depth of field at the set changing positions P2, P4 and the depth of field at the changing positions P1, P5 adjacent thereto. The changing positions P1 to P5 that cover the entire area of the focusable range are thereby dynamically set with the focused position MP as the base point. In this case, the lower limit of the focused range h1 at the changing position P1 on the most close-distance (macro) side does not coincide with the focal position NP (hereinafter referred to as "macro position NP") on the shortest distance (macro) side.

The changing positions P1 to P5 thus can be set with the focused position MP as the base point in real time after the release instruction in such manner. Since imaging is finished at the focused position MP after the release instruction, the focal position may not be again changed to the changing position P3 (=focused position MP) and perform imaging in the multifocus imaging process, whereby the multifocus imaging process can be rapidly started.

B of FIG. 11 is an example of setting the changing positions P1 to P5 of the focal position with the macro position NP as the base point. Specifically, the CPU 11 sets the changing position P1 based on the depth of field at the changing position P1 adjacent to the macro position NP that becomes the base point. The CPU 11 sets the changing position P2 based on the depth of field at the set changing position P1 and the depth of field at the adjacent changing position P2. The changing positions P3, P4, P5 are sequentially set in a similar manner. Thus, the changing positions P1 to P5 that cover the entire area of the focusable range can be set with the macro position NP as the base point. In this case, the lower limit of the focused range h1 at the changing position P1 on the most close-distance (macro) side coincides with the macro position NP.

Since the setting of the changing positions P1 to P5 having the macro position as the base point can be executed regardless of the presence of detection of the focused position MP, the relevant setting may not be performed in real time with the multifocus imaging process. Therefore, the changing positions P1 to P5 can be set in advance and the setting data thereof may be held by the imaging device 1, and the focal position may be changed in a stepwise manner using the relevant data in the multifocus imaging process. The processing load of the CPU 11 in time of the multifocus imaging process thus can be reduced.

[Details of the Focus Control]

The focus control by the imaging device 1 according to the present embodiment will be specifically described with reference to FIGS. 12 and 13.

The imaging device 1 according to the present embodiment detects the focused position by performing the AF process in response to the detection instruction (e.g., half-press operation of release button). Thereafter, the imaging device 1 records the image data obtained by imaging at the focused position in the storage unit 17 and performs the entire focus imaging process in response to one release instruction (e.g., full-press operation of release button). In the entire area focus imaging process, the imaging device 1 changes the focal position in a stepwise manner in the focusable range with the focused position detected in the AF process as a reference and sequentially stores a plurality of image data obtained by imaging at the changed focal position in the storage unit 17 while performing such change.

Therefore, the imaging device 1 according to the present embodiment controls the focus to detect the focused position in the AF process and controls the focus to change the focal position in the entire area focus imaging process. A specific example of the focus control according to the present embodiment will be specifically described with reference to FIGS. 12 and 13. In FIGS. 12 and 13, the vertical axis (Z-axis) shows the focal position and the horizontal axis shows the time.

First, an example of the focus control shown in FIG. 12 will be described. FIG. 12 is a schematic view showing an example of a focus control of changing the focal position in a stepwise manner from the focused position MP towards the macro side after changing in a stepwise manner from the focused position MP towards the infinity side in the multifocus imaging process according to the present embodiment.

Figure 12:
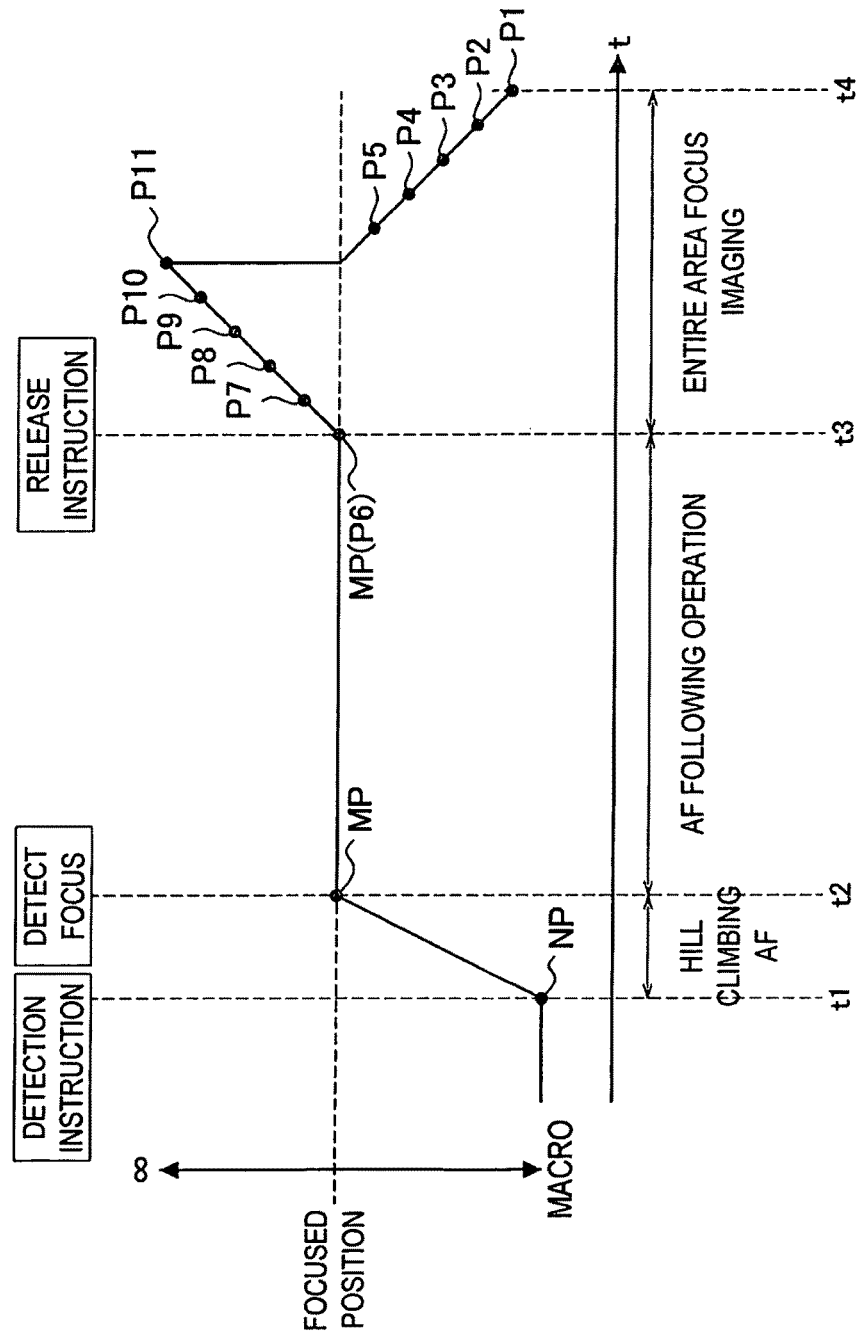
FIG. 12 is a schematic view showing an example of a focus control according to the embodiment.

As shown in FIG. 12, the CPU 11 of the imaging device 1 first detects the focused position MP focused on a desired subject in the imaging range by performing the AF process when receiving the detection instruction (AF start instruction) (t1 to t2). The subject to be focused in the AF process may be a subject that exists at a predetermined position (e.g., middle of image) of the imaging range at the time point of receiving the detection instruction, or may be a subject user specified with the touch panel etc.

The search of the focused position by a general hill climbing method (hill climbing AF) can be used for the AF process. The hill climbing AF searches for the focused position MP by analyzing the image data obtained at the focal position and acquiring an evaluation parameter while moving the focal position from the macro side (macro position NP) towards the infinity side, and evaluating the evaluation parameter. The hill climbing AF obviously can be carried out while moving the focal position from the infinity side (infinity position FP) towards the macro side.

The search of the focused position MP by the hill climbing method is performed by the CPU 11 by acquiring the focusing evaluation value Ev sequentially calculated in the focusing evaluation value calculating portion 27 of FIG. 2. Various specific methods of the search of the focused position MP by the hill climbing method exist, but the following method can be basically adopted.

First, the CPU 11 sets the focal position at the macro (Sn), and acquires the value of the focusing evaluation value Ev calculated in such state. The focal position (Sn+1) distant from the macro Sn by a distance t defined in advance is then set, and the value of the focusing evaluation value Ev calculated in such state is acquired. After acquiring the evaluation value Ev at the respective focal position spaced apart by distance t, at where the satisfactory value of the evaluation value Ev is obtained is determined. The focused position is determined as the macro Sn if the value of the evaluation value Ev at the macro Sn is higher. The focused position can be determined as the focal position after the focal position Sn+1 if the value of the evaluation value Ev at the focal position Sn+1 is higher. In this case, the focusing evaluation value Ev at the focal position Sn+2 farther by distance t is acquired, and whether the value of the evaluation value Ev is more satisfactory at the focal position Sn+1 or the focal position Sn+2 is determined. The focused position is determined as the focal position Sn+1 if the value of the evaluation value Ev is higher at the focal position Sn+1. The focused position is determined as the focal position after the focal position Sn+2 if the value of the evaluation value Ev at the focal position Sn+2 is higher, and thus the focusing evaluation value Ev at the focal position Sn+3 farther by distance t is acquired, and whether the value of the evaluation value Ev is more satisfactory at the focal position Sn+2 or the focal position Sn+3 is determined.

Thereafter, if a more satisfactory value of the evaluation value Ev is obtained at the close focal position farther by distance t is obtained, the CPU 11 performs a comparison with the evaluation value Ev acquired by swinging to the focal position farther by distance t, and the CPU 11 determines the focal position swung immediately before as the focused position when the value of the evaluation value Ev becomes low at the newly swung focal position.

The focused position MP is detected by the hill climbing AF in such manner. In addition to the hill climbing AF, an arbitrary method such as the phase difference detection method and the contrast detection method can be used for the method of the AF process.

In the phase difference detection method, two images are generated with a separator lens in the image sensor from a subject image entered through the imaging optical system, the interval between the images is measured with a line sensor (AF element 7), the amount of shift of the focus is detected, and the focused position is obtained based on the amount of shift of the focus. The contrast detection method is a detection method based on the idea that the contrast of the image obtained by imaging becomes the highest when focused. In the contrast detection method, the image data obtained by imaging the subject image with the image sensor 4 is analyzed, and the lens position where the contrast value of the image becomes the highest is searched while moving the focal position. In this case, the contrast value is calculated while moving the focal position, and the focused position is obtained from the path of such change. Therefore, the contrast detection method requires a searching time compared to the phase difference detection method but has an advantage in that the AF process can be executed with the image sensor (image sensor 4) for imaging.

From the period the detection of the focused position MP is completed until accepting the release instruction, the CPU 11 controls the AF following operation (t2 to t3). The following operation is the operation of re-focusing on the subject when the focused subject moves during the period t2 to t3. The AF following operation is greatly used in digital video cameras and the like, but may be used in digital still cameras. The focused position at the beginning of the detection may be fixed without performing the AF following operation during the period t2 to t3.

During the period t1 to t3, the imaging process by the image sensor 4 is being constantly performed, and the image data obtained by such imaging is displayed on the display unit 15 as live view images. The user inputs the release instruction of the imaging device 1 by full-press operating the release button and the like at the time point of judging as the photo opportunity while looking at the live view image. The release instruction may be automatically made by the imaging device 1 by smile detection etc.

When accepting the release instruction, the CPU 11 records in the storage unit 17 the image data D6 obtained by imaging the subject image at the focused position MP (correspond to changing position P6 of focal position) by the image sensor 4 at the time point of accepting the release instruction (t3). The image data D6 in which the subject of the focused position MP detected in the AF process is focused can be recorded as the saving image data. Furthermore, the CPU 11 can execute the entire area focus imaging process right after recording the image data D6 of the focused position MP (t3 to t4).

Specifically, the CPU 11 first controls the deforming mirror device 2 to change the focal position in a stepwise manner from the focused position MP towards the infinity side, as shown in FIG. 12. The focal position is thus sequentially changed to changing positions P7, P8, P9, P10, P11. The CPU 11 records the image data D7, D8, D9, D10, D11 obtained by imaging the subject image at the respective changing positions P7, P8, P9, P10, P11 by the image sensor 4 in the storage unit 17 while changing the focal position. As a result, a plurality of image data D6 to D11 in which the subject in the range from the focused position to infinity of the focusable range is focused can be recorded.

Furthermore, the CPU 11 controls the deforming mirror device 2 to change the focal position in a stepwise manner from the focused position MP towards the macro side. Thus, the focal position is sequentially changed to changing positions P5, P4, P3, P2, P1. The CPU 11 records the image data D5, D4, D3, D2, D1 obtained by imaging the subject image at the respective changing positions P5, P4, P3, P2, P1 by the image sensor 4 in the storage unit 17 while changing the focal position. As a result, a plurality of image data D5 to D1 in which the subject in the range from the focused position to macro of the focusable range is focused can be recorded.

The imaging device 1 thus can record a plurality of image data D1 to D11 in which the subject of the entire area of the focusable range from the macro side to the infinity side is focused by performing the entire area focus imaging process (t3 to t4). In this case, the focal position is changed in a stepwise manner in the order of gradually becoming farther from the focused position MP towards the infinity side (or macro side) (changing position P7→P8→P9→P10→P11). Thus, on the infinity side of the focused position MP, the image data focused on the focal position closer to the focused position MP can be acquired at timing close to the release instruction (t3). For instance, the image data D7 focused on the position P7 closest to the focused position MP can be acquired before the image data D8 focused on the position P8 next closest to the focused position MP. Therefore, the image data focused on the focal position closer to the focused position MP can be preferentially acquired at timing close to the photo opportunity (i.e., release instruction t3).

Normally, the possibility the subject desired by the user exists is higher at the focal position (e.g., P7, P8) closer to the focused position MP in the focusable range. Therefore, the image data (e.g., D7, D8) focused on the subject desired by the user can be preferentially acquired at timing close to the photo opportunity by acquiring the image data in the above order. That is, the image data (e.g., D7, D8) focused on the subject desired by the user is first acquired, and thereafter, the image data (e.g., D10, D11) focused on other subjects are preliminarily secured. The photo opportunity is thus prevented from being missed in the entire area focus imaging process.

In the example of FIG. 12, the entire area focus imaging process is performed by first changing the focal position from the focused position MP towards the infinity side (P7 to P11), and then changing the focal position from the focused position MP towards the macro side (P5 to P1), but such example is not the sole case. Opposite to the example described above, the entire area focus imaging process may be performed by first changing the focal position from the focused position MP towards the macro side (P5 to P1), and then changing the focal position from the focused position MP towards the infinity side (P7 to P11).

An example of the focus control shown in FIG. 13 will now be described. FIG. 13 is a schematic view showing an example of the focus control of alternately changing the focal position towards the infinity side and the macro side in order from the changing position P close to the focused position MP in the multifocus imaging process according to the present embodiment.

Figure 13:
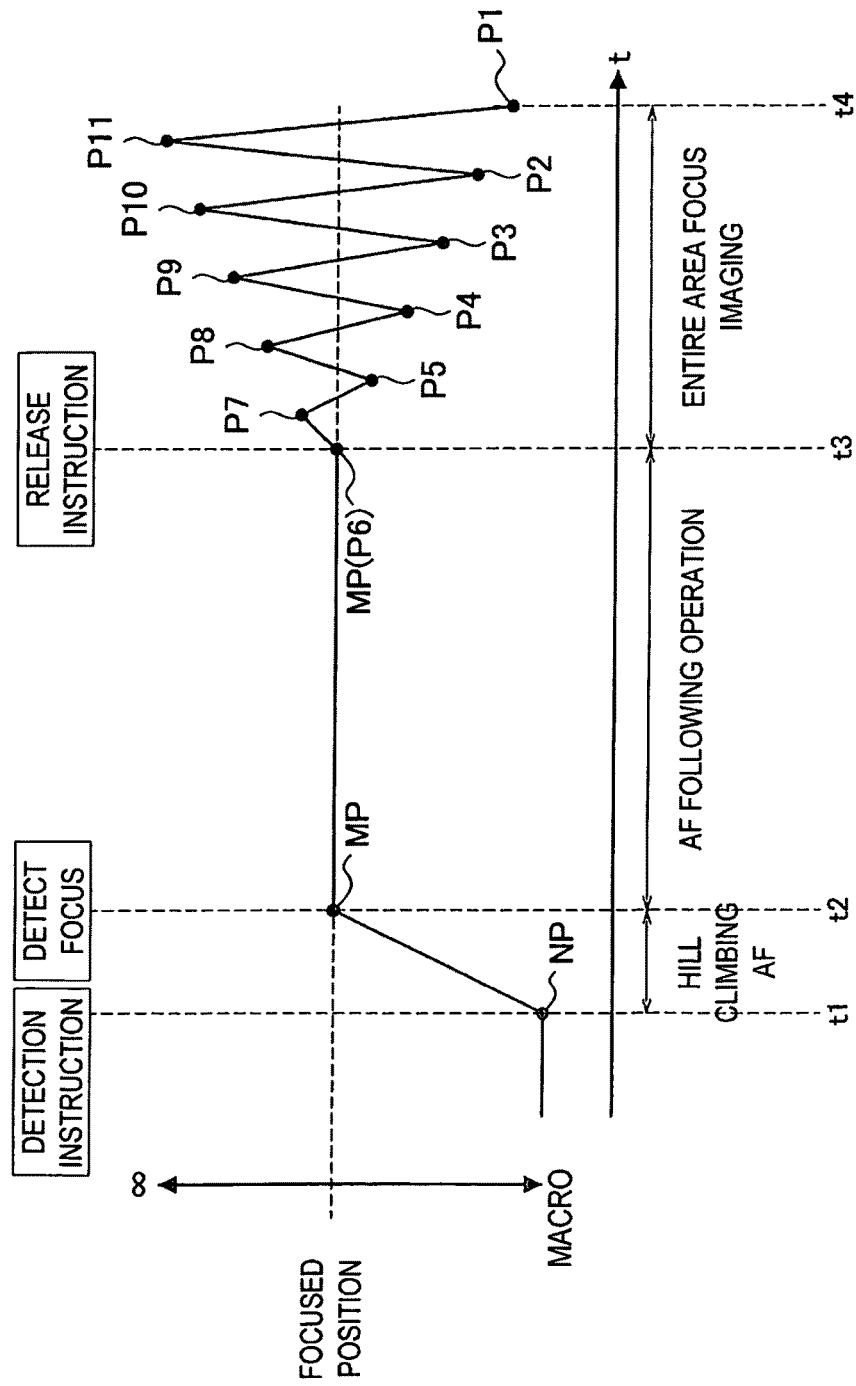
FIG. 13 is a schematic view showing another example of the focus control according to the embodiment.

As shown in FIG. 13, when receiving the detection instruction (AF start instruction), the CPU 11 of the imaging device 1 performs the hill climbing AF process to detect the focused position focused on a desired subject in the imaging range (t1 to t2). From the period the detection of the focused position MP is completed until accepting the release instruction, the CPU 11 controls the AF following operation (t2 to t3). The processes (t1 to t3) up to now are substantially the same as the processes (t1 to t3) of FIG. 12, and thus the detailed description thereof will be omitted.

Thereafter, the CPU 11 records in the storage unit 17 the image data D6 obtained by imaging the subject image at the focused position MP (correspond to changing position P6 of focal position) by the image sensor 4 at the time point of accepting the release instruction (t3). The image data D6 in which the subject of the focused position MP detected in the AF process is focused can be recorded as the saving image data. Furthermore, the CPU 11 can execute the entire area focus imaging process right after recording the image data D6 of the focused position MP (t3 to t4).

Specifically, the CPU 11 first controls the deforming mirror device 2 to change the focal position in a stepwise manner while alternately swinging to the infinity side and the macro side in order close to the focused position MP, as shown in FIG. 13. The focal position is thus changed in order of changing positions P7, P5, P8, P4, P9, P3, P10, P2, P11, P1. The CPU 11 records the image data D7, D5, D8, D4, D9, D3, D10, D2, D11, D1 obtained by imaging the subject image at the respective changing positions P7, P5, P8, P4, P9, P3, P10, P2, P11, P1 by the image sensor 4 in the storage unit while alternately changing the focal position to the infinity side and the macro side.

A plurality of image data D1 to D11 in which the subject of the entire area of the focusable range from the macro side to the infinity side can be recorded by performing the entire area focus imaging process (t3 to t4). In this case, the focal position is alternately changed towards the infinity side and the macro side in order from the changing position close to the focused position MP (changing position P7→P5→P8→P4→P9→P3→P10→P2→P11→P1). Thus, the image data focused on the focal position closer to the focused position MP can be acquired at timing close to the release instruction (t3) in both the macro side and the infinity side of the focused position MP. For instance, the image data D7, D5 focused on the positions P7, P5 closest to the focused position MP can be acquired before the image data D8, D4 focused on the positions P8, P4 next closest to the focused position MP. Therefore, the image data focused on the focal position closer to the focused position MP can be preferentially acquired at timing close to the photo opportunity (i.e., release instruction t3) in both the macro side and the infinity side.

Therefore, the image data (e.g., D7, D5) focused on the subject desired by the user can be preferentially acquired at timing close to the photo opportunity than in the example of FIG. 12 by acquiring the image data in the order shown in FIG. 13. That is, the image data (e.g., D7, D5) focused on the subject desired by the user is first acquired, and thereafter, the image data (e.g., D11, D1) focused on other subjects can be preliminarily secured. The photo opportunity thus can be further prevented from being missed in the entire area focus imaging process.

In the example of FIG. 13, the entire area focusing imaging process is performed while alternately changing the focal position in the order of infinity side (P7), macro side (P5), infinity side (P8), . . . from the focused position MP, but such example is not the sole case. Opposite to the example described above, the entire area focus imaging process may be performed while alternately changing the focal position in the order of macro side (P5), infinity side (P7), macro side (P4), . . . from the focused position MP. In other words, whether to first change the focal position to the infinity side or the macro side is arbitrary.

[Operation of Imaging Device]

Figure 14:
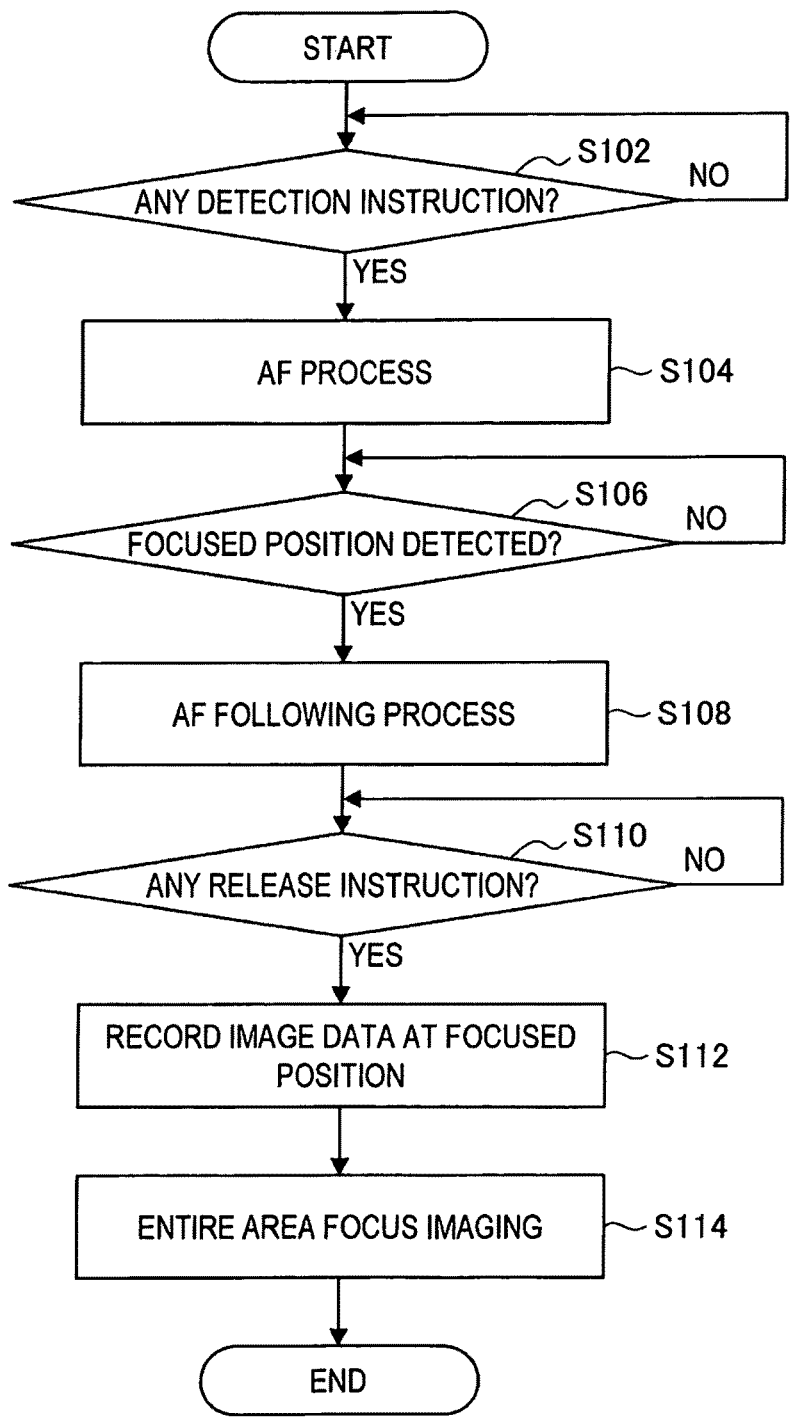
FIG. 14 is a flowchart showing the imaging operation by the imaging device according to the embodiment.

The imaging operation by the imaging device 1 according to the present embodiment will be described with reference to FIG. 14. FIG. 14 is a flowchart showing the imaging operation by the imaging device 1 according to the present embodiment.

As shown in FIG. 14, when the imaging device 1 is set to the imaging mode, the CPU 11 of the imaging device 1 waits until the detection instruction such as AF start instruction is made (S102). Even while waiting, the image sensor 4 images the subject image entering from the imaging optical system, and the pre-processing unit 5 and the signal processing unit 6 generate the image data based on the image signals output from the image sensor 4, which image data is displayed on the display unit 15 as a live view image. The user inputs the detection instruction to the imaging device 1 by half-press operating the release button at a desired timing with the imaging device 1 directed towards the desired subject while looking at the live view image.

When detecting the input of such detection instruction (S102), the CPU 11 controls each unit of the imaging device 1 and executes the AF process to focus on the subject (S104). The hill climbing AF, for example, described in FIGS. 12 and 13 can be used for the AF process. If the focused position focused on the subject is detected in the AF process (S106), the CPU 11 controls the AF following operation to continue to focus on the relevant subject until receiving the release instruction (S108). The AF following operation may not be executed, in which case, the focal position is fixed at the detected focused position until receiving the release instruction.

Thereafter, the CPU 11 of the imaging device 1 waits until the release instruction is made (S110). While waiting, the user inputs the release instruction to the imaging device 1 by full-press operating the release button at desired shutter timing while looking at the live view image.

When detecting the input of the release instruction (S110), the CPU 11 controls each unit of the imaging device 1, and records the image data obtained by imaging the subject image at the focused position by the image sensor 4 in the storage unit 17 (S112). Immediately thereafter, the CPU 11 controls each unit of the imaging device 1 and executes the entire area focus imaging process (S114). In the entire area focus imaging process, the CPU 11 controls the deforming mirror device 2 to change the focal position in a stepwise manner to a plurality of changing positions with the focused position as a reference, as shown in FIG. 12 or 13. The CPU 11 then controls each unit of the imaging device 1 to image the subject image at each changing position, sequentially generate a plurality of image data, and record the image data in the storage unit 17.

A plurality of image data focused on the entire area of the focusable range from the macro side to the infinity side thus can be automatically acquired in response to one release instruction by performing the entire area focus imaging process.

In the entire area focus imaging process, the metadata related to the image data may be recorded in the storage unit 17 in association with the plurality of image data obtained in the above manner. Therefore, the image data of the focal position desired by the user can be presented to the user from the plurality of image data, the plurality of image data can be synthesis processed or browsing processed after imaging.

[Advantages]

The imaging device 1 and the imaging method thereof according to the present embodiment have been described above. The present embodiment has the following advantages.

The user of the imaging device 1 images with the focus on a desired subject using the AF function of the imaging device 1 or manually. In particular, the desired subject is to be accurately focused in the single-lens reflex camera, and the like. When performing such focusing, the desired subject is sometimes not focused obviously in the case of hand but also when the AF function is used. However, the imaging device 1 according to the present embodiment performs the normal imaging process of acquiring the image data focused on the subject of the focused position and performs the entire area focus imaging process of acquiring a plurality of image data while changing the focal position in response to the release operation. Therefore, the plurality of image data obtained by the entire area focus imaging process includes the image data focused on the desired subject. The user can reliably acquire the image data focused on the desired subject, and perform imaging without taking into consideration success/fail of focusing of the AF process and the like.

Furthermore, the user sometimes desires to have an image focused on a different subject at the same field angle after obtaining the image imaged with the focus on a certain subject. In such case as well, according to the present embodiment, the image data of high accuracy imaged by actually adjusting the imaging optical system and focusing on another subject can be ex-post acquired without depending on the ex-post image processing. First, the imaging device 1 can automatically acquire a plurality of image data focused on an arbitrary subject over the entire area of the focusable range from the macro side to the infinity side in response to one release instruction by performing the entire area focus imaging process. As shown in FIGS. 12 and 13, in the entire area focus imaging process, the focal position is changed in a stepwise manner with the focused position detected in the AF process as a reference. Therefore, the image data focused on the focal position closer to the focused position MP can be preferentially acquired at a timing close to the photo opportunity (i.e., release instruction), so that the photo opportunity of the desired subject present near the focused position will not be missed.

Furthermore, the imaging device 1 can automatically acquire a plurality of image data focused on an arbitrary subject over the entire area of the focusable range from the macro side to the infinity side in response to one release instruction by performing the entire area focus imaging process. As shown in FIGS. 12 and 13, in the entire area focus imaging process, the focal position is changed in a stepwise manner with the focused position detected in the AF process as a reference. Therefore, the image data focused on the focal position closer to the focused position MP can be preferentially acquired at a timing close to the photo opportunity (i.e., release instruction), so that the photo opportunity of the desired subject present near the focused position will not be missed.

For instance consider a case where the user desires to desires to image a picture a subject person laughing. In this case, the photo opportunity will be missed and the imaging may not be performed when the person is laughing if imaging is performed in order with the focal position simply changed from the macro side to the infinity side irrespective of the focused position as in the multifocus imaging described in Japanese Patent Application Laid-Open No. 2003-143461. Thus, the photo opportunity may be missed with the method described din Japanese Patent Application Laid-Open No. 2003-143461 when multifocus imaging the subject that may have a photo opportunity.

In the present embodiment, on the other hand, the desired subject is detected with the AF process, and the image at the relevant focused position is imaged and the entire area of the focusable range including the relevant subject is imaged in order from the focal position near the focused position in response to the release instruction. Therefore, even when multifocus imaging a subject (e.g., smile of a person) that may have a photo opportunity, the image focused on the subject and the vicinity thereof can be imaged immediately after the release instruction, whereby the photo opportunity will not be missed.

When a plurality of image data is recorded with the multifocus imaging, which subject the user aimed to image is to be presented to the user when presenting a plurality of image data to the user ex-post facto. Regarding such issue as well, the multifocus imaging according to the present embodiment is superior to the method of Japanese Patent Application Laid-Open No. 2003-143461. That is, according to the multifocus imaging of the present embodiment, the image data when focused in the AF process of the plurality of image data to be recorded becomes an index representing which subject the user himself/herself aimed to image. Therefore, when the user looks at the plurality of image data ex-post facto, the imaging device 1 first presents the image data of when focused in the AF process to present which subject the user himself/herself aimed to image. Therefore, the user can select the image truly focused on the desired subject from the plurality of image data after checking such presentation.

In the imaging device 1 according to the present embodiment, the deforming mirror device 2 is used as a focus mechanism for adjusting the focal position, and thus the focal position can be changed at high speed in the multifocus imaging process. Therefore, the multifocus imaging process can be conducted more rapidly (e.g., within one second) than the related art.

Second Embodiment

A second embodiment of the present invention will be described below. The second embodiment differs from the first embodiment in that the bracket imaging is performed during the period from the detection instruction to the release instruction, but other functional configurations are substantially the same as the first embodiment, and thus the detailed description thereof will be omitted.

First, the focus control by the imaging device 1 according to the present embodiment will be described in detail with reference to FIG. 15.

The imaging device 1 according to the second embodiment detects the focused position by performing the AF process in response to the detection instruction, and performs the bracket imaging during the period from when the detection of the focused position is completed until the release instruction is made. In the bracket imaging, the imaging device 1 periodically changes the focal position within a predetermined range having the focused position detected in the AF process as a center, and records the image data obtained by imaging the subject image at a plurality of changed focal positions in the storage unit 17 while performing such change. Thereafter, the imaging device 1 records the image data obtained by imaging at the focused position in the storage unit 17 and perform the entire area focus imaging process in response to one release instruction. In the entire area focus imaging process, the imaging device 1 changes the focal position in a stepwise manner in the focusable range with the focused position detected in the AF process as a reference, and sequentially records a plurality of image data obtained by imaging at the changed focal positions in the storage unit 17 while performing such change.

Therefore, the imaging device 1 according to the second embodiment controls the focus to detect the focused position in the AF process and controls the focus to change the focal position in the entire area focus imaging process. A specific example of the focus control according to the present embodiment will be specifically described with reference to FIG. 15.

Figure 15:
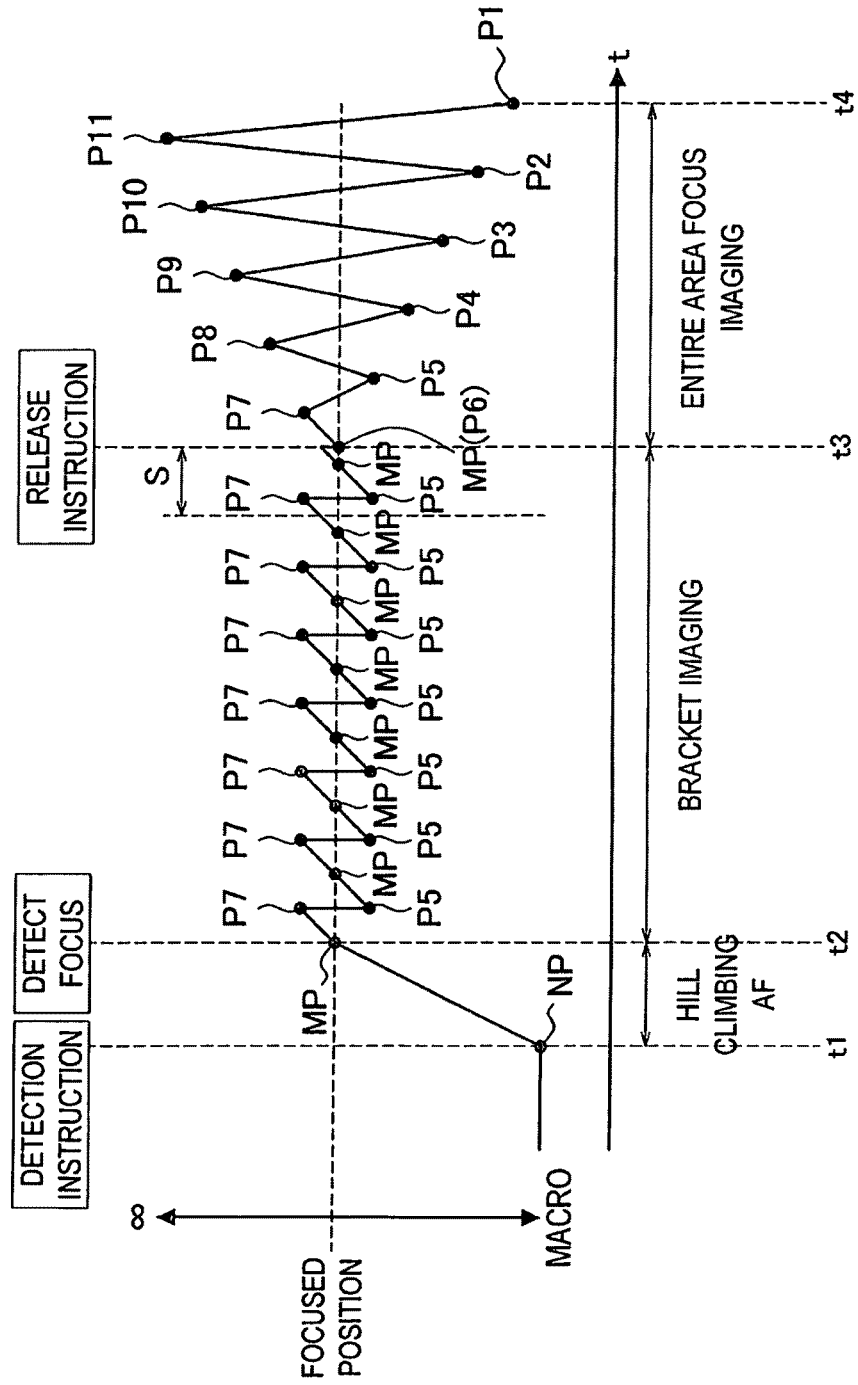
FIG. 15 is a schematic view showing an example of a focus control according to a second embodiment of the present invention.

FIG. 15 is a schematic view showing an example of a focus control in the AF process, the bracket imaging process, and the entire area focus imaging process according to the present embodiment. In FIG. 15, the vertical axis (Z-axis) shows the focal position and the horizontal axis shows the time.

As shown in FIG. 15, the CPU 11 of the imaging device 1 first detects the focused position MP focused on a desired subject in the imaging range by performing the hill climbing AF process etc. when receiving the detection instruction (AF start instruction) (t1 to t2). The AF process (t1 to t2) is substantially the same as the process (t1 to t2) of FIG. 12 according to the first embodiment, and thus the detailed description will be omitted.

The CPU 11 then performs the bracket imaging process (t2 to t3) during the period the detection of the focused position MP is completed until the release instruction is accepted. Therefore, in the second embodiment, the bracket imaging process is performed in place of the AF following operation according to the first embodiment.

The bracket imaging process will be described in detail. In the bracket imaging process, the CPU of the imaging device 1 alternately changes the focal position to the position P7 on the infinity side and the position P5 on the macro side with the focused position MP detected in the AF process as the center. The focal position thus changes periodically and in a stepwise manner of position P7→P5→MP (=P6)→P7→P5→MP (=P6)→☐ ☐ ☐ within a predetermined range having the focused position MP as the center (in the illustrated example, range of P5 to P7). The imaging device 1 changes the focal position periodically and in a stepwise manner, images the subject image with the image sensor 4 at the respective changed positions P7, P5, MP, . . . while performing such change, and generates image data D7, D5, DM (=D6), . . . based on the image signals output from the image sensor 4. The CPU 11 temporarily saves the generated image data D7, D5, DM, . . . in a cache memory (not shown) and the like.

The imaging device 1 thus can periodically acquire a plurality of image data D7, D5, DM, . . . focused on the focal position near (infinity side and macro side) the focused position MP by performing the bracket imaging process (t2 to t3). Such image data D7, D5, DM, . . . can be used as image data for compensating when mistake is found in the AF process, that is, when focus is not made on the subject desired by the user by the AF process. In other words, even if not in the focused range having the focused position MP as the center, the subject positioned near the focused position MP has a high possibility of being included in the focused range having the changing position P5 or P7 as the center by periodically changing the focal position to before and after in the vicinity of the focused position MP detected in the AF process. Therefore, even if focus is not made on the subject desired by the user by the AF process, the subject can be focused in the image data D7 or D5 obtained in the bracket imaging process.

In the example of FIG. 15, the bracket imaging process is performed while alternately changing the focal position in the order of infinity side (P7), macro side (P5), infinity side (P7), . . . from the focused position MP, but is not limited thereto. Opposite to the above example, the bracket imaging process may be performed while alternately changing the focal position in the order of macro side (P5), infinity side (P7), macro side (P5), . . . from the focused position MP. In other words, whether to first change the focal position to the infinity side or the macro side is arbitrary.

In the example of FIG. 15, the focal position is alternately changed by one step near the focused position MP, but is not limited thereto, and the focal position may be alternately changed by two or more steps. For instance, the focal position may be periodically changed as position P7→P8→P4→P5→MP→P7→P8→P4→5→MP→ . . . in the range of P4 to P8 having the focused position MP as the center.

The bracket imaging process is repeated until the release instruction (t3) is made. The CPU 11 saves, in the storage unit 17, the image data D7, D5, DM worth one period S of immediately before the release instruction of a plurality of image data D7, D5, DM, . . . acquired by the bracket imaging process and temporarily saved in the cache memory, and deletes other saving image data D7, DM, D5, . . . as they are redundant image data. In the bracket imaging process, imaging is repeatedly carried out at the same focal positions P5, P7, MP, and thus the redundant old image data D7, DM, D5, . . . may be deleted and the most recent image data D7, DM, D5 obtained immediately before the release instruction may be left to reduce the amount of data to be saved. This is because the most recent image data D7, DM, D5 obtained immediately before the release instruction reflect the photo opportunity to a greater extent.

In the present embodiment, all bracket imaged image data is temporarily saved in a storage unit (e.g., cache memory) for temporary storage, and the image data worth at least one period S immediately before the release instruction is saved in the storing storage unit (e.g., storage unit 17) and other image data are actively deleted and invalidated from the temporary storage unit in response to the release instruction. However, the present invention is not limited to such example, and a method of validating the image data worth at least one period S and invalidating the other image data is arbitrary. For instance, all image data may be saved in the storage unit 17 from the beginning, and the other image data other than the image data worth at least one period S may be actively deleted from the storage unit 17 in response to the release operation. Furthermore, the other image data may be left without being actively deleted from the storage unit and set (invalidated) so that the user is not able to access such other data in response to the release instruction. Only the image data worth at least one period S may be set (validated) so that the user is able to access the same in response to the release instruction. In either case, the image data immediately before the release instruction is the important image data imaged at timing close to the photo opportunity of immediately before the release instruction. Therefore, only the image data worth one period of immediately before the release instruction may be validated from the image data of a plurality of periods periodically imaged in the bracket imaging and presented to the user so that the image data can be efficiently managed and presented.

During the bracket imaging process, when accepting the release instruction, the CPU 11 records the image data D6 obtained by imaging the subject image at the focused position MP (corresponds to changing position P6 of focal position) by the image sensor 4 in the storage unit 17 at the time point of accepting the release instruction (t3). Thus, the image data D6 focused on the subject at the focused position MP detected in the AF process can be recorded as the saving image data. Immediately after recording the image data D6 of the focused position MP, the CPU 11 executes the entire area focus imaging process to record a plurality of image data D1 to D11 focused on the subject in the entire area of the focusable range from the macro side to the infinity side in the storage unit 17 (t3 to t4). The entire area focus imaging process (t3 to t4) is substantially the same as the entire area focus imaging process described in FIG. 13, and thus the detailed description will be omitted. The entire area focus imaging process may be replaced with the entire area focus imaging process described in FIG. 12.

[Operation of Imaging Device]

Figure 16:
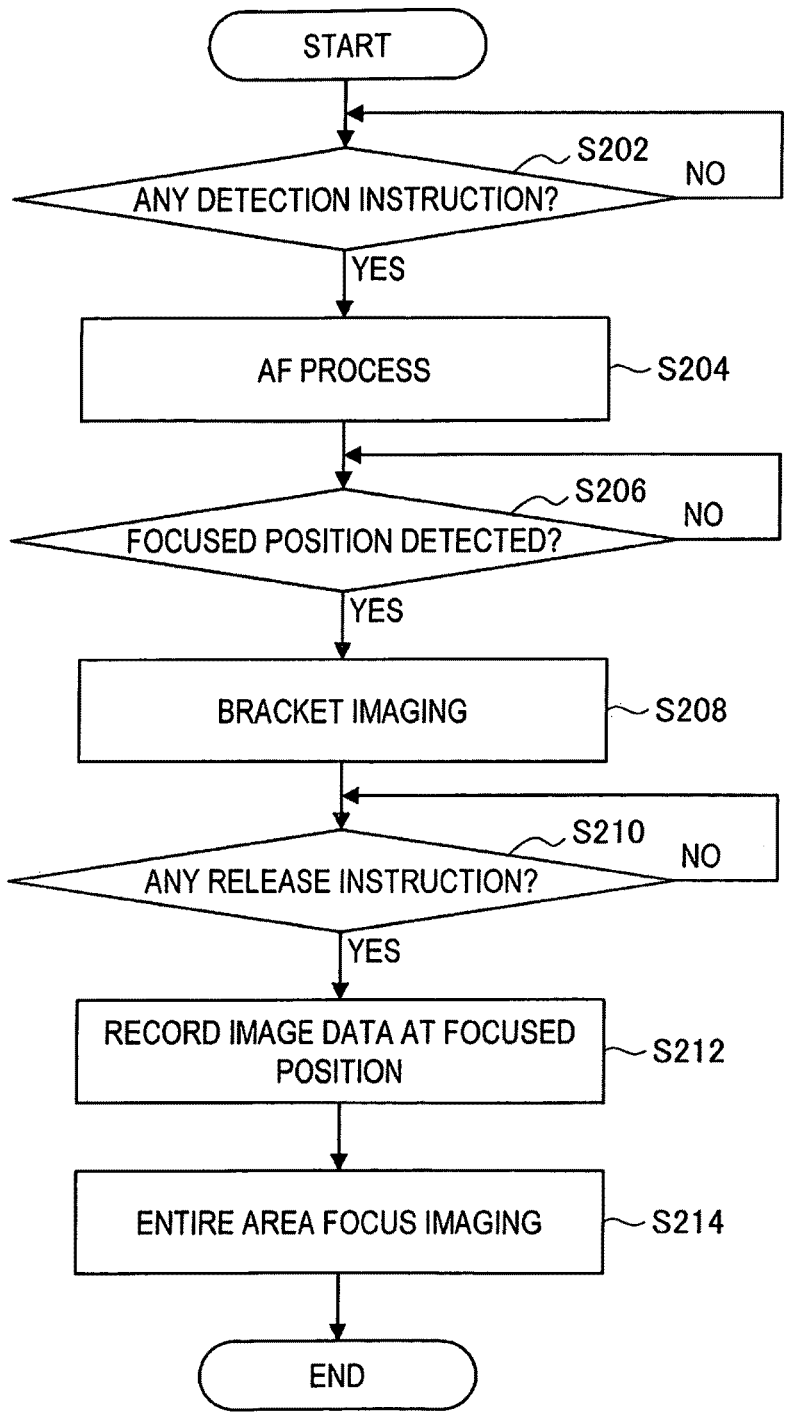
FIG. 16 is a flowchart showing the imaging operation by the imaging device according to the embodiment.

The imaging operation by the imaging device 1 according to the present embodiment will now be described with reference to FIG. 16. FIG. 16 is a flowchart showing the imaging operation by the imaging device 1 according to the present embodiment.

As shown in FIG. 16, when detecting the input of the detection instruction (S202), the CPU 11 of the imaging device 1 controls each unit of the imaging device 1 and executes the AF process to focus on the subject (S204). S202 and S204 are substantially the same as S102 and S104 of FIG. 14 according to the first embodiment, and thus the detailed description will be omitted.

If the focused position focused on the subject is detected in the AF process of S204 (S206), the CPU 11 controls each unit of the imaging device 1 and performs the bracket imaging process for obtaining the image focused on before and after the focused position MP (S208) until receiving the release instruction. In the bracket imaging process, the CPU controls the deforming mirror device 2 to alternately change the focal position to positions P7, P5 on the macro side and the infinity side within a predetermined range having the focused position as a center, as shown in FIG. 15 etc. The CPU 11 then controls each unit of the imaging device 1 to image the subject at each changing position P7, P5, MP, sequentially generate a plurality of image data D7, D5, DM, and temporarily save the image data D7, D5, DM in the cache memory. The CPU 11 then reads out the image data D7, D5, DM worth one period S of immediately before the release instruction from the cache memory, records the same in the storage unit 17, and deletes the other image data D7, D5, DM from the cache memory in response to the release instruction (S210). Thus, only the necessary image data can be stored in the storage unit 17, whereby the amount of image data to be saved can be reduced.

Furthermore, when detecting the input of the release instruction (S210), the CPU 11 of the imaging device 1 controls each unit of the imaging device 1 to record the image data obtained by imaging the subject image at the focused position by the image sensor 4 in the storage unit 17 (S212). Immediately thereafter, the CPU 11 controls each unit of the imaging device 1 to execute the entire area focus imaging process (S214). S210 to 5214 are substantially the same as S110 to S114 of FIG. 14 according to the first embodiment, and thus the detailed description will be omitted.

[Advantages]

The imaging device 1 and the imaging method thereof according to the second embodiment have been described above. The second embodiment has the following advantages in addition to the advantages of the first embodiment.

According to the second embodiment, the bracket imaging process is performed after the AF process is completed until the release instruction to obtain a focused image at the photo opportunity, so that the image data focused on the subject desired by the user can be acquired without mistake.

In other words, if the focus is completely on the target subject by the AF process, the bracket imaging process before release may not be performed. However, focus may not be made on the target subject in the AF process. Thus, in the present embodiment, the mistake of the AF process is compensated by performing the bracket imaging process before the release instruction to reliably obtain the image data focused on the target subject.

In reality, there is a time different from when the user judges as the photo opportunity and presses the release button until the image data of the focused position is recorded. Therefore, in the present embodiment, the bracket imaging process is performed on the vicinity of the focused position before the release instruction to compensate for such time difference. The image data focused on the subject desired by the user thus can be recorded in advance before a certain photo opportunity. Therefore, the image data accurately focused on the desired subject can be acquired without missing the photo opportunity even if such time difference is created.

The image data acquired before the release instruction is valid only for a predetermined time (e.g., worth one period S immediately before release) set in the imaging device 1, and thus the amount of data of the image data to be recorded in the storage unit 17 of the imaging device 1 can be suppressed to a requisite minimum.

Third Embodiment

The third embodiment of the present invention will now be described. The third embodiment differs from the second embodiment in that the subject detection process is performed in response to the detection instruction and the bracket imaging is performed within the range of the focused position detected in the subject detection process, and other functional configurations are the same as the second embodiment and thus the detailed description will be omitted.

The imaging device 1 according to the third embodiment performs the subject detection process in response to the detection instruction (e.g., half-press operation of release button). In this detection process, the focal position is changed in the focusable range, and the image data obtained by imaging the subject image at a plurality of changed different focal positions while performing such change is analyzed to obtain the evaluation parameter for subject detection. The imaging device 1 thereby detects one or more subjects present in the imaging range, and detects the range of the focused position focused on the detected subject. During the period from when the subject detection process is completed until the release instruction, the bracket imaging is performed while changing the focal position within the range of the detected focused position. In the bracket imaging, the imaging device 1 periodically changes the focal position within the range of the focused position, and records the image data obtained by imaging the subject image at a plurality of changed focal positions in the storage unit 17. Thereafter, the imaging device 1 records the image data obtained by imaging at an arbitrary focal position in the range of the focused position in the storage unit 17 and perform the entire area focus imaging process in response to one release instruction (e.g., full-press operation of release button), similar to the second embodiment.

Thus, the imaging device 1 according to the third embodiment controls the focus to detect the subject in the imaging range and the range of the focused position thereof with the subject detection process, and controls the focus to change the focal position in the bracket imaging and the entire area focus imaging process. A specific example of the focus control according to the present embodiment will be specifically described with reference to FIG. 17.

Figure 17:
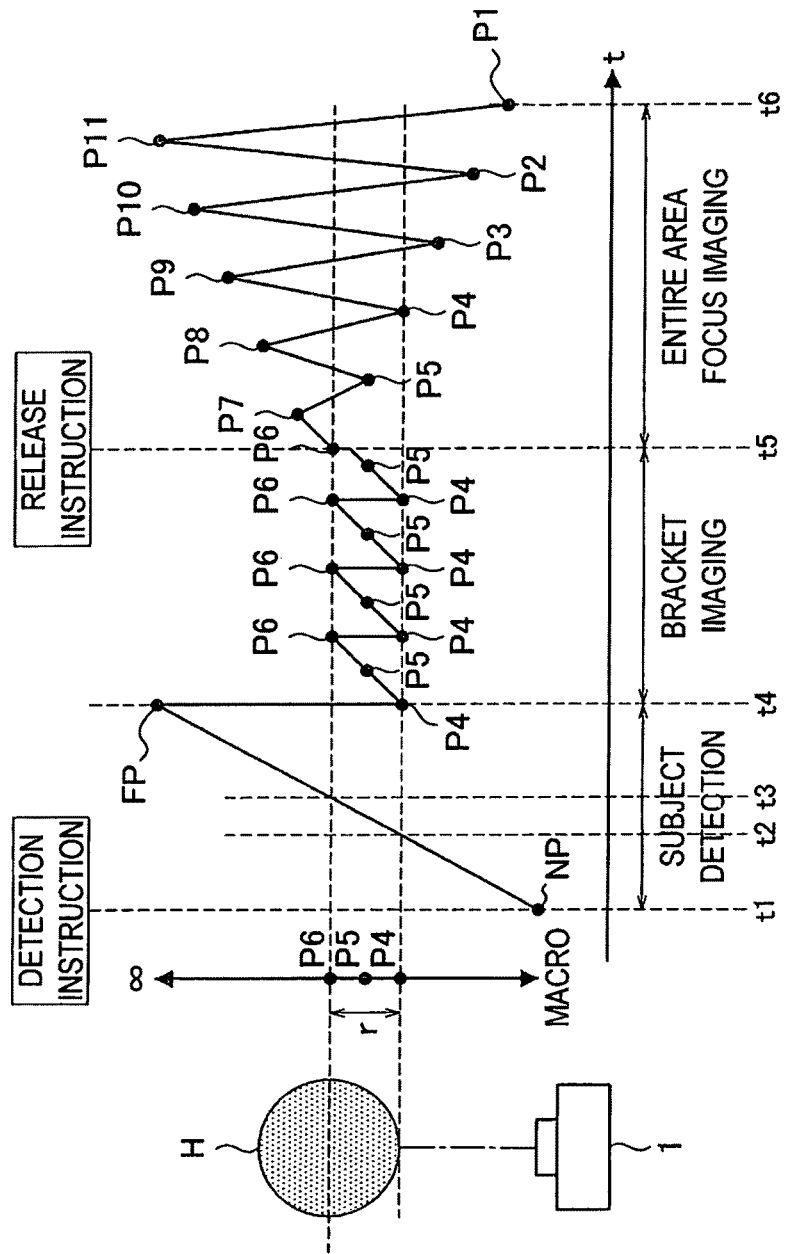
FIG. 17 is a schematic view showing an example of a focus control according to a third embodiment of the present invention.

FIG. 17 is a schematic view showing an example of the focus control in the subject detection process, the bracket imaging process, and the entire area focus imaging process according to the present embodiment. In FIG. 17, the vertical axis (Z-axis) shows the focal position and the horizontal axis shows the time.

As shown in FIG. 17, consider a case where the imaging device 1 detects the subject H and performs multifocus imaging when one subject H exists in the imaging range of the imaging device 1 and such subject H is an object having a thickness of greater than or equal to a predetermined thickness in the depth direction (Z-axis direction).

First, when receiving the detection instruction (subject detection start instruction), the CPU 11 of the imaging device 1 performs the subject detection process to detect the subject H in the imaging range and detect the range r of the focused position focused on the subject H (t1 to t4). The subject detection process can be realized using an arbitrary AF method such as hill climbing AF method, phase difference detection method, and contrast detection method.

Figure 18A:
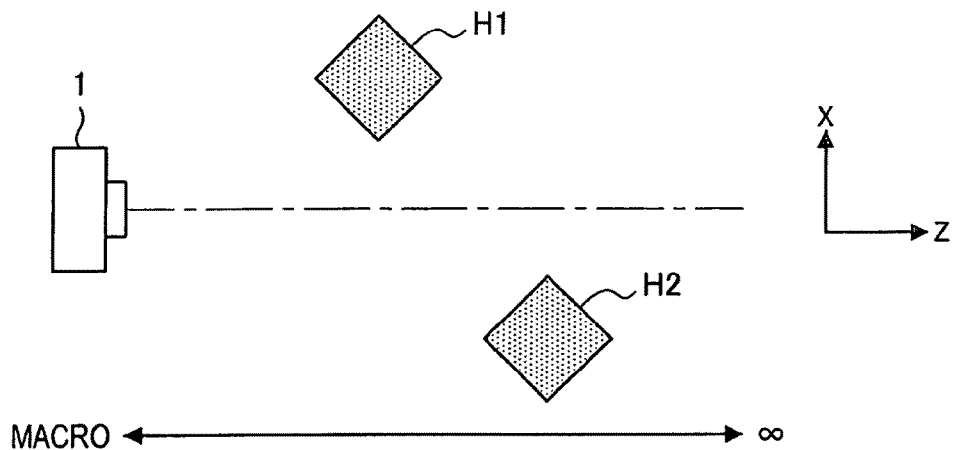
FIG. 18 is a schematic view showing an example of detecting a subject through a contrast detection method according to the embodiment.
Figure 18B:
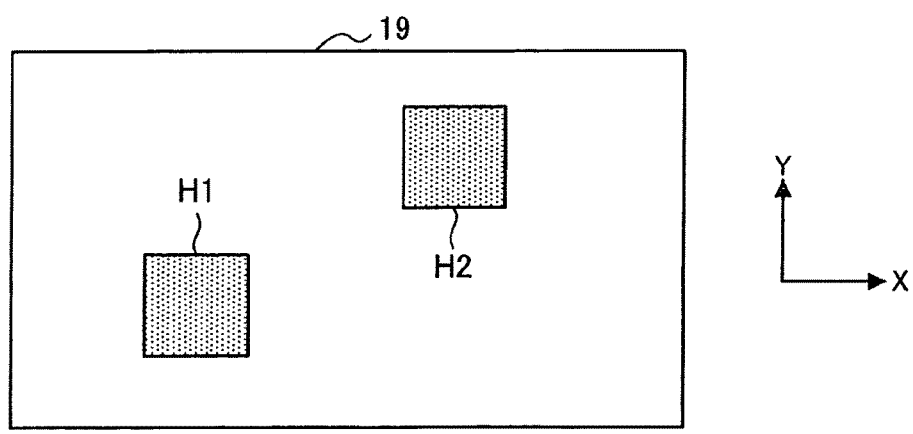
Figure 18C:
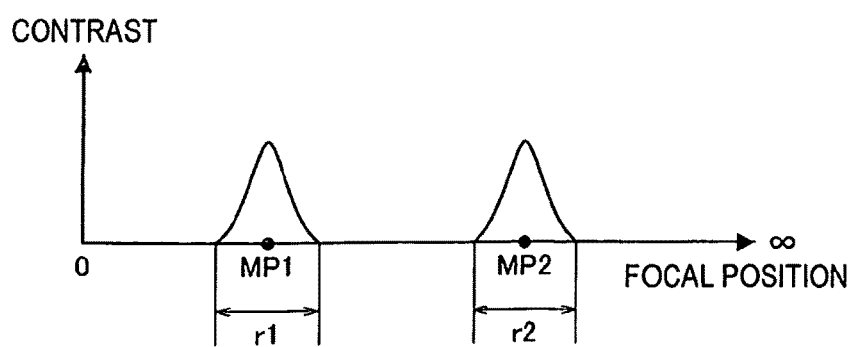

An example of detecting the subject through the contrast detection method will be described with reference to FIG. 18. As shown in FIG. 18A, consider a case where the imaging devices 1 images an imaging space where the subjects H1, H2 exist in the illustrated positional relationship. In this case, as shown in FIG. 18B, the positional relationship of the image corresponding to the subject H1 and the image corresponding to the subject H2 on the image 19 obtained by imaging the subjects H1, H2 with the image sensor 4 is as shown in the figure. The CPU 11 analyzes the image data of the relevant image 19, and searches for the focal position where the contrast value of the image becomes the highest while moving the focal position. In this case, the contrast value of when the focal position is moved from macro to infinity is as shown in FIG. 18C. The peak on the left side in FIG. 18C is the contrast output obtained from the pixel near the image corresponding to the subject H1, and the peak on the right side is the contrast output obtained from the pixel near the image corresponding to the subject H2. The CPU 11 thus can specify the focal positions MP1, MP2 of when the contrast output becomes a maximum as the focused positions of the subjects H1, H2, respectively. Furthermore, the CPU 11 can obtain the range r1, r2 of the focused position that may focus on the subjects H1, H2 by tolerable blur corresponding to the depth of field from the width of the peak of the contrast output.

Returning to FIG. 17, the description will be continued. According to the subject detection process (t1 to t4), the CPU 11 can obtain the range r of the focused position focused on the subject H based on the contrast output detected in time t2 to t3 in the middle of changing the focal position from the macro position NP to the infinity position FP. In the illustrated example, the range r of the focused position is the range between focal position P4 and focal position P6. The near side of the subject H can be imaged by the imaging device 1 but the far side may not be imaged, and thus the range r of the focused position becomes the range of the focal position corresponding to the portion on the near side of the subject H.

During the period from when the detection of the subject H and the range r of the focused position is completed until receiving the release instruction, the CPU 11 performs the bracket imaging process (t4 to t5).

The bracket imaging process will be described in detail. In the bracket imaging process, the CPU of the imaging device 1 periodically changes the focal position within the range r of the focused position detected in the subject detection process. In the illustrated example, the focal position changes periodically and in a stepwise manner of position P4→P5→P6→P4→P5→P6→☐ ☐ ☐ within the range r of the focused position. The imaging device 1 images the subject image with the image sensor 4 at the changing positions P4, P5, P6, . . . while changing the focal position periodically and in a stepwise manner, and generates the image data D4, D5, D6, . . . based on the image signals output from the image sensor 4. The CPU 11 temporarily saves the generated image data D4, D5, D6, . . . in a cache memory (not shown) and the like.

The imaging device 1 thus can periodically acquire a plurality of image data D4, D5, D6, . . . focused on the subject H having thickness in the depth direction by performing the bracket imaging process (t4 to t5). The image data accurately focused on the nearside portion, the central portion, and the far side portion of the subject H having thickness can be acquired by acquiring such image data D4, D5, D6, . . . .

In the example of FIG. 17, the bracket imaging process is performed while changing the focal position in the order of P4→P5→P6 within the range r of the focused position, but is not limited to such example, and the focal position can be changed in an arbitrary order (e.g., P6→P5→P4) as long as it is within the range r of the focused position.

The bracket imaging process is repeated until the release instruction (t5) is made. The CPU 11 saves, in the storage unit 17, the image data D4, D5, D6 worth one period S of immediately before the release instruction of a plurality of image data D4, D5, D6, . . . acquired by the bracket imaging process and temporarily saved in the cache memory, and deletes other saving image data D4, D5, D6, . . . as they are redundant image data. In the bracket imaging process, imaging is repeatedly carried out at the same focal positions P4, P5, P6, and thus the redundant old image data D4, D5, D6, . . . may be deleted and the most recent image data D4, D5, D6 obtained immediately before the release instruction may be left to reduce the amount of data to be saved. This is because the most recent image data D4, D5, D6 obtained immediately before the release instruction reflect the photo opportunity to a greater extent.

During the bracket imaging process, when accepting the release instruction, the CPU 11 records the image data D6 obtained by imaging the subject image at an arbitrary focal position (corresponds to position P6 in the illustrated example) in the range r of the focused position by the image sensor 4 in the storage unit 17 at the time point of accepting the release instruction (t5). Thus, the image data D6 focused on the subject H in the subject detection process can be recorded as the saving image data. Immediately after recording the image data D6, the CPU 11 executes the entire area focus imaging process to record a plurality of image data D1 to D11 focused on the subject in the entire area of the focusable range from the macro side to the infinity side in the storage unit 17 (t5 to t6). The entire area focus imaging process (t5 to t6) is substantially the same as the entire area focus imaging process described in FIG. 13, and thus the detailed description will be omitted. The entire area focus imaging process may be replaced with the entire area focus imaging process described in FIG. 12.

[Operation of Imaging Device]

The imaging operation by the imaging device 1 according to the present embodiment will now be described with reference to FIG. 19. FIG. 19 is a flowchart showing the imaging operation by the imaging device 1 according to the present embodiment.

As shown in FIG. 19, when detecting the input of the detection instruction (S302), the CPU 11 of the imaging device 1 controls each unit of the imaging device 1 and executes the subject detection process for detecting the subject H existing in the focusable range and the range r of the focused position focused on the subject H (S304).

In the subject detection process, the CPU 11 analyzes the image data obtained by imaging the subject image with the imaging device 1 while changing the focal position in the entire area of the focusable range, and obtains the transition of the contrast value of the image using the contrast detection method shown in FIG. 18. The CPU 11 then detects the subject H existing in the focusable range and the range r of the focused position focused on the subject H based on the transition of the contrast value.

When the subject H and the range r of the focused position are detected by the subject detection process in S304 (S306), the CPU 11 controls each unit of the imaging device 1 until accepting the release instruction (S310), and performs the bracket imaging process for focusing over the entire depth direction of the subject H (S308). In the bracket imaging process, the CPU 11 controls the deforming mirror device 2 to periodically change the focal position to the positions P4, P5, P6 while alternately swinging the focal position to the macro side and the infinity side within the range r of the focused position, as shown in FIG. 15 etc. The CPU 11 then controls each unit of the imaging device 1 to image the subject at each changing position P4, P5, P6, sequentially generate a plurality of image data D4, D5, D6, and temporarily save the image data D4, D5, D6 in the cache memory. The CPU 11 then reads out the image data D4, D5, D6 worth one period S of immediately before the release instruction from the cache memory, records the same in the storage unit 17, and deletes the other image data D4, D5, D6 from the cache memory in response to the release instruction (S310). Thus, only the necessary image data D4, D5, D6 can be stored in the storage unit 17, whereby the amount of image data to be saved can be reduced.

Furthermore, when detecting the input of the release instruction (S310), the CPU 11 of the imaging device 1 controls each unit of the imaging device 1 to record the image data obtained by imaging the subject image at the arbitrary focal position P6 in the range r of the focused position by the image sensor 4 in the storage unit 17 (S312). Immediately thereafter, the CPU 11 controls each unit of the imaging device 1 to execute the entire area focus imaging process (S314). S310 to S314 are substantially the same as S110 to S114 of FIG. 14 according to the first embodiment, and thus the detailed description will be omitted.

[Advantages]

The imaging device 1 and the imaging method thereof according to the third embodiment have been described above. The third embodiment has the following advantages in addition to the advantages of the second embodiment.

According to the third embodiment, the subject detection process is performed instead of the AF process, and thus not only one or more subjects H existing in the imaging range but also the range r of the focused focal position with respect to the subject H can be detected.

For instance, when imaging a large subject H having thickness in the depth direction, on which portion of the near side, the far side and the central part of the subject H to focus is difficult to adjust if imaging is carried out with focusing made in the AF process. In the present embodiment, however, the bracket imaging is performed while changing the focal position within the range r of the focused position detected in the subject detection process, and thus a plurality of image data accurately focused on all positions on the near side, the far side, and the central part of the subject H can be obtained. That is, a multi-focus image can be obtained with respect to one subject H by scanning the depth direction of the subject H having thickness. Therefore, the user can easily acquire the image data accurately focused on the desired portion of the subject H after the imaging. Furthermore, a three-dimensional image by image synthesis can be accurately and easily created by obtaining a plurality of image data with respect to one subject H.

In the present embodiment, the subject H is extracted from the imaging range, the subject is imaged at the best photo opportunity, and the entire area focus imaging is performed with the extra time. Thus, the subject extraction can be accurately executed, and the multi-focus image data of the subject H desired by the user can be acquired within the photo opportunity.

Fourth Embodiment

The fourth embodiment of the present invention will now be described. The fourth embodiment differs from the third embodiment in that a plurality of subjects is detected in the subject detection process and the subject imaging is performed only on the subject detected in the subject detection process after release, and other functional configurations are the same as the third embodiment and thus the detailed description will be omitted.

The imaging device 1 according to the fourth embodiment performs the subject detection process in response to the detection instruction (e.g., half-press operation of release button). In this detection process, the focal position is changed in the focusable range, and the image data obtained by imaging the subject image at a plurality of changed different focal positions while performing such change is analyzed to obtain the evaluation parameter for subject detection. The imaging device 1 thereby detects a plurality of subjects present in the imaging range, and detects the range of the focused position focused on each detected subject. During the period from when the subject detection process is completed until the release instruction, the bracket imaging is performed while changing the focal position within the range of the focused position focused on one subject selected from the plurality of detected subjects. In the bracket imaging, the imaging device 1 periodically changes the focal position within the range of the focused position, and records the image data obtained by imaging the subject image at a plurality of changed focal positions in the storage unit 17 while performing such change.

Thereafter, the imaging device 1 records the image data obtained by imaging at an arbitrary focal position in the range of the focused position in the storage unit 17 in response to one release instruction (e.g., full-press operation of release button). The imaging device 1 also performs a subject imaging process of scanning only the range of the focused position focused on a plurality of subjects detected in the subject detection process instead of the entire area focus imaging process of scanning the entire area of the focusable range. In the subject imaging process, the focal position is changed in the range of the focused position focused on a plurality of subjects detected by the subject detection process, and the image data obtained by imaging the subject image at a plurality of changed different focal positions is acquired as the saving image data and recorded in the storage unit 17.

Thus, the imaging device 1 according to the fourth embodiment controls the focus to detect the subject in the imaging range and the range of the focused position thereof with the subject detection process, and controls the focus to change the focal position in the bracket imaging and the subject imaging process. A specific example of the focus control according to the present embodiment will be specifically described with reference to FIG. 20.

Figure 20:
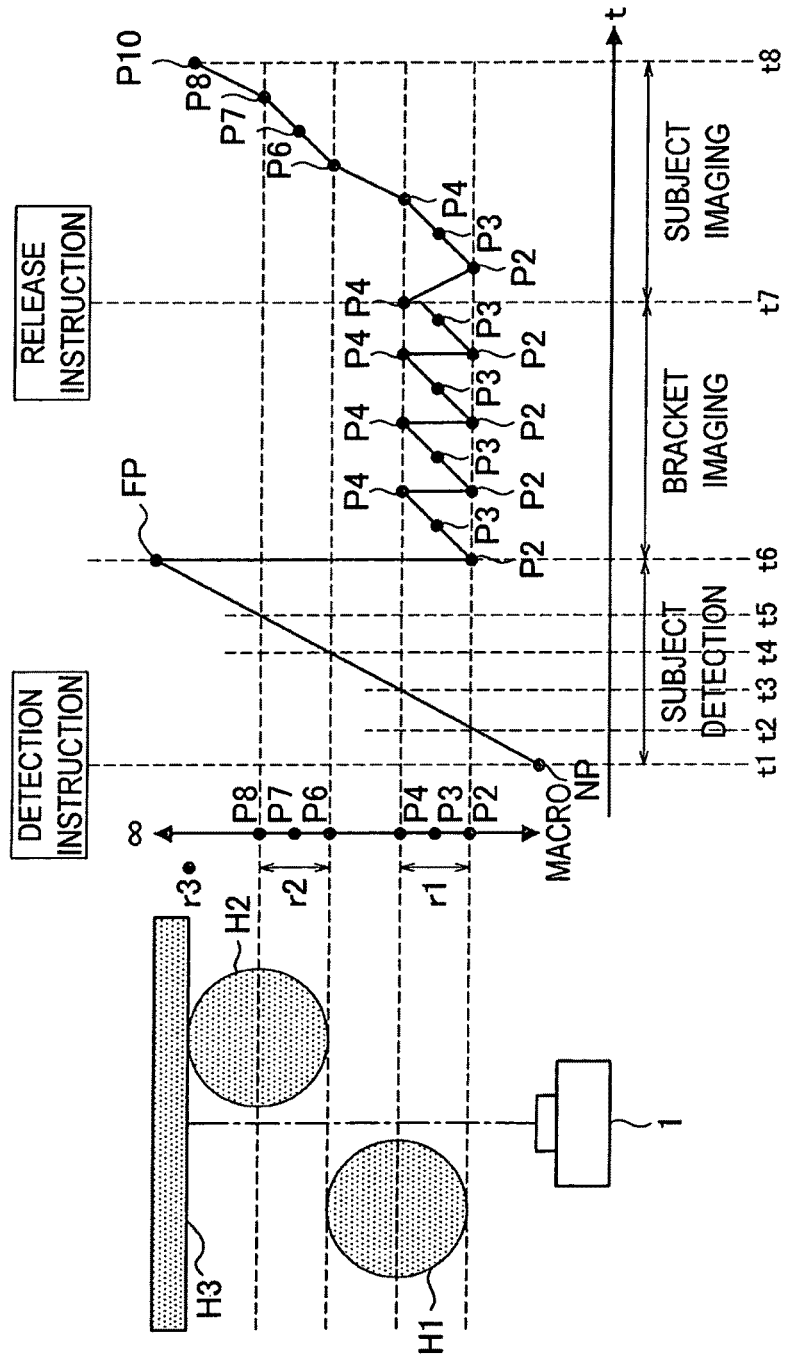
FIG. 20 is a schematic view showing an example of a focus control according to a fourth embodiment of the present invention.

FIG. 20 is a schematic view showing an example of the focus control in the subject detection process, the bracket imaging process, and the subject imaging process according to the present embodiment. In FIG. 20, the vertical axis (Z-axis) shows the focal position and the horizontal axis shows the time.

As shown in FIG. 20, consider a case where the imaging device 1 detects the subjects H1, H2, H3 and performs multifocus imaging when three subjects H1, H2, H3 exist in the imaging range of the imaging device 1. The subject H3 is a wall etc. of a building, and the far side of the subject H3 may not be seen when seen from the imaging device 1 side.

First, when receiving the detection instruction (subject detection start instruction), the CPU 11 of the imaging device 1 performs the subject detection process to detect the subjects H1, H2, H3 in the imaging range and detect the ranges r1 to r3 of the focused position focused on the subjects H1 to H3 (t1 to t6). The subject H1 is detected in time t2 to t3, and the subject H1 is detected in time t4 to t5. The subject detection process can be realized using an arbitrary AF method such as hill climbing AF method, phase difference detection method, and contrast detection method, but the details thereof are substantially the same as the third embodiment and thus the detailed description will be omitted.

According to the subject detection process (t1 to t6), the CPU 11 can obtain the ranges r1, r2 of the focused position focused on the subjects H1, H2 based on the contrast output detected in time t2 to t3, t4 to t5 in the middle of changing the focal position from the macro position NP to the infinity position FP. In the illustrated example, the range r1 of the focused position is the range between focal positions P2 to P4, and the range r2 of the focused position is the range between focal positions P6 to P8. The range r3 of the focused position of the subject H3 is only the focal position P10.

During the period from when the detection of the subjects H1 to H3 and the ranges r1 to r3 of the focused position is completed until receiving the release instruction, the CPU 11 performs the bracket imaging process (t6 to t7). In the illustrated example, the bracket imaging process is performed only on one subject H1 selected from a plurality of detected subjects H1 to H3. The subject H1 may be selected by the user manually, or may be automatically selected by the CPU 11 according to the criteria set in advance. For instance, the user selects the desired subject H1 from the subjects H1 to H3 displayed in live view image, and inputs the selecting instruction to the touch panel etc. of the imaging device 1 to perform the bracket imaging process only on the important subject H1.

As a result, the CPU 1 of the imaging device 1 periodically changes the focal position within the range r1 of the focused position of the selected H1. In the illustrated example, the focal position changes periodically and in a stepwise manner of position P2→P3→P4→P2→P3→P4→□ □ □ within the range r1 of the focused position. The imaging device 1 changes the focal position periodically and in a stepwise manner, and records the image data D2, D3, D4, . . . obtained by imaging the subject image at the respective changing positions P2, P3, P4 while performing such change in the recording medium. The bracket imaging process is substantially the same as the bracket imaging process of the third embodiment shown in FIG. 17, and thus the detailed description will be omitted.

In the example of FIG. 20, the bracket imaging process is performed on one selected subject H1, but the bracket imaging process may be performed on a plurality of subjects H1 to H3. In this case, the focal position is changed periodically and in a stepwise manner in the order of positions P2→P3→P4→P6→P7→P8→P10→P2 □ □ □ in the ranges r1, r2, r3 of the focused position.

During the bracket imaging process, when accepting the release instruction, the CPU 11 records the image data D4 obtained by imaging the subject image at an arbitrary focal position (corresponds to position P4 in the illustrated example) in the range r1 of the focused position of the bracket imaged subject H1 in the storage unit 17 at the time point of accepting the release instruction (t7). Thus, the image data D4 focused on the selected subject H1 can be recorded as the saving image data. Immediately after recording the image data D4, the CPU 11 executes the subject imaging process on the detected subjects H1, H2, H3 (t7 to t8).

Specifically, in the subject detection process, the CPU changes the focal position in a stepwise manner to positions P2, P3, P4, P6, P7, P8, P10 in the ranges r1, r2, r3 of the focused positions of the detected subjects H1, H2, H3, and records a plurality of image data D2, D3, D4, D6, D7, D8, D10 obtained by imaging the subject image at the changed focal positions in the storage unit 17 while performing such change (t7 to t8).

Therefore, the imaging device 1 according to the present embodiment performs the subject detection process of scanning the entire area of the focusable range in response to the detection instruction to detect at which focal position the subjects H1 to H3 to image are located. The imaging device 1 then images only the portion (focal positions P2 to P4, P6 to P8, P10) where the subjects H1 to H3 exist and does not image the unnecessary portion (focal positions P1, P5, P9, P11) where the subjects H1 to H3 do not exist in response to the release instruction. Therefore, the subject imaging process can be efficiently executed in a short period of time than the entire area focus imaging process since only the necessary portion where the subject exists is imaged.

[Operation of Imaging Device]

Figure 21:
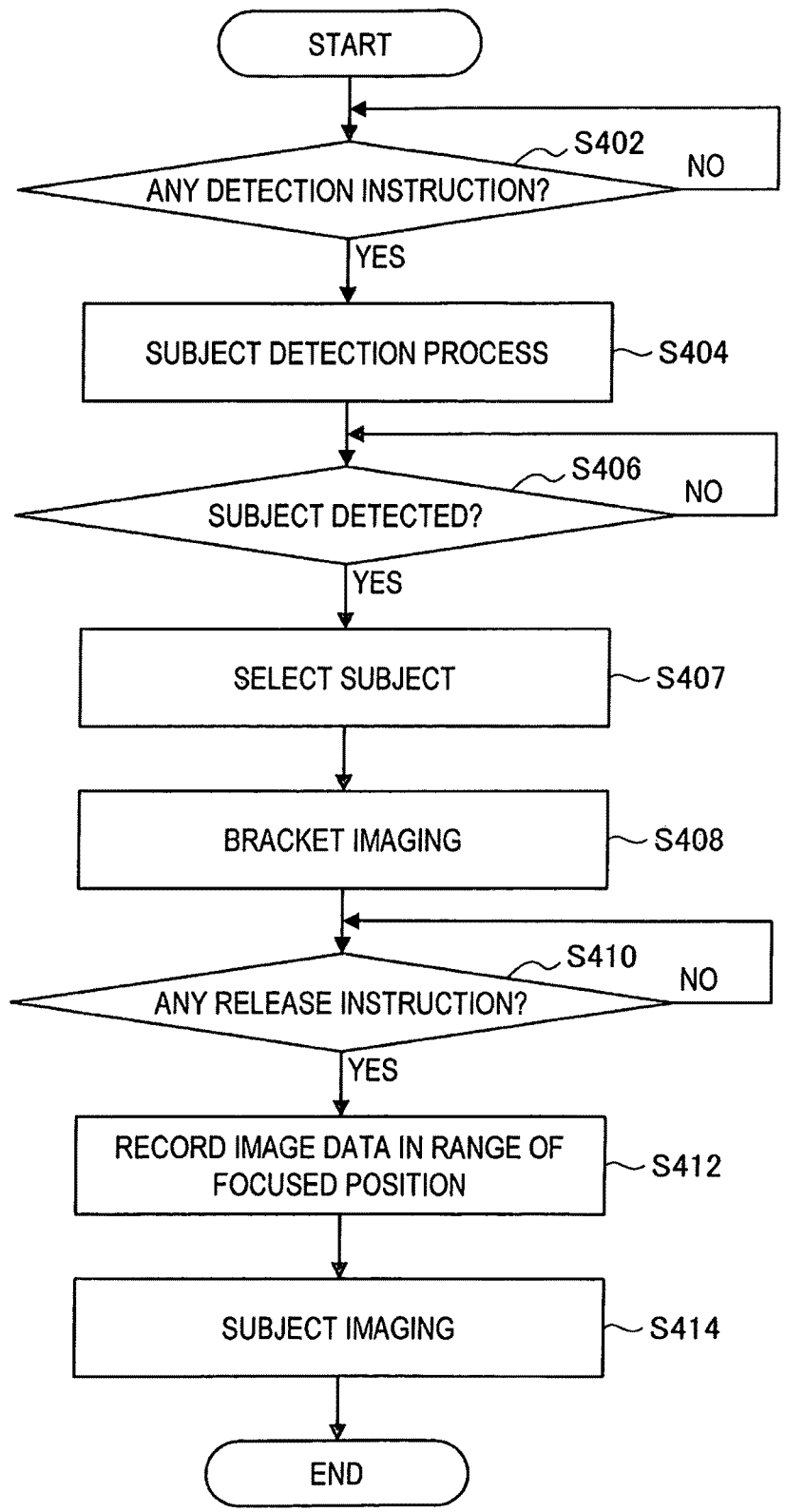
FIG. 21 is a flowchart showing the imaging operation by the imaging device according to the embodiment.

The imaging operation by the imaging device 1 according to the present embodiment will now be described with reference to FIG. 21. FIG. 21 is a flowchart showing the imaging operation by the imaging device 1 according to the present embodiment.

As shown in FIG. 21, when detecting the input of the detection instruction (S402), the CPU 11 of the imaging device 1 controls each unit of the imaging device 1 and executes the subject detection process for detecting a plurality of subjects H1 to H3 existing in the focusable range and the ranges r1 to r3 of the focused position focused on the subjects H1 to H3 (S404). The subject detection process S404 is substantially the same as the subject detection process S304 of FIG. 19 described above, and thus the detailed description thereof will be omitted.

When the detection of the subjects H1 to H3 is completed (S406) by the subject detection process in S404, the CPU 11 selects one important subject H1 from the plurality of subjects H1 to H3 based on user input (S407). The subject H1 selected in the selection process becomes the imaging target in the next bracket imaging process S408. Since the subject of performing the bracket imaging can be limited to the important subject H1, the image data accurately focused on the important subject H1 can be reliably acquired. Two or more subjects may be selected in the subject selection process S406. All detected subjects H1 to H3 may be the imaging target in the bracket imaging process S408 without performing the subject selection process S406.

Thereafter, the CPU 11 controls each unit of the imaging device 1 until accepting the release instruction (S410), and performs the bracket imaging process for focusing over the entire depth direction of the subject H (S408). In the bracket imaging process, the CPU 11 controls the deforming mirror device 2 to periodically change the focal position to the positions P2, P3, P4 while alternately swinging the focal position to the macro side and the infinity side within the range r of the focused position, as shown in FIG. 20 etc. The CPU 11 then controls each unit of the imaging device 1 to image the subject at each changing position P2, P3, P4, sequentially generate a plurality of image data D2, D3, D4, and temporarily save the image data D2, D3, D4 in the cache memory. The CPU 11 then reads out the image data D2, D3, D4 worth one period S of immediately before the release instruction from the cache memory, records the same in the storage unit 17, and deletes the other image data D2, D3, D4 from the cache memory in response to the release instruction (S410). Thus, only the necessary image data D2, D3, D4 can be stored in the storage unit 17, whereby the amount of image data to be saved can be reduced.

Furthermore, when detecting the input of the release instruction (S410), the CPU 11 of the imaging device 1 controls each unit of the imaging device 1 to record the image data obtained by imaging the subject image at the arbitrary focal position P4 in the range r1 of the focused position of the subject H1 by the image sensor 4 in the storage unit 17 (S412). Immediately thereafter, the CPU 11 controls each unit of the imaging device 1 to execute the subject imaging process (S414).

Specifically, as shown in t7 to t8 of FIG. 20, the CPU 11 changes the focal position in a stepwise manner to the positions P2 to P4, P6 to P8, P10 included in the ranges r1, r2, r3 of the focused position of the subjects H1, H2, H3 detected in S404, and records a plurality of image data D2 to D4, D6 to D8, D10 obtained by imaging the subject image at the changed focal positions in the storage unit 17 while performing such change.

[Advantages]

The imaging device 1 and the imaging method thereof according to the fourth embodiment have been described above. The fourth embodiment has the following advantages in addition to the advantages of the third embodiment.

According to the fourth embodiment, the subject detection process of scanning the entire area of the focusable range is performed in response to the detection instruction to detect at which focal position the subjects H1 to H3 exist, and the subject imaging process is performed as the multifocus imaging in response to the release instruction. In the subject imaging process, only the important portions (focal positions P2 to P4, P6 to P8, P10) where the subjects H1 to H3 exist are imaged, and the unnecessary portions (focal positions P1, P5, P9, P11) where the subjects H1 to H3 do not exist are not imaged. Therefore, only the necessary portion where the subject exists and the user specified important portion are imaged, whereby the process can be executed at higher speed than the entire area focus imaging process thereby enhancing the processing efficiency, and the useless image data can be prevented from being recorded thereby effectively utilizing the memory resource.

Fifth Embodiment

The fifth embodiment of the present invention will now be described. The fifth embodiment differs from the fourth embodiment in that a subject to be subject imaged is selected from a plurality of subjects detected in the subject detection process and that the entire area focus imaging is performed after the subject imaging, and other functional configurations are the same as the fourth embodiment and thus the detailed description will be omitted.

The imaging device 1 according to the fifth embodiment performs the subject detection process in response to the detection instruction (e.g., half-press operation of release button). The imaging device 1 thus detects a plurality of subjects existing in the imaging range and also detects the range of the focused position focused on each detected subject. The imaging device 1 then performs a subject discriminating process of discriminating one or more important subjects from the plurality of subjects detected in the subject detection process based on the user input. During the period from when the subject detection process is completed until the release instruction, the bracket imaging is performed while changing the focal position in the range of the focused position focused on one subjected selected from the one or more discriminated subjects.

Thereafter, the imaging device 1 records the image data obtained by imaging an arbitrary focal position in the range of the focused position in the storage unit 17, similar to the fourth embodiment, in response to one release instruction (e.g., full-press operation of release button). Furthermore, the imaging device 1 performs the subject imaging process of scanning only the range of the focused position focused on one or more subjects discriminated in the subject discriminating process. After the subject imaging process is completed, the imaging device 1 performs the entire area focus imaging process, similar to the second embodiment.

Thus, the imaging device 1 according to the fifth embodiment controls the focus to detect the subject in the imaging range and the range of the focused position thereof with the subject detection process, and controls the focus to change the focal position in the bracket imaging, the subject imaging process and the entire area focus imaging process. A specific example of the focus control according to the present embodiment will be specifically described with reference to FIG. 22.

Figure 22:
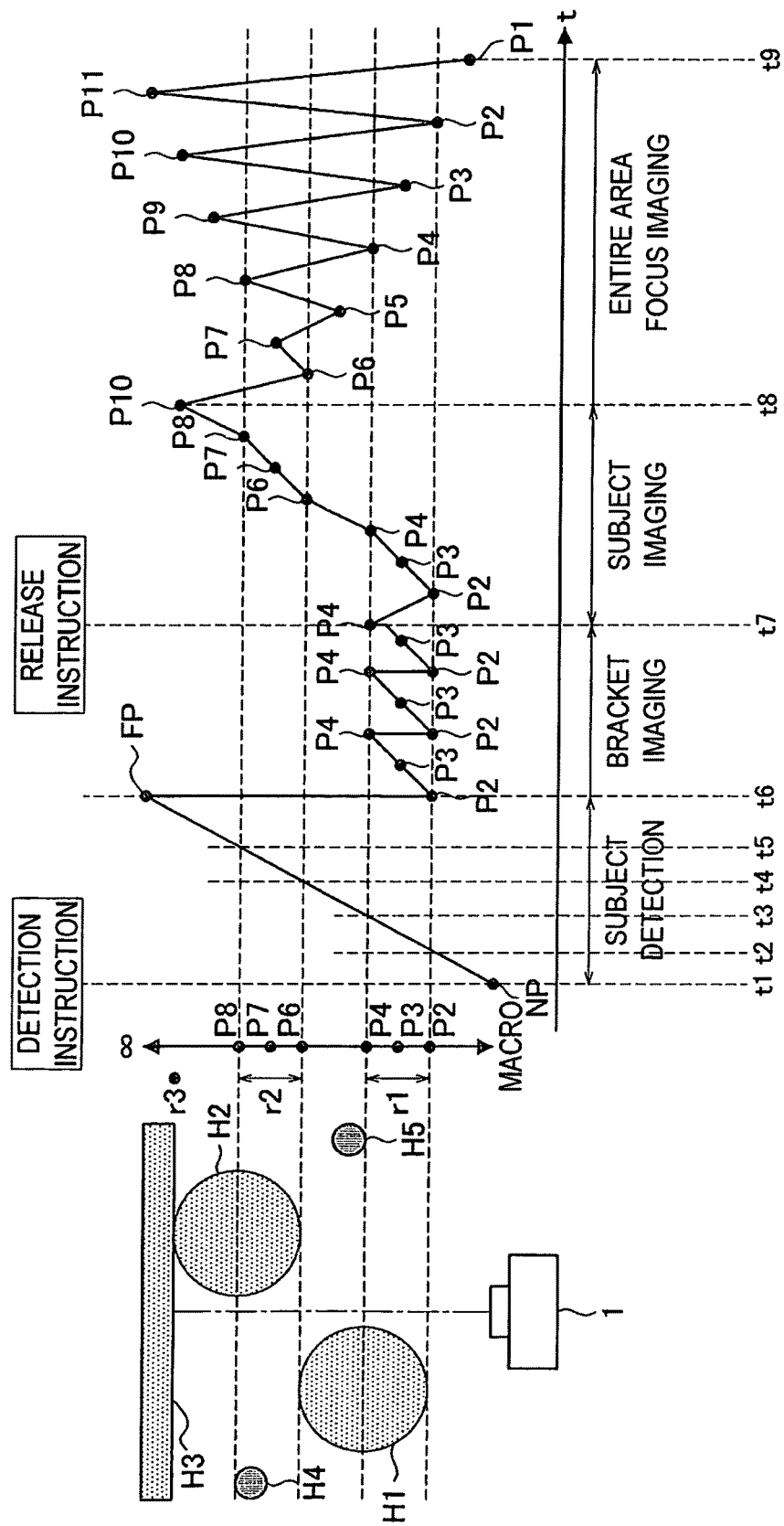
FIG. 22 is a schematic view showing an example of a focus control according to a fifth embodiment of the present invention.

FIG. 22 is a schematic view showing an example of the focus control in the subject detection process, the bracket imaging process, the subject imaging process, and the entire area focus imaging process according to the present embodiment. In FIG. 22, the vertical axis (Z-axis) shows the focal position and the horizontal axis shows the time.

As shown in FIG. 22, consider a case where the imaging device 1 detects the subjects H1 to H5, selects important subjects H1 to H3 therefrom, and performs multifocus imaging when five subjects H1, H2, H3, H4, H5 exist in the imaging range of the imaging device 1. In the fifth embodiment, the subjects H4, H5 of low importance (e.g., objects other than humans etc.) are added in addition to the important subjects H1 to H3 (see FIG. 20) in to the fourth embodiment.

First, when receiving the detection instruction (subject detection start instruction), the CPU 11 of the imaging device 1 performs the subject detection process to detect the subjects H1 to H5 in the imaging range and detect the ranges r1 to r5 of the focused position focused on the subjects H1, H2 (t1 to t6). The subject detection process can be realized using an arbitrary AF method such as hill climbing AF method, phase difference detection method, and contrast detection method, but the details thereof are substantially the same as the third embodiment and thus the detailed description will be omitted.

The CPU 11 discriminates the five detected subjects H1 to H5 to the important subjects H1 to H3 and the subjects H4, H5 of low importance, where the important subjects H1 to H3 are selected as the imaging targets in the subject imaging process (t7 to t8). Such selection may be manually carried out based on the user input on the touch panel and the like, or may be automatically carried out by the CPU 11 based on the result of image processing the image data obtained by imaging (e.g., face recognition etc.). For instance, since the face recognized subject is a person and has high importance, and thus is selected as the imaging target of the subject imaging process.

Thereafter, the imaging device 1 executes the bracket imaging process (t6 to t7), and the subject imaging process (t7 to t8) in response to the release operation, similar to the fourth embodiment. In the subject imaging process (t7 to t8), only the important subjects H1 to H3 selected from the five subjects H1 to H5 are imaged.

Furthermore, after the subject imaging process (t7 to t8) is completed, the entire area focus imaging is performed over the entire area of the focusable range while changing the focal position in a stepwise manner, similar to the second embodiment (t8 to t9). According to the entire area focus imaging, the focused image data can be ensured just in case even for the subjects H4, H5 selected as non-important.

Therefore, the imaging device 1 according to the present embodiment selects only the important subjects H1 to H3 and performs the subject imaging process and not on all detected subjects H1 to H5. Therefore, the subject imaging process on the subjects H4, H5 not desired by the user can be omitted, whereby the processing speed and the efficiency can be enhanced and the amount of data to be saved of the image data can be reduced.

[Operation of Imaging Device]

Figure 23:
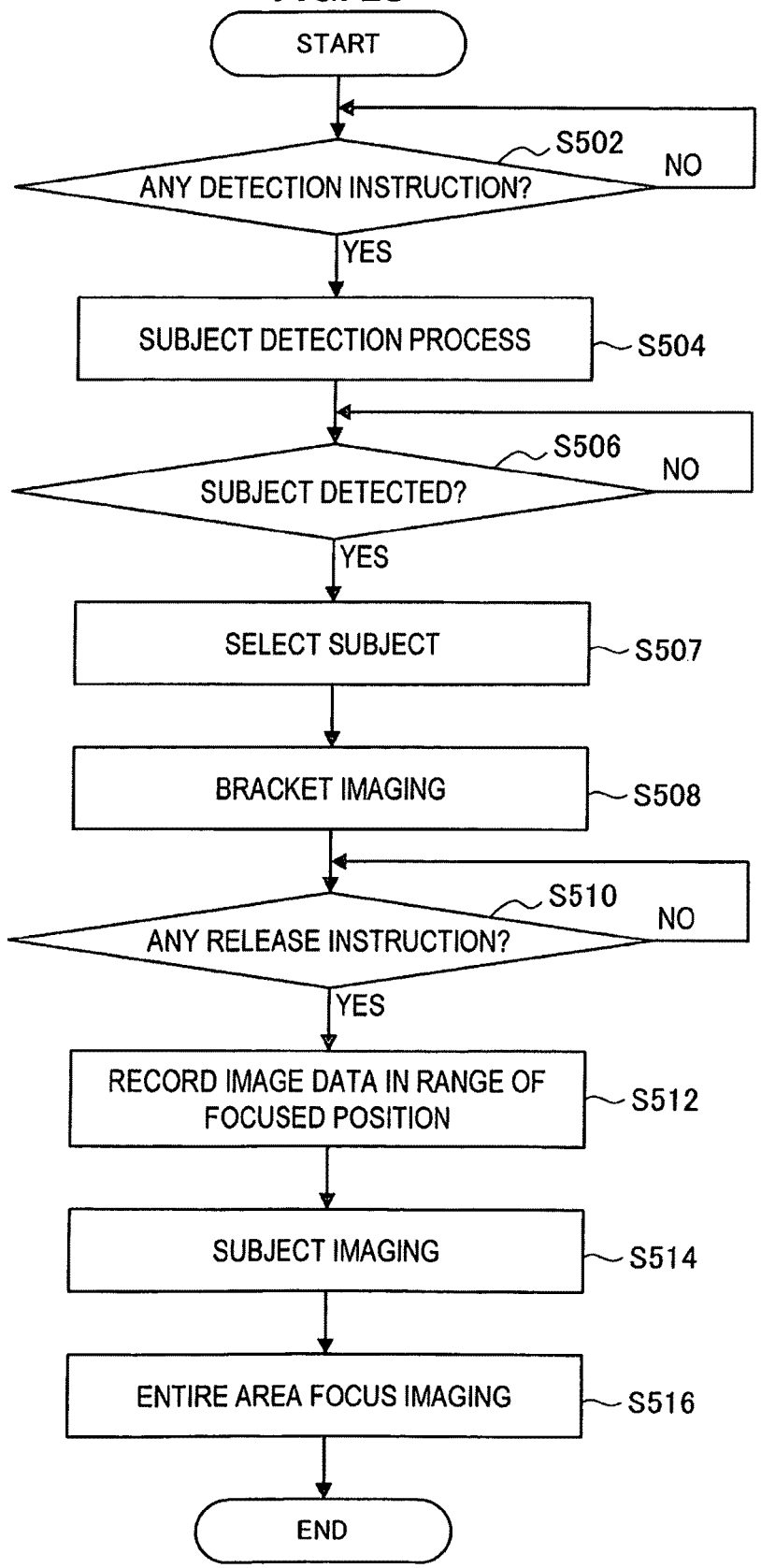
FIG. 23 is a flowchart showing the imaging operation by the imaging device according to the embodiment.

The imaging operation by the imaging device 1 according to the present embodiment will now be described with reference to FIG. 23. FIG. 23 is a flowchart showing the imaging operation by the imaging device 1 according to the present embodiment.

As shown in FIG. 23, when detecting the input of the detection instruction (S502), the CPU 11 of the imaging device 1 controls each unit of the imaging device 1 and executes the subject detection process for detecting a plurality of subjects H1 to H5 existing in the focusable range and the ranges r1 to r5 of the focused position focused on the subjects H1 to H5 (S504). The subject detection process S504 is substantially the same as the subject detection process S304 of FIG. 19 described above, and thus the detailed description thereof will be omitted.

When the detection of the subjects H1 to H5 is completed by the subject detection process in S504, the CPU 11 performs first and second selection processes of selecting an important subject from the plurality of subjects H1 to H5 based on user input (S507).

In the first selection process, one subject H1, for example, that becomes the imaging target in the next bracket imaging process S508, similar to the fourth embodiment. Since the subject of performing the bracket imaging can be limited to the important subject H1, the image data accurately focused on the important subject H1 can be reliably acquired.

In the second selection process, one or more subjects that become the imaging target in the subsequent subject imaging process S508 are selected. Since the subjects of performing subject imaging are limited to the important subject H1 to H3, the image data accurately focused on the important subjects H1 to H3 can be acquired at a timing close to the photo opportunity. The image data of the unnecessary subjects H4, H5 may not be acquired.

Similar to the fourth embodiment, the CPU 11 then performs the bracket imaging process (S508), and controls each unit of the imaging device 1 to record the image data obtained by imaging the subject image at an arbitrary focal position P4 in the range r1 of the focused position of the subject H1 by the image sensor 4 in the storage unit 17 (S512) in response to the release instruction (S510). Immediately thereafter, the CPU 11 controls each unit of the imaging device 1 to execute the subject imaging process (S514), similar to the fourth embodiment.

Subsequently, the CPU 11 performs the entire area focus imaging while changing the focal position in a stepwise manner over the entire area of the focusable range (S516), similar to the second embodiment.

[Advantages]

The imaging device 1 and the imaging method thereof according to the fifth embodiment have been described above. The fifth embodiment has the following advantages in addition to the advantages of the fourth embodiment.

According to the present embodiment, even if a great number of subjects H1 to H5 exist in the imaging range of the imaging device 1, a subject of high priority such as an important subject and a subject desired by the user is selected therefrom, and the subject imaging process is performed only on the selected subject. Since the target to be performed with the subject imaging process can be limited to the important subjects H1 to H3, the image data accurately focused on the subjects H1 to H3 can be acquired at a timing close to the photo opportunity. The processing load and the processing time of the subject imaging process, as well as the amount of data to be saved can be reduced compared to when imaging all subjects H1 to H5. Furthermore, the focused image data can be ensured just in case even for the subjects H4, H5 of low priority not imaged in the subject imaging process by performing the entire area focus imaging process after the subject imaging process.

Sixth Embodiment

The sixth embodiment of the present invention will be now be described. The sixth embodiment differs from the fourth embodiment in that each subject is imaged with one step in the subject imaging process by controlling the aperture 3 of the imaging device 1 and adjusting the depth of field, and other functional configurations are the same as the fourth embodiment and thus the detailed description will be omitted.

The CPU 11 of the imaging device 1 according to the sixth embodiment controls the aperture 3 of the imaging optical system according to the range r of the focused position focused on a plurality of subjects H detected by the subject detection process to adjust the depth of field at each focal position. The coarseness and the denseness of the focal position P that changes in a stepwise manner as shown in FIG. 10 can be adjusted by adjusting the depth of field.

For instance, when imaging the subject H having thickness in the depth direction, the focal position is changed in a stepwise manner and imaging is performed in a plurality of steps to image the entire depth direction of the subject H. However, in such case, the depth of field at the focal position can be made deep even if at the same focal length by adjusting the opening (e.g., F value) of the aperture 3, whereby the subject H can be imaged with one step.

In the present embodiment, when the focused image in the entire depth direction of the subject H may not be obtained until the focal position is changed and imaging is performed with a plurality of steps since the range r of the focused position focused on the subject H is wide in the subject imaging process, the depth of field is made deep by adjusting the aperture 3. The depth of field at the focal position corresponding to the subject thus becomes greater than or equal to the range r of the focused position focused on the subject, whereby the subject H can be imaged with one step.

The relationship of the opening (F value) of the aperture 3 and the depth of field will be described below. As described above, the depth of field is the sum of the front depth of field and the rear depth of field. The front depth of field Lf and the rear depth of field Lr are respectively expressed with Equation 1 and Equation 2.

[Formula 1]

$$Lf = \frac{\delta FL^2}{f^2 + \delta FL} \quad (1)$$

$$Lr = \frac{\delta FL^2}{f^2 - \delta FL} \quad (2)$$

Here, δ represents the diameter of a permissible circle of confusion, F represents the F value of the lens, L represents the distance to the subject, and f represents the focal length of the lens. L can be calculated from the displacement amount of the deforming mirror device 2.

The CPU 11 of the imaging device 1 adjusts the F value (aperture) of the lens such that the depth of field obtained from Equation 1 and Equation 2 becomes the thickness in the depth direction (Z direction) of the subject. Thus, imaging can be performed while focused on the entire depth direction of the subject with one step.

The focus control according to the present embodiment will now be described. The imaging device 1 according to the sixth embodiment controls the focus to detect the subject H in the imaging range and the range r of the focused position thereof in the subject detection process, and controls the focus to change the focal position in the bracket imaging and the subject imaging process. A specific example of the focus control according to the present embodiment will be specifically described with reference to FIG. 24.

Figure 24:
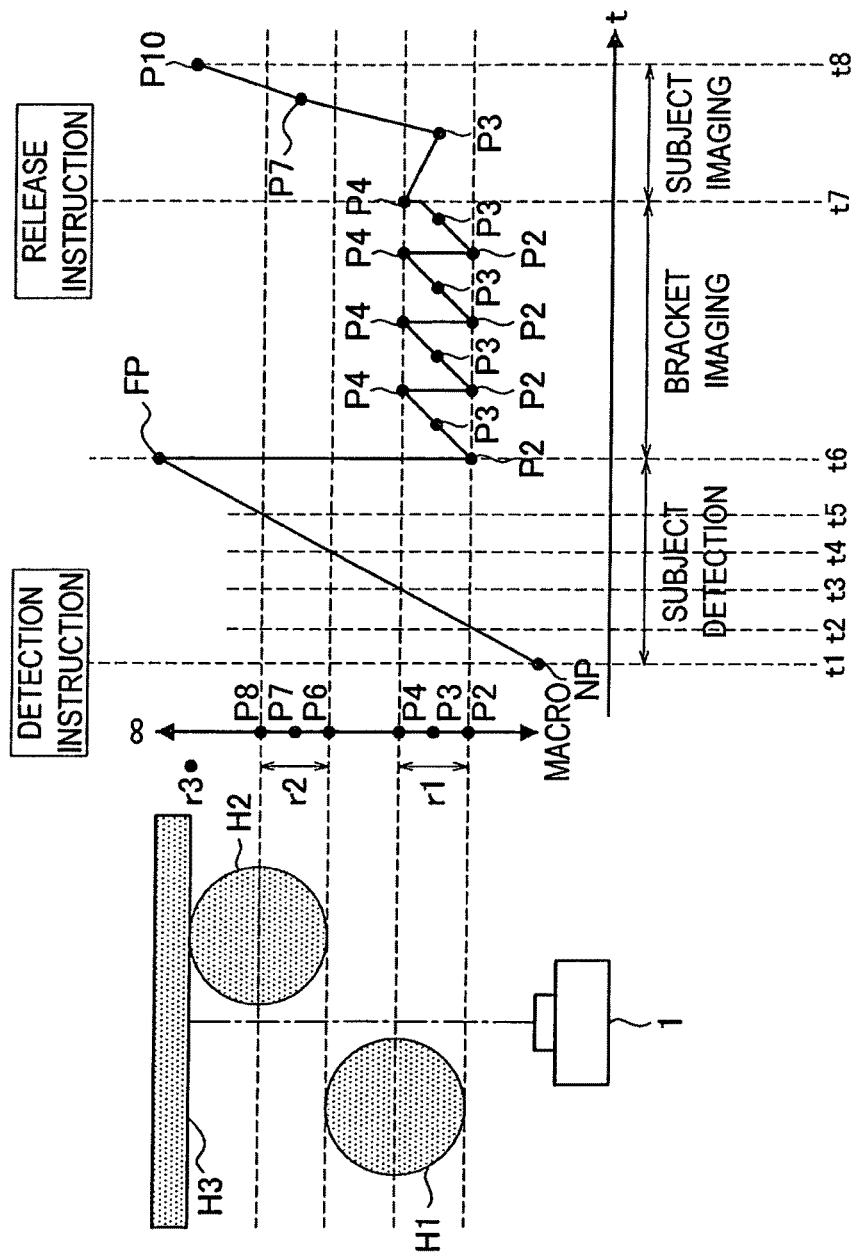
FIG. 24 is a schematic view showing an example of a focus control according to a sixth embodiment of the present invention.

FIG. 24 is a schematic view showing an example of a focus control in the subject detection process, the bracket imaging process, and the subject imaging process according to the present embodiment. In FIG. 24, the vertical axis (Z-axis) shows the focal position and the horizontal axis shows the time.

As shown in FIG. 24, the subject detection process (t1 to t6) and the bracket imaging process (t7 to t8) according to the sixth embodiment are substantially the same as the fourth embodiment (see FIG. 20) described above. As shown in FIG. 20, in the subject imaging process (t7 to t8) according to the fourth embodiment, each subject H1, H2 is imaged with three steps (P2→P3→P4, P6→P7→P8).

On the contrary, as shown in FIG. 24, each subject H1, H2 is imaged only with one step (P3, P7) in the subject imaging process (t7 to t8) according to the sixth embodiment. This is because the depth of field at the focal positions P3, P7 is made deep by adjusting the F value of the aperture 3 according to the ranges r1, r2 of the focused position of the subjects H1, H2 so that the subjects H1, H2 detected in the subject detection process (t1 to t6) can be imaged with one step in the subject imaging process (t7 to t8). In this case, the depth of field at the focal position P3, P7 becomes greater than or equal to the range r1, r2 of the focused position.

The timing of adjusting the aperture 3 may be before the release instruction (to t7) or before the start of the subject imaging process (t7) immediately after the release instruction as long as it is after the subject detection process (t1 to t6). The imaging device 1 holds the table showing the relationship of the F value of the aperture 3 and the focal position in the memory unit 12, and the CPU 11 may adjust the value to the appropriate value of the aperture 3 according to the detection result of the subject detection process based on the table.

[Advantages]

The imaging device 1 and the imaging method thereof according to the sixth embodiment have been described above. The sixth embodiment has the following advantages in addition to the advantages of the fourth embodiment.

According to the present embodiment, the depth of field at each focal position P can be made deep by adjusting the aperture 3 of the imaging device 1 according to the detection result in the subject detection process. Therefore, since the important portion where the subjects H1 to H3 exist can be imaged with one step (focal positions P3, P7, P10) in the subject imaging process, the subject imaging process can be executed at higher speed, the processing efficiency can be enhanced, and useless image data can be prevented from being recorded, whereby the memory resource can be effectively utilized.

The imaging device 1 and the imaging method using the same according to the first to the sixth embodiments of the present invention have been described above. According to the present embodiment, the focused position focused on a desired subject is detected by the AF process, the subject detection process, and the like before the release instruction in advance, and the focal position is changed with the focused position as the reference and the multifocus imaging is performed in response to the release instruction. The subject at the focused position and the vicinity thereof thus can be imaged right after the release instruction is made at close to the photo opportunity. Therefore, the image focused on the desired focal position of the user can be obtained without missing the photo opportunity.

In the present embodiment, a plurality of images focused on different focal positions can be acquired in response to one release operation in time of the multifocus imaging. Thus, a great number of image data is held compared to the normal imaging device, which is very advantageous compared to the imaging device of the related even when obtaining a new image by performing signal processing and synthesis processing on the image data retrieved after the imaging. Thus, an image more natural and of higher quality than the image obtained by synthesizing the images from the normal imaging device can be obtained.

Obtaining the image focused on the desired subject with the imaging device is very difficult at times, but the image can be obtained more accurately and easily according to the present embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
   an imaging unit including an image sensor for imaging a light-received subject image and outputting image signals, and an imaging optical system for forming the subject image onto the image sensor;

a drive unit for driving at least one of the imaging optical system or the image sensor to change a focal position;

an image data generating unit for generating image data from the image signals output from the image sensor; and a control unit for controlling the imaging unit, the drive unit, and the image data generating unit, wherein the control unit detects a focused position focused on a desired subject in an imaging range in response to a detection instruction, and acquires the image data obtained by imaging the subject image at the focused position as saving image data in response to a release instruction, and sequentially changes the focal position with the focused position as a reference and acquires the image data obtained by imaging the subject image at a plurality of changed different focal positions as the saving image data, wherein the control unit performs an entire area focus imaging process for, in response to the release instruction, sequentially changing the focal position with the focused position as a reference within a focusable range from a focal position on a shortest distance side to a focal position on an infinity side in the imaging optical system, and acquiring the image data obtained by imaging the subject image at a plurality of changed different focal positions as the saving image data, and wherein the control unit sets a plurality of changing positions of the focal position in a stepwise manner in the focusable range according to a depth of field of the imaging optical system, and in the entire area focus imaging process, the control unit changes the focal position in a stepwise manner in order from a changing position close to the focused position among the plurality of changing positions.

2. The imaging device according to claim 1, wherein the control unit detects the focused position by performing an auto focus processing for focusing on the desired subject in the imaging range.

3. The imaging device according to claim 1, wherein the control unit sets the plurality of changing positions with the focused position as a base point and changes the focal position in a stepwise manner to the set plurality of changing positions.

4. The imaging device according to claim 1, wherein the imaging optical system includes a deforming mirror configured so that a cross-sectional shape is deformable to a convex shape or a concave shape, and the drive unit changes the focal position by deforming and driving the deforming mirror based on an instruction of the control unit.

5. An imaging method, comprising the steps of:

detecting a focused position focused on a desired subject in an imaging range in response to a detection instruction; and acquiring the image data obtained by imaging at the focused position as saving image data in response to a release instruction, wherein, in the acquiring step, sequentially changing the focal position with the focused position as a reference and acquiring the image data obtained by imaging the subject image at a plurality of changed different focal positions as the saving image data, and further comprising performing an entire area focus imaging process for, in response to the release instruction, sequentially changing the focal position with the focused position as a reference within a focusable range from a focal position on a shortest distance side to a focal position on an infinity side in an imaging optical system, and acquiring the image data obtained by imaging the subject image at a plurality of changed different focal positions as the saving image data, setting a plurality of changing positions of the focal position in a stepwise manner in the focusable range according to a depth of field of the imaging optical system, and in the entire area focus imaging process, changing the focal position in a stepwise manner in order from a changing position close to the focused position among the plurality of changing positions.

* * * * *